(12) United States Patent  
Urken

(10) Patent No.: US 7,377,431 B2  
(45) Date of Patent: May 27, 2008

(54) SYSTEM AND METHOD FOR OVERCOMING DECISION MAKING AND COMMUNICATIONS ERRORS TO PRODUCE EXPEDITED AND ACCURATE GROUP CHOICES

(75) Inventor: Arnold B. Urken, Hoboken, NJ (US)

(73) Assignee: The Trustees of Stevens Institute of Technology, Hoboken, NJ (US)

( * ) Notice: Subject to any disclaimer, the term of this patent is extended or adjusted under 35 U.S.C. 154(b) by 64 days.

(21) Appl. No.: 11/542,022

(22) Filed: Oct. 2, 2006

(65) Prior Publication Data

US 2007/0023515 A1    Feb. 1, 2007

Related U.S. Application Data

(63) Continuation of application No. 10/953,514, filed on Sep. 29, 2004, now Pat. No. 7,172,118.

(60) Provisional application No. 60/506,825, filed on Sep. 29, 2003.

(51) Int. Cl.  
*G07C 13/00* (2006.01)

(52) U.S. Cl. ........................ 235/386; 705/12

(58) Field of Classification Search ................ 235/386, 235/51, 56; 705/10, 12  
See application file for complete search history.

(56) References Cited

U.S. PATENT DOCUMENTS 5,400,248 A   3/1995 Chisholm ................. 364/409
5,759,101 A   6/1998 Von Kohorn ................ 463/40
5,790,426 A   8/1998 Robinson ..................... 364/554
5,875,432 A   2/1999 Sehr ............................. 705/12
5,878,214 A   3/1999 Gilliam et al. ......... 395/200.34
6,081,793 A   6/2000 Challener et al. ............. 705/50
2002/0103695 A1  8/2002 Urken et al. .................. 705/12

OTHER PUBLICATIONS

Aiken, et al., "Group Decision Support Systems," Review of Business, Jamaica, vol. 16, Issue 3, Spring, 1995 (6 pages).
Chisholm, "Conditional Voting," Unix Review, pp. 11-16, Aug. 1995 (4 pages).
Goodman, et al., "Maximizing the Throughput of CDMA Data Communications," http://utopia.poly.edu/~vrodri01/papers/vtc_gmpr03.pdf (5 pages).

(Continued)

*Primary Examiner*—Daniel Hess  
(74) *Attorney, Agent, or Firm*—Greenberg Traurig, LLP

(57) ABSTRACT

A system and method is provided overcoming decision-making and communications errors to produce expedited and accurate group choices. The invention provides collective outcomes that are resilient to communication and decision making errors, and which are provided with a minimum wait time. The system comprises a user interface engine that provides a channel to the features of the present invention, an agenda manager module for creating and presenting questions, a user manager module that controls interactions with user who request questionnaires, submit response data, and request access to analytical results, and a report manager module that identifies collective outcomes that are resilient to error and/or that weight individual votes to optimize the group's performance in producing one or more correct or optimal collective choices. A common data exchange allows communication between the modules.

25 Claims, 38 Drawing Sheets

OTHER PUBLICATIONS

Jackson, et al., "Support Group Decisions Via Computer Systems," Quality Progress, Milwaukee, vol. 28, Issue 5, May 1995 (5 pages).

Kraemer, et al., "Computer-Based Systems for Cooperative Work and Group Decisionmaking: Status of Use and Problems in Development," University of California, pp. 353-375, Sep. 1986.

Langham, "Mediated Meetings," Successful Meetings, Philadelphia, vol.44, Issue 2, Jan. 1995 (3 pages).

LaPlante, et al., "Group(ware) Therapy: Here's a Little Help to Make Your Group Click," Computerworld, vol. 26, No. 30, pp. 71-74, Jul. 27, 1992.

McLean, et al., "Classics of Social Choice," Ann Arbor, The University of Michigan Press (6 pages).

Urken, "The Condoreet-Jefferson Connection and the Origins of Social Choice Theory," Public Choice, 72, pp. 213-236, 1991.

Urken, "Polls, Surveys, and Choice Processor Technology on the World Wide Web," WWW Journal, Issue 3 (9 pages).

Urken, "Extended Abstract Polls, Surveys and Choice Processor Technology," submitted for review for the Workshop on Internet Survey Methodology and Web Demographics, Cambridge, Massachusetts, Jan. 29-30, 1996 (7 pages).

Urken, "Social Choice Theory and Distributed Decision Making," in R. Allen (ed.) IEEE/ACM Conference on Office Information Systems, Mar. 1998, pp. 158-168.

Urken, "Time, Error, and Collective Decision System Support," Proceedings of the International Conferecnce on Telecommunications Systems, Oct. 5, 2003 (20 pages).

"Choice Processing Technology and Group Decision Making" SmartChoice Technologies Corporation, 1995 (7 pages).

"Choice Processor(tm) Technology and Longidtudinal Analysis" http://www.ai.mit.edu/projects/iiip/conferences/survey96/urken/slides.html (5 pages).

"SmartChoice—the First Choice Processor," 1994, http://sunsite.kth.se/sun/sunflash/1994/63.mar/63.12.SmartChoice (1 page).

"SmartChoice Technologies Corporation,"We Make Choiceware! (tm) http://www.choicelogic.com/schome/bakschome.html (2 pages).

"SmartChoice Technologies Corporation,"Sm@rtPoll—Choice Processing(tm) for Internet or Intranet http://www.choicelogic.com/schome/cmspln.html (4 pages).

"SmartChoice Technologies Corporation,"Choice Processor(tm) Technology and Group Decision Making http://www.choicelogic.com/schome/scpaper.html (5 pages).

Celko, "Voting Systems; What do Social Decision Theory Systems Have in Common with Networks?" DBMS, vol. 5, No. 12, p. 14(3), Nov. 1992 (5 pages).

Vandercruyssen, "Analysis of Voting Procedures in One-Seat Elections: Condorcet Efficiency and Borda Efficiency," published 1999 by the Center of Economics (36 pages).

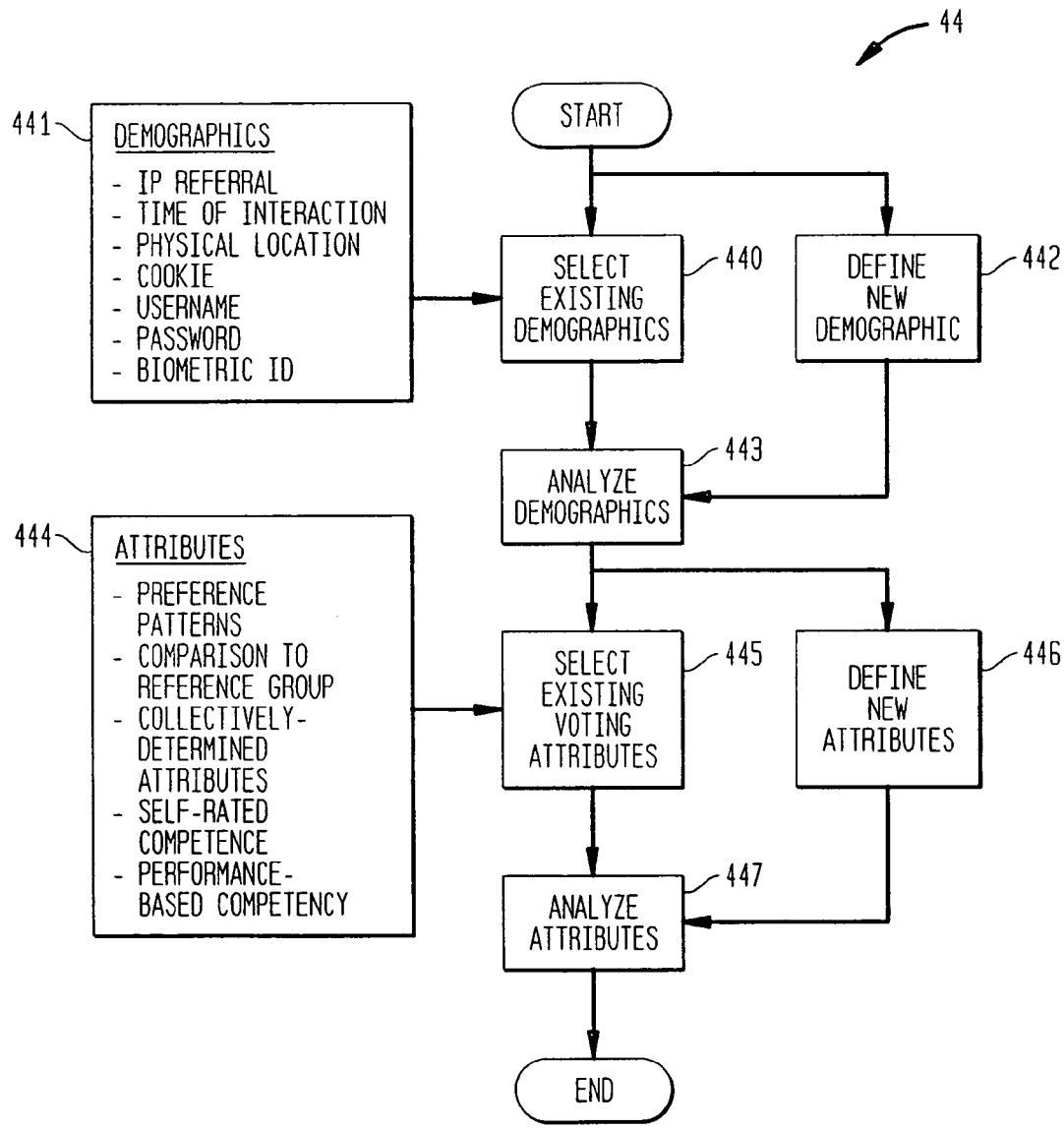

RESULTS FOR 10 VOTERS

RESULTS FOR 100 VOTERS

RESULTS FOR 1000 VOTERS

RESULTS FOR 10 VOTERS

RESULTS FOR 100 VOTERS

RESULTS FOR 1000 VOTERS

RESULTS FOR 1000 VOTERS

RESULTS FOR 10 VOTERS

RESULTS FOR 100 VOTERS

RESULTS FOR 1000 VOTERS

ERCO RESULTS FOR 10, 100, AND 1000 VOTERS

BENCHMARK RESULTS FOR 10, 100, AND 1000 VOTERS

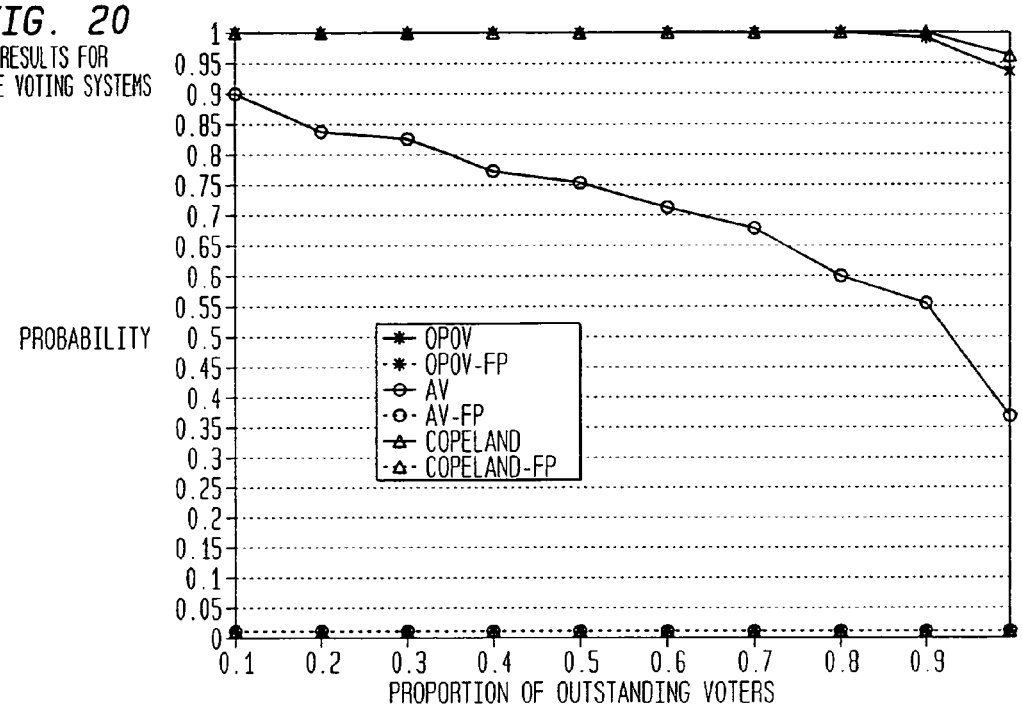
FIG. 20 RESULTS FOR THREE VOTING SYSTEMS
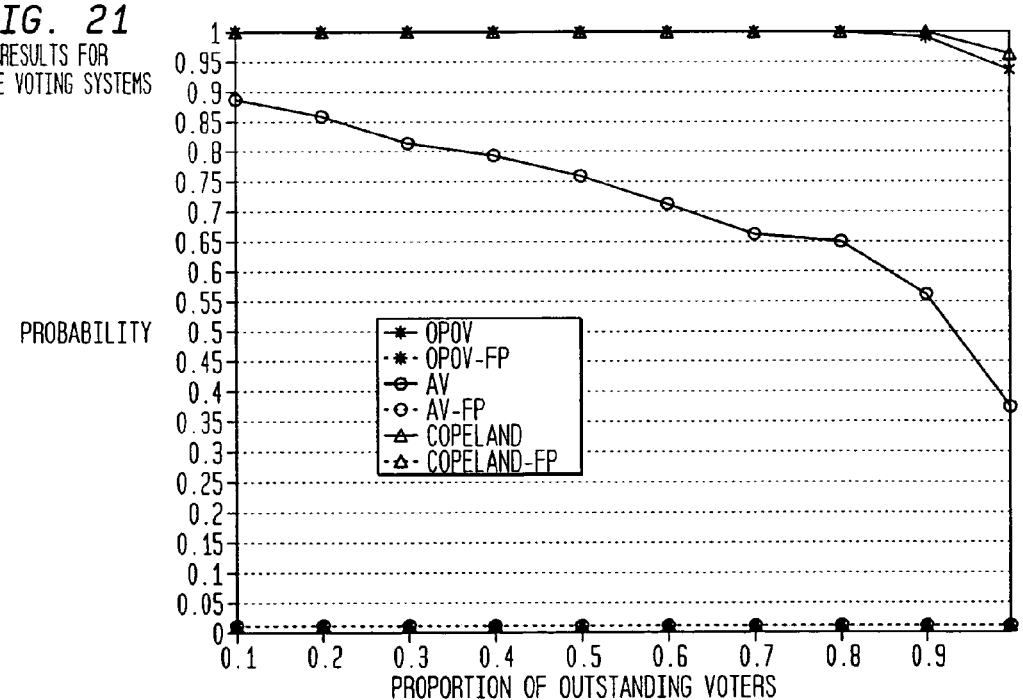
FIG. 21 RESULTS FOR THREE VOTING SYSTEMS

RESULTS FOR THREE VOTING SYSTEMS

ERCO RESULTS FOR
5, 10, AND 20 VOTERS

BENCHMARK RESULTS FOR
5, 10, AND 20 VOTERS

ERCO RESULTS FOR 5 VOTERS
WITH HETEROGENEOUS
PREFERENCES UNDER
THREE VOTING SYSTEMS

HOMOGENEOUS PREFERENCES → OPOV IS OPTIMAL

SAME CONDITIONS WITH MORE HETEROGENEOUS PREFERENCES → COPELAND VOTING IS OPTIMAL

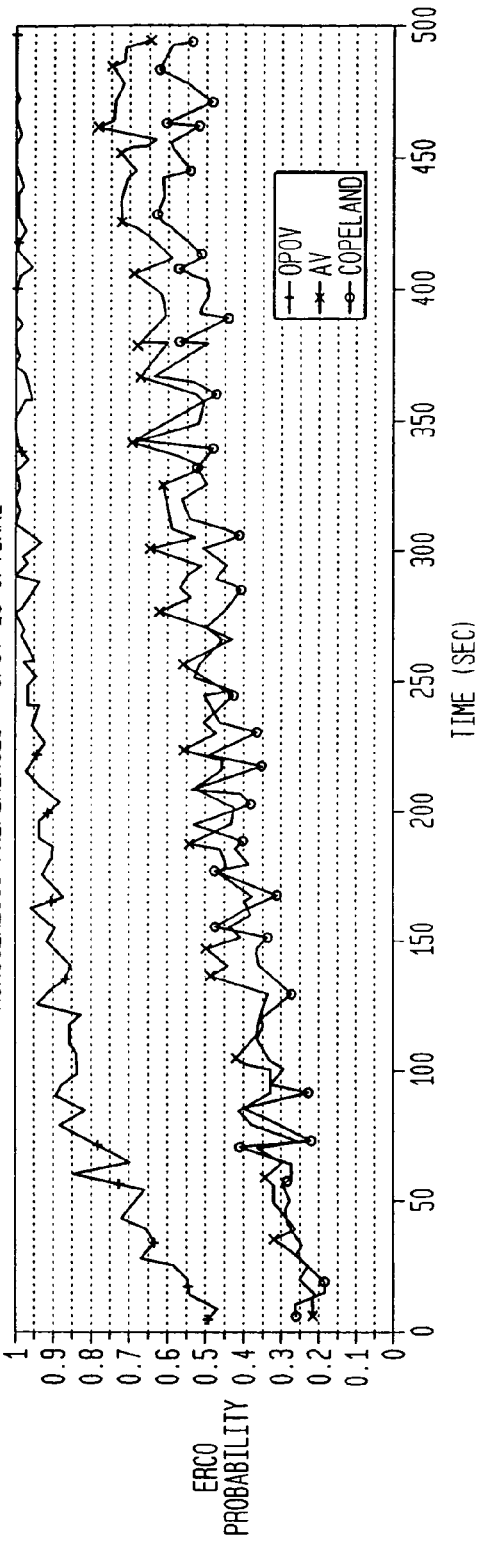
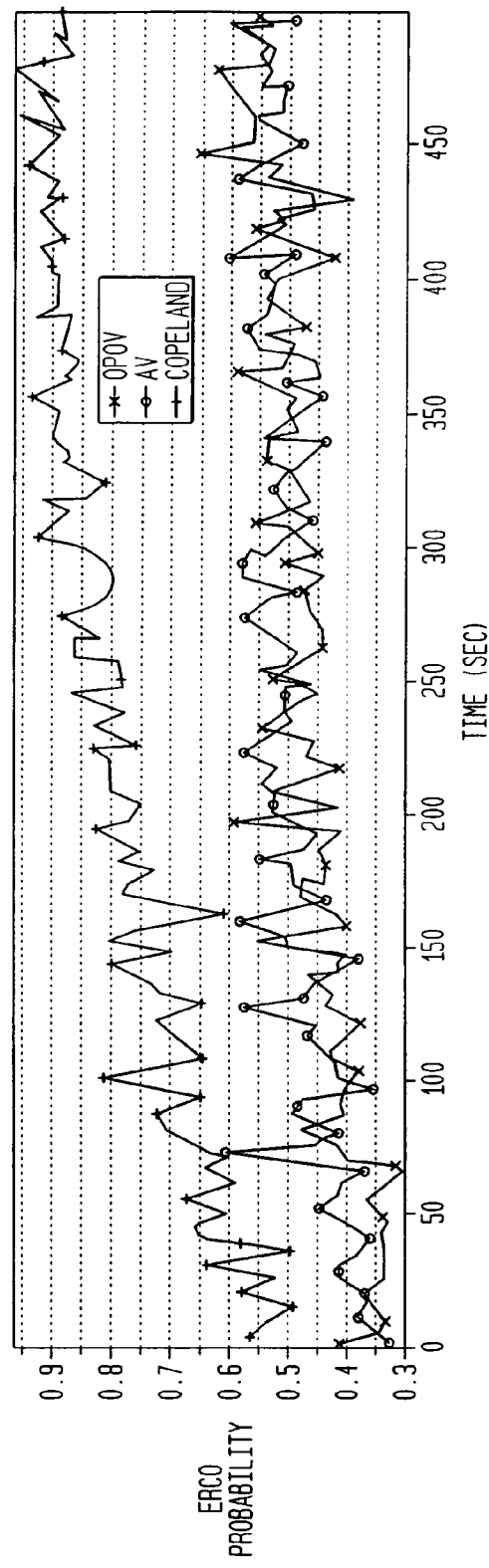

75-25 SENSOR SPLIT 95-5 SENSOR SPLIT 75-25 SPLIT→SOME VOLATILITY IN OPOV, OTHER SYSTEMS DIVERGE OVER TIME 95-5 SPLIT→OPOV LESS VOLATILE, OTHER SYSTEMS DO NOT DIVERGE OVER TIME

SYSTEM AND METHOD FOR OVERCOMING DECISION MAKING AND COMMUNICATIONS ERRORS TO PRODUCE EXPEDITED AND ACCURATE GROUP CHOICES

RELATED APPLICATIONS

This application is a continuation of U.S. patent application Ser. No. 10/953,514 filed Sep. 29, 2004, now U.S. Pat. No. 7,172,118, which claims the benefit of U.S. Provisional Application Ser. No. 60/506,825 filed Sep. 29, 2003, the entire disclosures of which are both expressly incorporated herein by reference.

STATEMENT OF GOVERNMENT RIGHTS

The present invention was supported in part by the U.S. Army, TACOM-ARDEC Contract No. DAAE30-00-D-1011. The Government may have certain rights to this invention.

BACKGROUND OF THE INVENTION

1. Field of the Invention

The present invention relates to the processing of individual choices to produce expedited and accurate collective outcomes. More specifically, the present invention relates to a system and method for overcoming decision-making and communications errors to produce expedited and accurate group choices.

2. Related Art

In the past, wired and wireless networks have been used to process individual choices or votes into collective outcomes in decision rooms, surveys, polls, and other collective decisions. However the software systems used in such applications are not designed to withstand communication errors, do not enable a group to reach a consensus even though all of the votes have not been received for processing, and do not weight individual votes on one or more dimensions of choice to maximize the group probability of making one or more correct or optimal collective decisions. As such, these problems limit the reliability and accuracy of group decisions.

Communication errors can be caused in numerous ways, including malicious physical or cyber attacks against the network and equipment failure (e.g., link or node failure in the network). In the case of wired networks, destroying or damaging the nodes or links in the network can delay and/or thwart the delivery of votes to be processed into collective outcomes. Cyber attacks can use computer viruses or worms to destroy software systems and/or data required in the collection and processes of individual choices into collective outcomes. These attacks can include viruses that overload node capacity (creating DOS (Denial of Service) effects) or network links (creating network errors in connecting to destination nodes), as well as intrusions that occur when authentication, encryption, server management tools, and other security techniques are penetrated.

Communication breakdowns can also be caused by so-called "benign" or inadvertent errors that occur because the programming tools used to create the software systems contain loopholes or faults that can lead to malfunctions in the submission and processing of votes. These types of errors will not only produce counting errors that are likely to go undetected and uncorrected, but also provide an opportunity for malicious actions to take place (see, e.g., F. B. Schneider, G. Morrisset, and R. Harper, "A Language-Based Approach To Security", in R. Wilhelm ed., Informatics: 10 Years Back, 10 Years Ahead, Lecture Notes in Computer Science, Volume 2000 Springer-Verlag, Heidelberg, 2000). For example, when a buffer overflow occurs in submitting data to a database, the error provides an opening that can be exploited by an individual or software process to gain access to the database to change, destroy, and/or damage data.

Benign errors can also be caused by noise created when transmitter power levels and the number of terminals are not optimized for sending data to a wireless base station. (see, e.g., D. Goodman, Zory Marantz, Penina Orenstein, Virgilio Rodriguez "Maximizing the Throughput of CDMA Data Communications," http://utopia.poly.edu/~vrodri01/papers/vtc_gmpr03.pdf.)

Although malicious and benign errors can occur in wired and wireless networks, both types of errors have a greater impact in wireless networks than they do in wired networks. In wired networks, for example, adaptive routing can enable the votes to be submitted successfully despite physical attacks on particular nodes or links in the network. Similarly, the greater processing power and energy capacity of wired nodes enables the use of intrusion detection and correction software to counter cyber attacks. In contrast, in wireless networks, connectivity is not is as flexible or responsive and mobile devices lack the processing and energy capacity to adapt to the challenges posed by malicious and benign communications errors.

In these fragile communications environments, both types of errors can have deleterious effects on the ability of groups to reach a consensus and/or to produce an accurate collective choice. These effects can make it impossible for a group to agree and take action and/or produce a collective outcome that provides one or more correct or optimal choices to be carried out. In the first case, for example, malicious and/or benign communications errors may make it impossible to collect enough votes to determine if there is a majority consensus. Even if the aggregation rule is plurality, not majority, missing data may make it impossible to determine if the current plurality winner would be the eventual winner if it were possible to collect and count all the votes. In such cases, the group would not be able to take action to protect itself or to participate as part of a broader collective action to achieve particular objectives. The resulting loss of money, property, and life can be tremendous. In the second case, when the group is charged with reaching a consensus to find correct or optimal answers to one or more decision tasks, benign and malicious communications errors can have a filtering effect that prevents the most competent voters from submitting their votes, thereby allowing the collective decision to be dominated by the least competent voters. Collective incompetence also entails significant losses.

Even when malicious and benign communications errors do not present obstacles to processing individual choices into collective outcomes, time constraints can make slowly-produced collective outcomes irrelevant. For example, if a group of investors cannot reach a consensus before a deadline passes, they will miss an opportunity. Similarly, if a network of military decision makers cannot expeditiously reach a consensus about the capabilities of an approaching adversarial force, they may lose many lives—including their own. In both of these examples, the decision tasks may involve the selection of one or more correct or optimal choices. For instance, if the investors reach a consensus in time, but their collective outcome is wrong, they may not maximize the benefits derived from the opportunity. In fact, the investors may experience a disastrous loss instead of even a modest gain. Similarly, if the military decision makers produce collective outcomes that are very accurate, they may save many lives. However, as the accuracy of their collective decisions declines, the number of casualties will rise.

Another limitation of the state of the art is the exclusive focus on producing winning coalitions or decisive collective outcomes. Whether collective outcomes are constrained by time or malicious and/or benign communications errors, knowing if there is going to be a tie or an indecisive collective outcome can enable decision makers to take immediate action to collect additional information and/or follow contingency measures to minimize losses. For example, a tie produced by the default one person, one vote and plurality aggregation rule method may be resolved by applying an alternative method. If the voters rated all of the choices on an ordinal preference scale before voting for their most preferred choice, the rating data can be reprocessed under Condorcet scoring (based on binary contests among all of the choices across voter preference orderings), and the tie can be assessed to determine if one (or more) of the tied outcomes is a Condorcet winner. Knowing if there will be no collective consensus also provides an opportunity to launch a followup query to see if the group can reach a consensus on a different decision task.

State-of-the-art systems and methodologies for collecting information about individual preferences and judgments do not include voting mechanisms for dealing with communications and/or decision-making errors, nor can they adequately deal with emergencies or urgent time constraints. For example, polling and survey software does not include such mechanisms, nor do decision rooms with Group Decision Support Systems (GDSS) tools. GDSS tools rely on human facilitators, who cannot process information quickly and accurately enough—even with a GDSS—to address error and time constraints. Even when moderate time constraints allow a human to facilitate the production of a collective outcome, GDSS systems and methodology is limited by one-dimensional data collection and analysis and limitations on file functionality. Moreover, GDSS's require users who are relatively computer-savvy and comfortable using different computer tools. Further, GDSS quality is limited by difficulties in recruiting and retaining skilled facilitators (see, e.g., R. Chapman, "Helping The Group to Think Straight," Darwin Magazine, August, 2003).

Current GDSS, polling, and survey solutions are also limited because they are not designed to process voice and/or gesture information as voting inputs or outputs. For example, although analog and digital voice technology is used to authenticate participants in a collective decision, they are not used to communicate information in novel ways to take advantage of the efficiency and effectiveness of representing preferences and/or judgments in digital and/or analog form. For example, voting by representing preferences by a preference range can provide richer input information than simply selecting a single point along a scale. Moreover, when individual analog inputs are processed to produce a collective outcome, the results can provide a more accurate and easily-computed view of the voting results.

Voice voting is a very "noisy" means of measuring preferences. For this reason, voting protocols such as Roberts Rules of Order only describe its use in binary decisions in which the "yays" can be readily distinguished from the "nays." Still, voting theorists such as Condorcet recommended avoiding voice votes and Roberts Rules of Order prescribes the use of other voting mechanisms (show of hands, division of the whole, and/or ballot) to scrutinize the voice outcomes. Digital expression of voice votes can be used to improve the efficiency and accuracy of voice voting. Although voice votes could still be interpreted in analog mode, digitized voice inputs would integrate authentication (via techniques such as voice prints) with representation of intensity of preference based on pre-existing profiles that reveal personal ranges of intensity for each individual. Processing such inputs would make it unnecessary to clarify the outcomes of voice votes by using division of the whole, show of hands, or ballots.

Another limitation of the state of the art is the circumscribed use of mobile sensors in collective decision making. Currently, sensors report readings for environmental agents to a host machine where the data are aggregated to generate a report. Methodological and system constraints limit the precision and accuracy of the reports because simple distributional statistics must be used to describe phenomena. Sensors are not used to submit ratings based as if they were human decision makers expressing a preference over a list of choices or rendering a binary or rendering a binary or more complex judgment based rules of artificial intelligence for generating these preferences and/or judgments. Communications errors and malfunctions of sensors are two reasons that sensor collective decisions have not been developed.

The distribution and management of electricity in national network grids is a serious problem that produces blackouts that cause significant economic harm and dislocation. Although recent problems seem to have been caused by "benign" errors associated with overloading nodes and links, solutions to these problems have focused on attenuating errors and restabilizing the transmission of electricity once networks have broken down. What is needed is a flexible methodology and system to prevent network breakdowns from occurring. This solution would allow the network to sustain the flow of throughput and minimize vulnerability to destabilizing events. This type of solution is important for dealing with terrorists who could initiate cascading "benign" errors into a malicious cyber attack on the United States.

Accordingly, what would be desirable, but has heretofore not been provided, is a system and method for overcoming decision-making and communications errors to produce expedited and accurate group choices, which overcomes the aforementioned shortcomings.

SUMMARY OF THE INVENTION

The present invention provides a system and method for overcoming decision-making and communications errors to produce expedited and accurate group choices. The system of the present invention includes a plurality of computing systems interconnected by a communications network, each of the plurality of computing systems including a user interface for allowing communication with a voter at each computing system; an agenda manager module for creating and presenting at least one question to be voted on to each voter using the user interface; means for calculating a voting termination point based upon vote scoring methods and a voting objective; a user manager module for controlling interactions between each voter and receiving votes up to the voting termination point; and a report manager module for processing the votes by applying a plurality of vote scoring methods to produce a collective group decision that is resilient to errors. A common data exchange is provided for allowing communication between each of the modules. The invention can be implemented on a plurality of computing devices connected by a network, wherein voters can vote using the computing devices. The devices could be wirelessly connected, and could be mobile.

The present invention further provides a method for producing an error-resilient collective group decision from a plurality of voters on a communications network. The method comprises the steps of: establishing a voting agenda having at least one of question to be voted on; determining a voting objective; presenting the voting agenda to each of the plurality of voters; calculating a voting termination point based upon vote scoring methods and the voting objective; allowing each of the plurality of users to vote; receiving votes until the voting termination point; and processing the votes with a plurality of vote scoring methods to produce a collective group decision that is resilient to errors.

The present invention also provides a method for deploying resources. The method comprises the steps of: providing a communications network interconnecting a plurality of voters with a command center; issuing a voting agenda from the command center to each of the plurality of voters; calculating a voting termination point based upon vote scoring methods and a voting objective; allowing the voters to vote; terminating voting at the voting termination point; processing the votes using a plurality of vote scoring methods to produce a collective group decision; and deploying resources based upon the collective group decision.

The present invention further provides a method acquiring data from a plurality of sensors. The method comprises the steps of: providing a communications network interconnecting a plurality of sensors with a center processor; determining a plurality of vote scoring methods; calculating a data acquisition termination point based upon vote scoring methods and a voting objective; acquiring data from the plurality of sensors until the data acquisition termination point; and processing acquired data using the plurality of scoring methods to produce a collective group decision.

BRIEF DESCRIPTION OF THE DRAWINGS

Other important objects and features of the invention will be apparent from the following Detailed Description of the Invention taken in connection with the accompanying drawings, in which:

FIG. 4C is a flowchart showing processing logic of the voter identification module of FIG. 4A.

FIG. 20 is a graph showing the effects of false positives on three voting methods.

FIG. 21 is a graph showing the effects of false positives on three voting methods.

FIGS. 27A-27B are graphs showing comparisons of the probabilities of producing error-resilient outcomes for three scoring methods and the effects of time on homogeneous and heterogenous preferences.

DETAILED DESCRIPTION OF THE INVENTION

Figure 1:
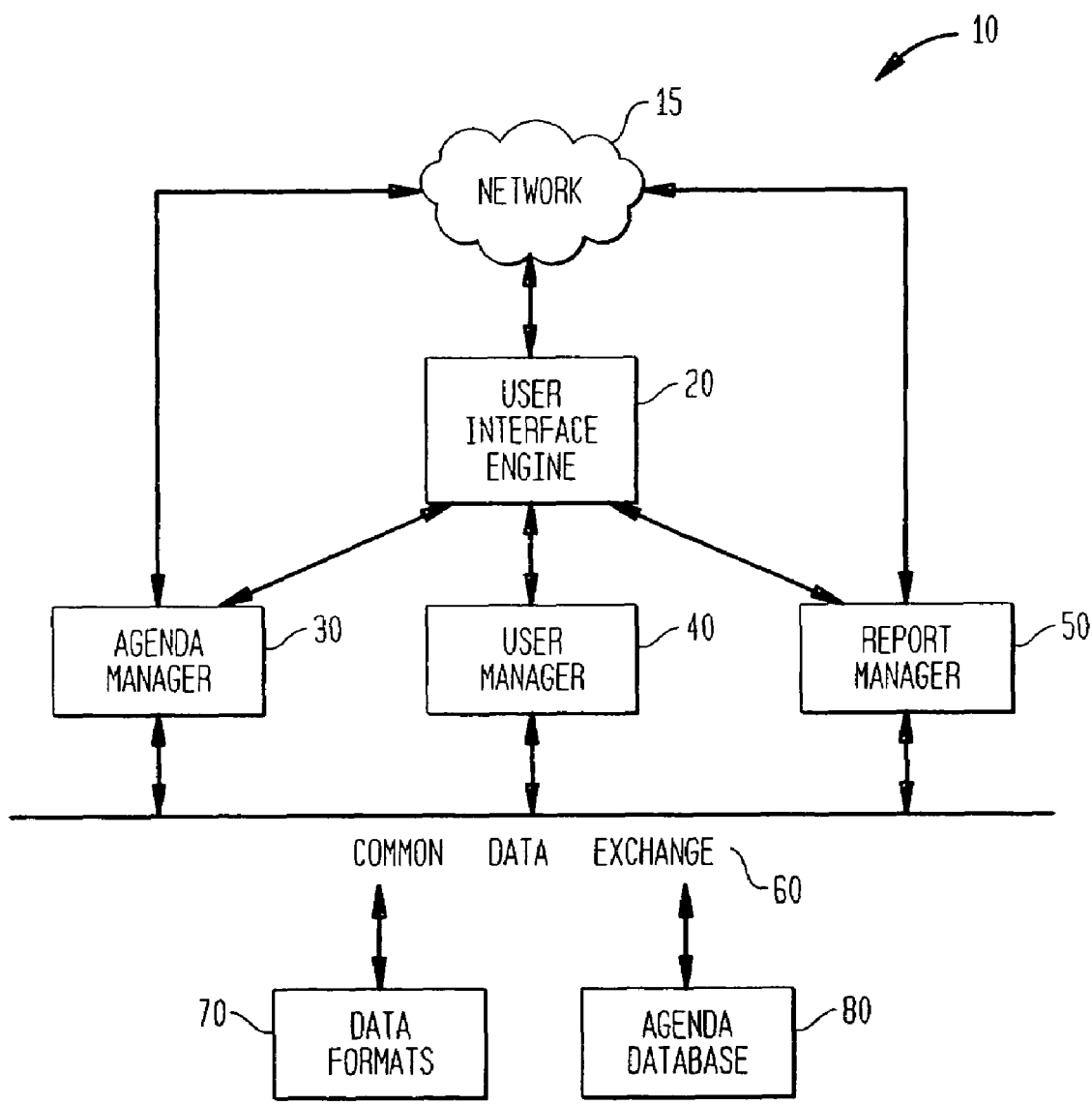
FIG. 1 is a diagram showing the components and overall architecture of the system of the present invention for group decision making.

The present invention relates to a system and method overcoming decision-making and communications errors to produce expedited and accurate group choices. The invention provides collective outcomes that are resilient to communication and decision making errors, and which are provided with a minimum wait time (referred to herein as "error-resilient" and "waitless," respectively). The system comprises a user interface engine that provides a channel to the features of the present invention, an agenda manager module for creating and presenting questions, a user manager module that controls interactions with user who request questionnaires, submit response data, and request access to analytical results, and a report manager module that identifies collective outcomes that are resilient to error and/or that weight individual votes to optimize the group's performance in producing one or more correct or optimal collective choices.

A common data exchange using one or more data formats allows communication between each of the modules. Error resilience and optimization can be achieved separately or together, depending on the decision task. The invention can operate in client-server and/or peer-to-peer mode, and enables analysts to save time, money, property, and lives by inferring a collective outcome despite missing voting data and/or by weighting incoming votes to optimize collective performance despite missing voting data. The present invention includes synchronous and asynchronous modes of interaction, communication, and analysis of collective choice results.

The present invention extracts and uses information from the application of mathematical algorithms for scoring voting data derived from different voting methods and statistical and analytical algorithms that describe the conditions under which the scoring algorithms produce error-resilient, waitless, optimized, decisive, and/or tied collective outcomes. The extracted information is used to produce new knowledge about collective choice processes that can provide insight to individuals in computer-mediated groups to design and interpret collective decisions that enable them to produce expedited and/or optimized collective outcomes.

The present invention allows users to gain insight into means for overcoming communications and individual decision making errors to identify error-resilient and/or optimal collective choices in interpreting collective outcomes. These insights may be produced in completely automated mode in which the user interface engine module finds error-resilient and/or optimal collective outcomes and takes immediate followup action to carry out and/or implement the collective results and/or to conduct followup queries to learn more from some or all of the respondents on an antecedent collective decision. In addition, these insights may be presented to deliberating human or node users to browse and select options for followup consistent with their goals and decision procedures.

The following intuitive example illustrates the logic of the invention. Suppose 10 voters (humans or computer-mediated devices such as sensors) are choosing between A and B by sending in a single vote for one of these two choices. If the outcome of the collective decision is decided by majority rule and six votes have already been received, the current collective outcome (A) is final and decisive. A is a waitless and error-resilient collective outcome because the outstanding votes cannot possibly change A's victory—even though they may change the score. The present and unique invention enables decision makers to gain such insights when the set of choices contains more than two choices, when these choices are rated on multiple dimensions, and when the number of voters is fixed or variable.

Glossary of Terms

The following descriptions are presented to clarify the features of the present invention for overcoming decision making and communications errors to produce group choices.

A voting system includes the following components:
   Vote Endowment: the number of votes individuals have to express their preferences.
   Vote Allocation: constraints placed on the distribution of the vote endowment. Typically, these constraints include no saving or trading of votes.
   Vote Aggregation: criteria such as plurality, majority, or unanimity for pooling votes to produce a collective outcome.

Each voting system component can be weighted to regulate the production of collective outcomes. Vote endowments can be weighted by role or perceived or measured performance. For example, a leader may be given enough votes to veto (or stop) or dominate (or dictate) the production of a collective outcome. Or individuals with high or low competence (measured by or attributed to their performance) can have their votes weighted accordingly. Vote allocations can be weighted by re-scoring ratings or rankings under an alternative scoring method. For instance, if ordinal preference data processed under Condorcet scoring (which counts the number of times that each choice defeats every other choice across voter preference orders), the winner is the choice with the most victories. If the same ordinal data are re-scored under Copeland scoring (which subtracts the Condorcet scores in each binary choice relationship to find a net measure of popularity), the winner is the choice with the highest net score. In both cases, the weight or affect of individual votes on the production of a collective outcome can be changed. Vote aggregation can also be weighted by analyzing the affects of uncollected votes on in existing collective outcome.

For example, if the current vote count shows that one choice has a majority of collected votes, analysis can determine if the majority can be reversed by uncollected votes. If the existing majority cannot be reversed by any configuration of outstanding votes, it can be interpreted as the outcome can be considered as final even though all votes have not been received or processed. In some cases, the anticipated final outcome may be an indecisive or tied result. Outcomes that predict victories, ties, or indecisive results are "waitless." If delays in receiving votes are caused by benign or malicious communications error, waitless outcomes also produce an error-resilient effect by allowing the group to overcome communications error to reach a consensus.

Turning now to the drawings, FIG. 1 is a diagram showing the components and overall architecture of the system of the present invention, indicated generally at 10. The system 10 comprises a user interface engine 20, an agenda manager module 30, a user manager module 40, a report manager module 50, and a common data exchange 60. Each of the modules 30, 40, and 50 can communicate with each other using the common data exchange 60 and one or more data formats 70. An agenda database 80 is provided for storing voting agendas. The user interface engine 20, agenda manager module 30, and report manager 50 can communicate with a network 15, which could comprise an intranet, local area network (LAN), wide area network (WAN), the Internet, or any other suitable communications network. Further, the network 15 could be a wired or wireless network. The system 10 could be implemented in database-neutral, network-neutral, and/or platform-neutral environments.

The system 10 generates and communicates insights into group decisions and provides guidance to users at each stage of the process of group decision making. The system 10 could be implemented in Microsoft Windows (a trademark of Microsoft), Linux, Unix, Java (a trademark of Sun Microsystems), and PHP with databases such as Access, SQL Server, Oracle, MySQL, and Postgres. The network 15 allows communication between two or more nodes, which could comprise hosts or servers connected to a computer network. Each node could comprise a personal digital assistant (PDA), personal computer (PC), thin client, workstation, server, or any other desired computing system.

Operation of the present invention involves the use of the user interface engine 20 on a node to send commands that create an input data object in the agenda manager 30. The agenda manager 30 also receives commands from the user interface engine 20. The agenda manager 20 communicates with the agenda database 80 to create the input data object. In a preferred embodiment of the present invention, the input data object comprises one or a number of questions relevant to a collective decision to be made by a group. Such sets of questions are commonly known in the art as an agenda. Additionally, the input data object also includes settings that determine which users have access to the agenda, and which are communicated to the user manager module 40. The user manager module 40 regulates access of each of the nodes to the input data object.

The input data object is transmitted over network 15 to one or more nodes, which could be arranged in a centralized or a decentralized mode. The input object appears on a user interface generated at each node by the user interface engine 20, for each node on the network 15 that has access to the agenda. Users of each node then answer the questions posed by the agenda by filling in fields. Tile answers may change the order of the questions or the types of questions presented. Such contingencies are programmed in the input data object. The completed input data objects are then communicated back to a server or host in centralized mode (FIG. 11) or decentralized mode (FIG. 12), and are stored in agenda database 80. From time to time, the report manager module 40 accesses the database 80 and creates an output data object that incorporates the stored answers to the questions. The report manager module 50 utilizes report templates that process data as it is stored in the database 80. A report template for error-resilience determines if the current outcome is error resilient. If the collective outcome is not error resilient, the report manager module 50 can notify users who have a notification privilege that an error-resilient result has not been found. Additionally, the report manager module 50 can report the likelihood of finding an error-resilient collective outcome. If an error-resilient outcome is identified, the report manager module 50 reports the result on the interfaces of nodes of users who have been granted access to the report. If the decision objective of an agenda is to identify one or more correct or optimal choices, the report manager module 50 uses a report template to weight individual votes to optimize collective performance.

Each of the modules of the system 10 processes input data and communicates the results among users of the system 10 to facilitate insight and enable the users to implement timely and accurate collective decisions. Communication from one object to another is handled via communications settings in the user interface engine module 20. The system 10 provides an environment that is transparent to a user, provides synchronous and/or asynchronous analysis of incoming votes to identify error-resilient collective outcomes and/or to weight individual votes to optimize the probability of making one or more correct or optimal collective choices.

The user interface engine 20 issues commands to the agenda manager module 30, the user manager module 40, and the report manager module 50 to orchestrate the production of data collection and reporting of error-resilient and optimal collective outcomes. For example, the user interface engine 20 includes options for using multimedia, mechanical, touch-screen, and optical devices such as mice, pens, and keyboards as well as voice and neurological mechanisms to enter data into the modules and receive output. The user interface engine 20 uses different media suitable to the task at hand and provides redundant communication when necessary.

Figure 2:
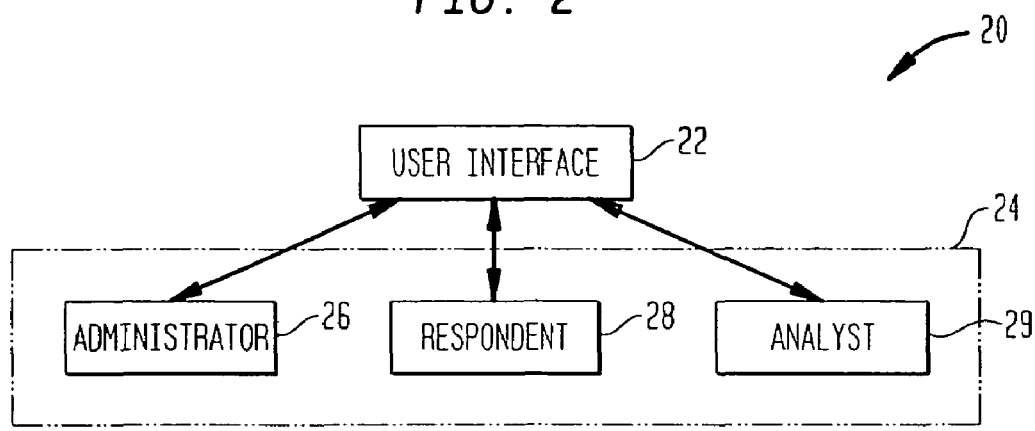
FIG. 2 is a diagram showing the user interface engine of the present invention in greater detail.

FIG. 2 is a diagram showing the user interface engine 22 of the present invention in greater detail. The engine comprises a user interface 22 that could be programmed in any suitable programming language, and a plurality of users 24. The users 24 could comprise an administrator 26, a respondent 28, and an analyst 29. Further, the users 24 could be human beings, a process or node acting as if it were a human being, or a physical object programmed to act like a human being. The administrator 26 has exclusive privilege to create and manage agendas, users, and reports. In creating agendas, the administrator 26 can define a list of users who can answer questionnaires and/or view reports.

Users who are given the right to answer questionnaires and/or view reports can take on an administrative role in creating their own agendas, users, and reports. By default, these derivative privileges do not apply to the agendas, users, and/or reports of the original agenda creator or other users. Further, the user interface engine 20 sets the permissions that govern access to definitions of gradations of individual identity for users from complete anonymity to complete identification as well as agendas and reports. All of these settings are passed on to the user manager module 40 of FIG. 1 to implement in handling transactions and interactions with users.

Figure 3A:
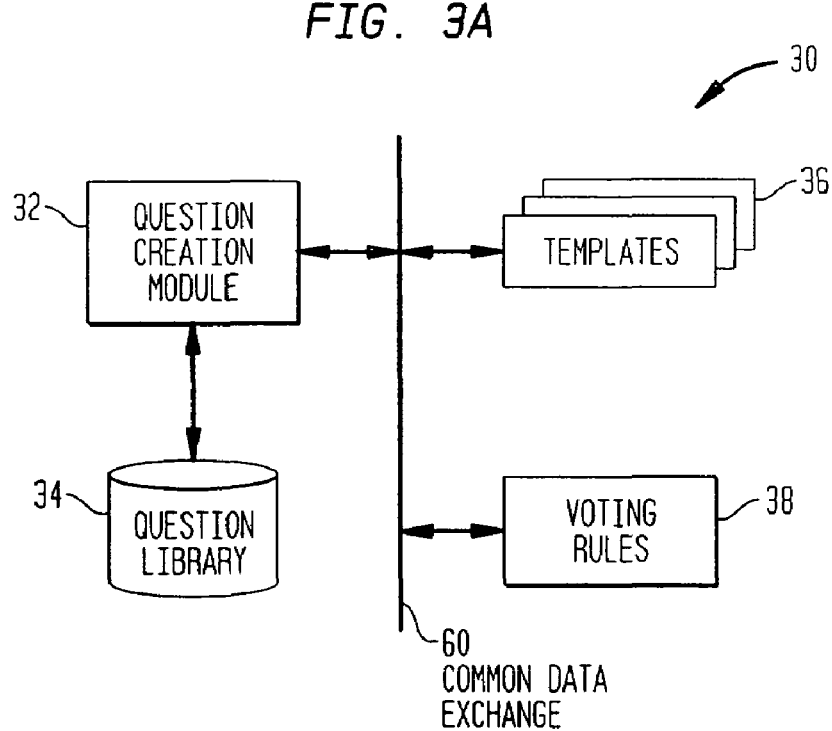
FIG. 3A is a diagrams showing the agenda manager of FIG. 1 in greater detail.

FIG. 3A is a diagram showing the agenda manager module 30 of FIG. 1 in greater detail. The agenda manager module 30 comprises a question creation module 32, a question library 34, templates 36, and voting rules 38, each of which can communicate via the common data exchange 60. The question library 34, templates 36, and voting rules 38 provide a repository for storing individual questions and questionnaire templates, as well as analytical rules for applying techniques that use multiple scoring methods to identify collective outcomes that are resilient to communications error, and/or to weight individual votes to optimize the probability that a group renders one or more correct or optimal collective choices. The agenda manager module 30 also comprises access lists and protocols that regulate the right of users to answer questionnaires and see collective outcome results.

The agenda manager module 30 handles editing and presentation of questions and options for user selection of choices. The editing facility creates an agenda and a list of agenda items to be voted on. The agenda can be created by brainstorming to create a list and then evaluate it to identify items that should constitute the agenda. Further, the agenda can be created by selecting a pre-existing template or model agenda for a task. Agendas created from scratch can be saved as templates and agendas set up from a template 36 can be either edited or modified to fit a situation. Agendas can be initiated locally or remotely by users who have permission to invoke the process of collecting and analyzing voting information. Agendas can also be created in an interactive, dynamic way depending on the responses of individuals and/or the results of collective choice analysis of an error-resilient and/or optimal collective outcome.

The agenda manager module 30 provides a mechanism for collecting and distributing voting information including animation, video (real-time or stored), graphics, sound, hologram, or any other digital or analog form for representing information. Further, the agenda manager module 30 sets the conditions for communications security which include protocols and techniques for user authentication, secure transmission of vote and report information, and database security. The user manager module 40 of FIG. 1 enforces these settings.

The agenda manager module 30 provides a means for an individual user or a group of users to initiate a voting process by inputting data that create the initial conditions that govern the production of a collective choice. These conditions include identification of an agenda (including an agenda name, list of agenda questions, agenda background descriptions, multimedia attachments, beginning and ending time of the decisions, voter identification, participant privileges, and voting objective (error resilience or optimization). Voter identification and participant privileges are entered into the agenda database 80 of FIG. 1 and managed by the user manager module 40 and the report manager module 50 of FIG. 1.

A feature of the agenda manager 30 is the creation and scheduling of sets of questions for distribution to users to gain their responses. The questions are stored in the question library 34. This feature is useful because the question library 34 allows users to use existing templates with or without modifications, create new questions, and/or use selected questions from the library. Scheduling allows a user serving as administrator to set the beginning and end times for an agenda as well as the list of participants and their privileges. These scheduling attributes of an agenda are entered into the agenda database 80 of FIG. 1 and regulated by the user manager module 40 and report manager module 50 of FIG. 1. These features can be invoked using commands entered using common data formats over the common data exchange 60.

The question creation module 32 provides for the linking of questions and question sets to reports generated by the report manager module 50 of FIG. 1, to provide information about response rates and attitudes over time. This information is valuable because it enables the user to make intelligent use of historical information stored in the agenda database 80 of FIG. 1. The templates 36 of the agenda manager module 30 allow for the setting up of error resilient and optimized voting processes. The templates 36 enable a user to configure the system to make use of methods of voting appropriate for an error-resilient and/or optimization decision task. The voting rules 38 allow for the application of different voting rules or scoring algorithms to answer different questions about the same data set.

The agenda manager module 30 of the present invention provides a means for an individual initiator or a group of initiators to input data that create the initial conditions which govern a collective choice process. These conditions include identification of an agenda (including an agenda name, list of agenda items, agenda and agenda-item background descriptions, and multimedia information attached to the agenda and agenda items), timing of the decisions (when they begin and end and whether they are synchronous or asynchronous), and determination of participants. Attributes of the agenda such as the degree of voter privacy and authentication standards are set in the agenda module, but enforced in the user manager module.

The agenda manager module 30 also provides a menu-driven system for setting tip an agenda topic, adding agenda items, and attaching multimedia files to agenda items. This feature is useful because it allows anyone to save time in making use of background information related to a time-critical decision. This functionality makes it possible to use different combinations of media for input and output to match the data entry requirements of the module with the needs and physical capabilities of users. The integration of multimedia information facilitates the use of industry standard files for graphics, images, animation, and video that can be located any place on a network. Further, this feature is significant because it provides a level playing field of information used to render decisions. The significance of this feature is not only that decision makers can see and hear the same information in a timely manner, but that this information serves as a basis for improving the efficiency of collective action as well as the effectiveness of deliberation and debate.

A related feature of privilege setting in the agenda manager module 30 of the present invention is the option of previewing and reviewing collective choice results. The previewing privilege determines if a participant can gain access to the review module before or after all participants have cast their votes. Preventing access to collective choice data and analysis before all votes are collected and processed is useful in prohibiting participants from monitoring incoming votes to obtain information that can be used to bribe, pressure, or persuade voters. Restricting access to collective choice data even after all votes are in can be used in private polls in which data are considered to be confidential or sensitive.

Another related feature of privilege setting in the agenda manager module 30 of the present invention is access to a notifications option. This option, contained in the report manager module 50, is selected in the user interface engine 20 to control access to information about an ongoing collective choice process that is derived from processing inputs into the data collection module, where they are processed and output as inputs in the review module, where a decision analysis module within the present invention analyzes patterns and gleans insights for users that are output within the review module. This feature is useful for setting up notification alerts related to the goals of producing error-resilient and/or correct or optimal collective outcomes. Users with this privilege can receive updates how likely it is that a collective choice process will produce an outcome that satisfies one or both of these decision objectives. These likelihoods may be derived from background Monte Carlo simulations that model different communications error conditions as well as the probability that decision makers make correct or optimal conditions. A number of control variables can be used in such simulations, including, but not limited to: the number of voters; the number of choices; the number of dimensions on which the choices are rated; voter preference distribution (including rating scale); voter competence (reliability) distribution; competence (reliability) weighting rules, including linear and non-linear rules; type of voting system; expression method (e.g., One Voter-One Vote (OVOV)); aggregation rule (e.g., plurality); tie-breaking rule (e.g., none, randomized, optimized); voter false positive rate; voter false negative rate; and vote arrival intervals.

If a collective decision is part of a dense sequence of group decisions on the same task(s), techniques such as factor analysis and stochastic dominance can be used to assess the risks of achieving error-resilience or collective optimality. This feature is useful because it allows decision makers to adapt to changing conditions before enough information has been collected to determine if a collective outcome will be error resilient and/or optimal. This insight is particularly useful when it is projected that a collective outcome will be a tie or an indecisive result. Knowing that these projected outcomes are likely allows the user of the user interface engine module to take immediate action to gain more information and/or to begin to implement contingency plans.

Figure 3B:
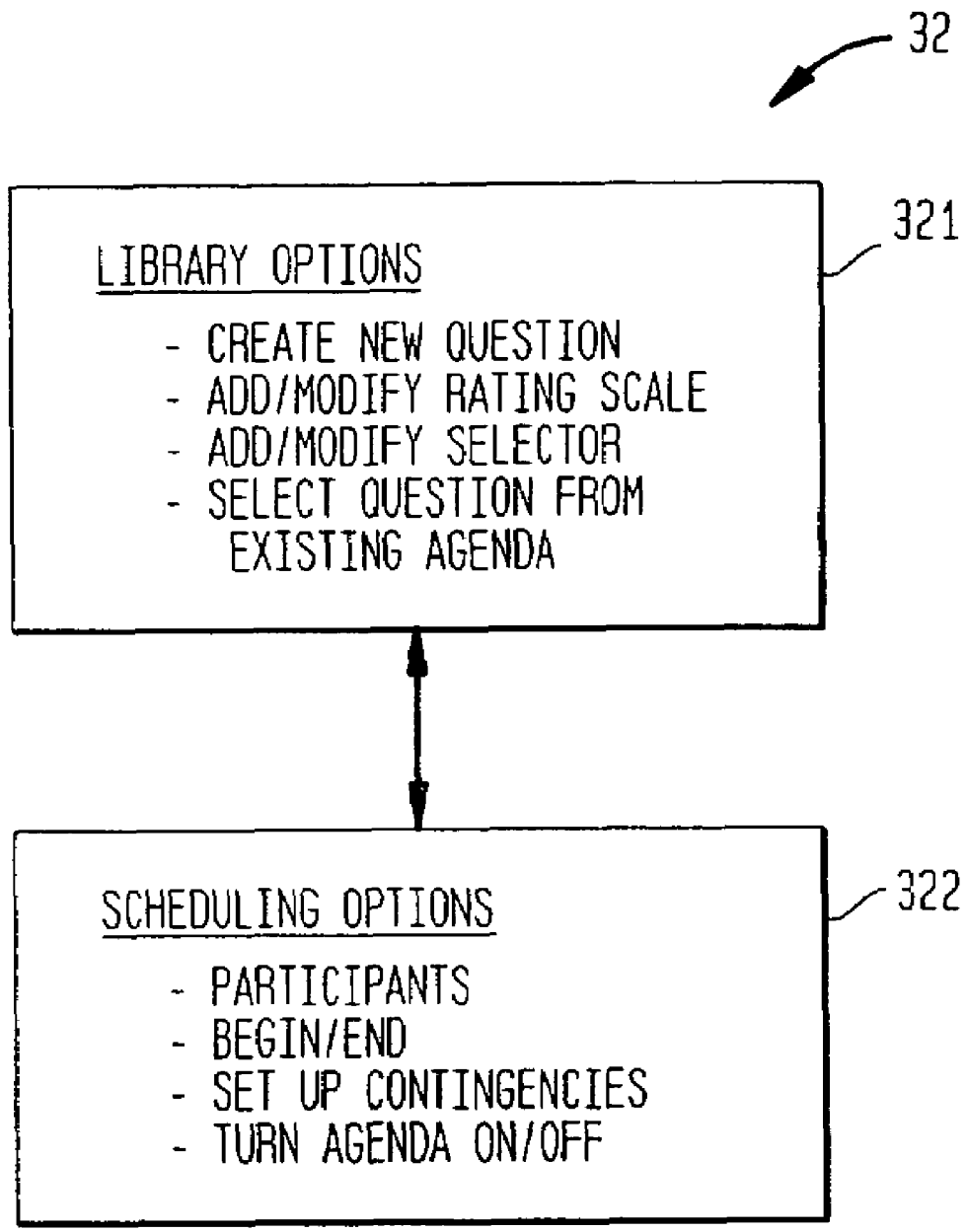
FIG. 3B is a diagram showing the question creation module of FIG. 3A in greater detail.

FIG. 3B is a diagram showing the question creation module 32 of FIG. 3A in greater detail. The question creation module 32 allows for a number of options and parameters regarding question creation and scheduling to be set. A number of library options 321 can be ascertained from the user, and include: creating a new question, adding or modifying a rating scheme, adding or modifying a selector, and selecting questions from an agenda. These options and parameters can be stored in the question library 34 of FIG. 3A. Additionally, the question creation module 32 allows the user to define a number of scheduling options 322. Such options include, but are not limited to, the identities of participants in desired questions, the starting and ending times for voting, contingency parameters, and whether one or more agendas is activated (turned on) or deactivated (turned off).

Figure 3C:
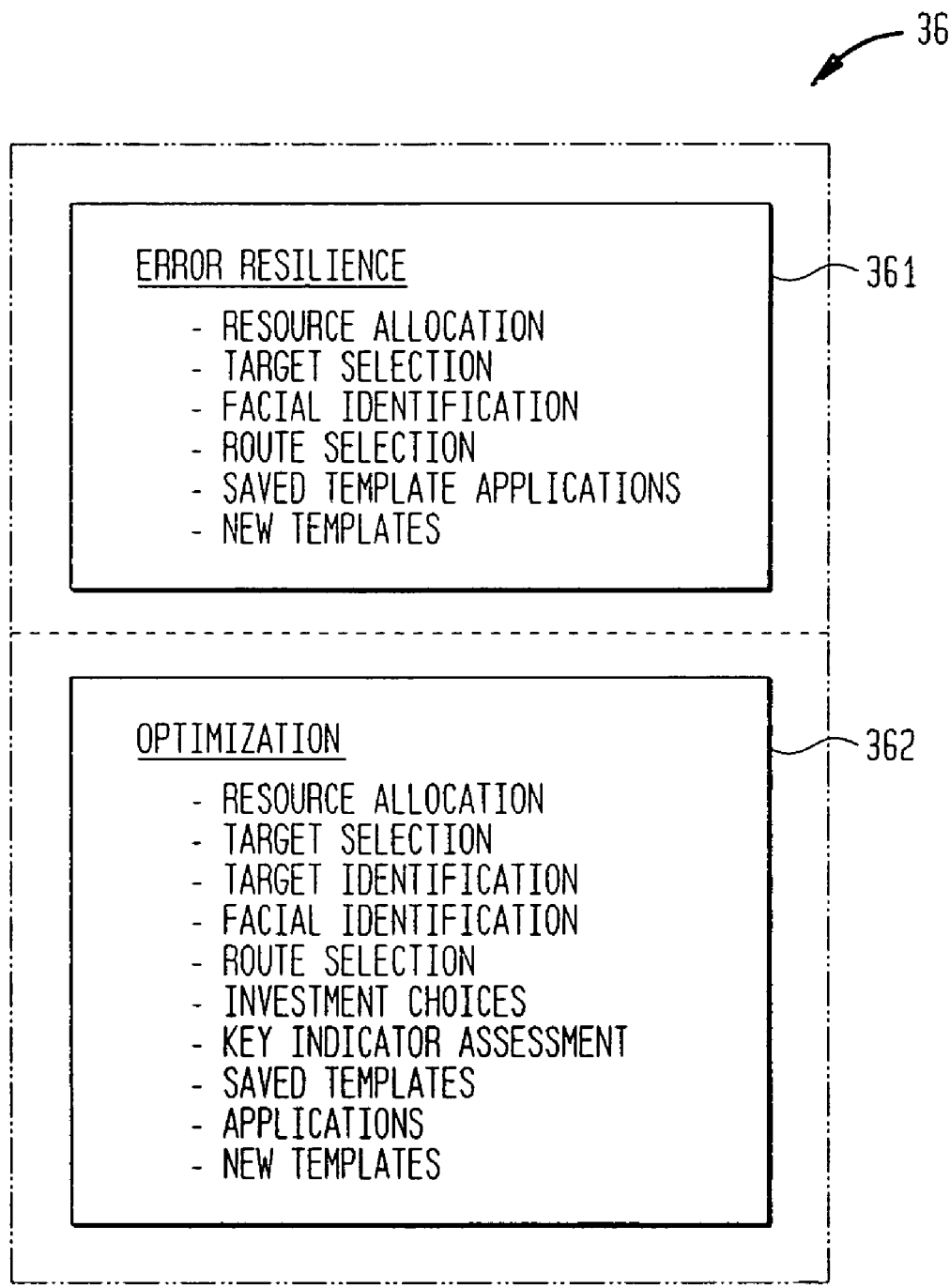
FIG. 3C is a diagram showing the agenda templates of FIG. 3A in greater detail.

FIG. 3C is a diagram showing the agenda templates 36 of FIG. 3A in greater detail. As mentioned earlier, the templates 36 allow a user to configure the system to make use of methods of voting appropriate for an error-resilient and/or optimization decision task. The templates 36 are also useful when the user can only approximate the expected number of participants with an order of magnitude number or a possible range of participants. For example, if 100 participants are expected, but the number increases to 10,000 or decreases to 20, the templates 36 adapt to these conditions and implement the most feasible and efficient method of computing collective outcomes. In addition, this feature can use historical or simulation information to estimate the likelihood that error-resilient collective outcomes can be produced. This information allows the user to make informed choices about implicit risks associated with setting lower and upper limits on the number of participants. As shown in FIG. 3C, the templates 36 could comprise error-resilient templates 361 and optimization templates 362. The error-resilient templates 361 collect information relating to resource allocation, target selection, facial identification, route selection, saved template applications, and new templates. The optimization templates 362 collect information relating to resource allocation, target selection, target identification, facial identification, route selection, investment choices, key indicator assessments, saved templates, applications, and new templates.

Figure 3D:
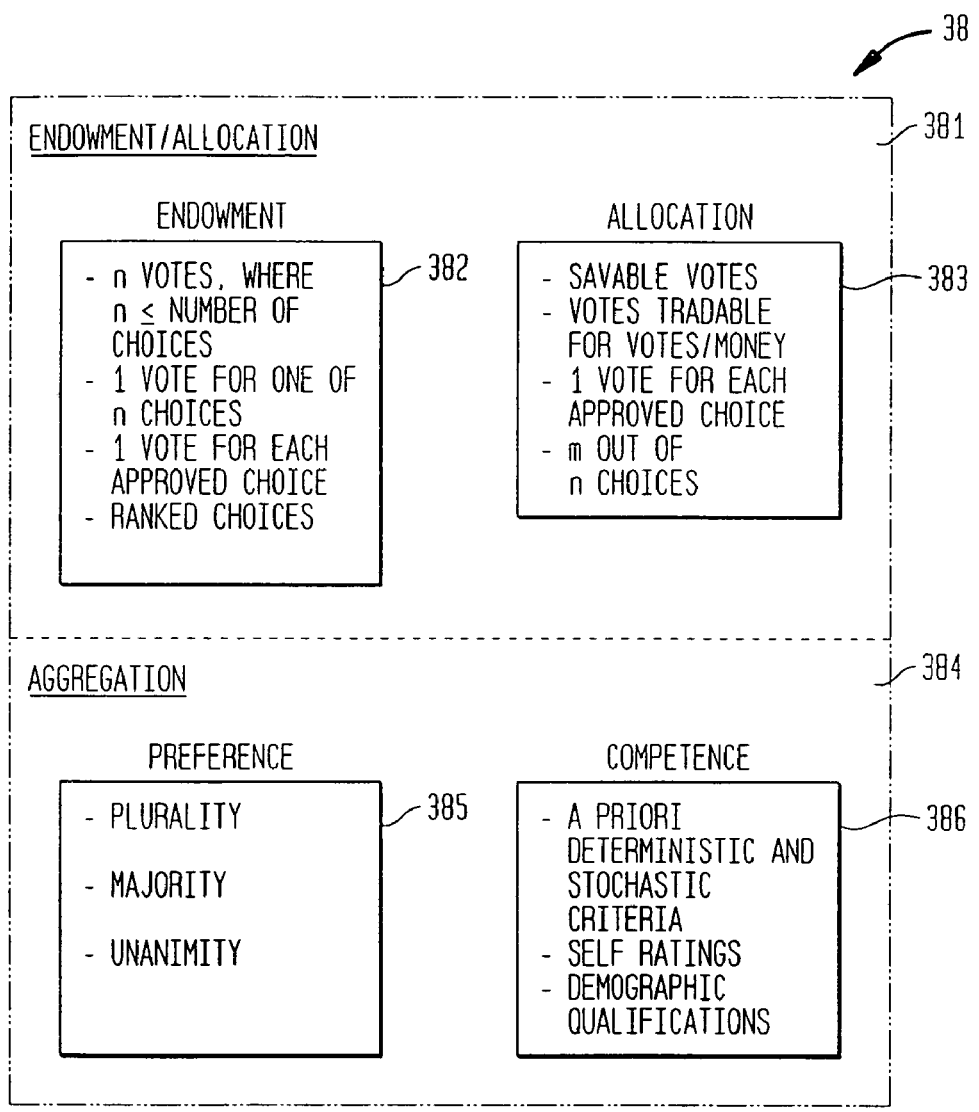
FIG. 3D is a diagram showing the sample voting rules of FIG. 3A in greater detail.

FIG. 3D is a diagram showing the sample voting rules 38 of the agenda manager module of FIG. 3A. The voting rules 38 could comprise rules 381 tailored to endowment and allocation, and rules 384 tailored to aggregation. The endowment rules 382 could process votes in accordance with one or more endowment rules, such as: n votes, where n is less than or equal to the number of choices; one vote for one of n choices; one vote for each approved choice; or ranked choices. The allocation rules 383 could process votes in accordance with one or more allocation rules, such as: savable votes; votes tradable for votes or money; one vote for each approved choice; or m out of n choices. The preference rules 385 could comprise plurality, majority, or unanimity aggregation rules. The competence rules 386 could comprise a priori deterministic and stochastic criteria, self-ratings, and demographic qualifications. More than one voting rule can be implemented to allow for analyzing voting processes with more than one possible aggregation rule. For instance, under approval voting (which allows users to cast one vote for each approved choice), conventional aggregation rules such as plurality, majority, and unanimity have different properties. For example, under approval scoring, ties can occur under plurality, majority, and unanimity rules. In addition, these rules can be defined on the basis of the total number of approval votes cast or the total number of voters who cast an approval vote for a choice.

Any desired voting rule, or a combination thereof, could be implemented by the present invention, depending upon voting circumstances. For example, plurality scoring could be implemented to reveal which choice was most frequently selected as the top choice in voter preference orderings. Condorcet scoring could be implemented to reveal which choice was most frequently preferred to every other choice in binary comparisons across voter preference orderings. Copeland scoring could be implemented to show how much more each choice was preferred to every other choice in binary comparisons across voter preference orderings. Approval scoring could be implemented to reveal which choice(s) was most frequently approved by voters. (Mackenzie, D. "May the Best Man Lose," Discover Magazine, November, 2000.) Such voting rules can be used to resolve ties or scrutinize indecisive collective outcomes. In the case of ties, for instance, if there is a tie under approval scoring, Condorcet or Copeland scoring algorithms can be applied to measure the strength of support for the tied choices.

Another feature of the analysis of incoming votes under different scoring methods is using more than one voting method to identify error-resilient collective outcomes and/or to weight votes to optimize the collective probability of making a correct or optimal collective choice. This feature can be used if voters have rated all of the choices in an agenda but only "voted for" the top choice in their preference ordering. In this case, plurality votes lose information that could be used to identify error-resilient outcomes. Reprocessing the voting inputs in Borda, Condorcet, or Copeland scoring can make it possible to reveal error-resilient collective outcomes that would otherwise go undetected.

Another feature of the analysis of incoming votes under different scoring methods is that weighting of votes to optimize the probability of rendering one or more correct or optimal collective choices enables the group to improve their performance. For instance, weighting individual votes works efficiently to identify a single correct choice under plurality scoring, using a deterministic model ln (p/1−p) where p is the individual voter's probability of making a correct choice and 1−p is the individual voter's probability of making an incorrect choice. (Shapley, L. and B. Grofman, Optimizing Group Judgmental Accuracy in Presence of Interdependencies," Public Choice, 1984). However, if the goal is to select two or correct choices, plurality scoring will not perform as well as weighting individual approval votes by individual competence (Pinkham, R. and A. Urken, Competence and the Choice of a Voting System, unpublished manuscript, 1991).

This feature is also useful when the objective of a collective decision is to assess risky choices under uncertainty. In this model, individual competencies would be estimated by a probability plus a stochastic error term. Then, as in the deterministic model, individual votes would be weighted according to the contribution of an individual voter to reduce the collective risk across all of the choices. This property of stochastic dominance of collective performance is important because, unlike the deterministic model, it applies to a weaker, but general concept of dominance than is found in deterministic game theory, with its state-by-state dominance. The stochastic model can be defined to be independent of complex and sometimes indeterminate tradeoffs associated with voter utility functions. This is particularly valuable for error-resilience because the real-time computation of voting results makes it infeasible to integrate utilitarian tradeoffs into rational decision making (Danthine, J. P. and J. B. Donaldson, Intermediate Financial Theory, Prentice-Hall, 2002).

Another feature of the analysis of incoming votes under different scoring methods is the use of deterministic or stochastic measures of competence to weight individual votes to make it feasible to identify error-resilient collective outcomes that would otherwise not be detected. This feature integrates competence and error-resilience (Urken, A., "Time, Error and Collective Decision System Support," Proceedings of the International Conference on Telecommunications Systems, Oct. 5, 2003.)

Another feature of the analysis of incoming votes is the application of multidimensional gap analysis to identifying error-resilient collective outcomes with and without the weighting of individual votes by stochastic and/or deterministic measures of competence. Collective gaps exist whenever voters rate and/or vote for choices scaled on more than one dimension. For example, if voters rate a product's attribute on importance and quality, the individual ratings for quality can be weighted by the rating for importance to create a weighted individual quality ratings. These weighted ratings can then be used to compute a weighted collective outcome. The normalized scores of the weighted and unweighted collective outcomes will then reveal shares of the total collective score for each choice. When the weighted and unweighted shares of the total score are the same, the gap equals zero and provides a measure of equilibrium along the dimensions of product importance and quality for the rated attributes. When the unweighted shares of the total score on particular attributes are larger than the weighted shares, the results indicate a positive gap: that these attributes are exceeding the collective expectations of product attribute quality weighted by product attribute importance. However, when the weighted attribute shares of the total score are smaller than the unweighted attributes shares of the total score, the results indicate a negative gap: that these attributes are failing to meet the collective expectations of product attribute quality weighted by product attribute importance.

This feature is useful because in some cases, a collective choice may not be error-resilient on one dimension, but be error-resilient on multiple dimensions. For instance, a collective outcome based on data about product quality might not be error-resilient, but, when combined with product attribute importance ratings, the collective gap results could be error-resilient. Additionally, this feature is also useful when individual votes have been weighted using deterministic or stochastic models of individual and collective competence. Weighting individual votes according to voter competence can reveal error-resilient collective outcomes on a single issue. Extending the weighting of votes to more than one dimension can increase the scope of possibilities for discovering error resilient collective outcomes. Further, this feature is particularly useful when voters have varying competencies on different dimensions. For instance, if a product were evaluated on the dimension of the number of attribute features and price competitiveness, voters who demonstrated a knowledge of the attributes of competing products and their pricing would have their votes weighted higher than voters who were ignorant of competing product feature lists and prices. Applying such weights and finding error-resilient collective outcomes produces more precise and accurate guidance in interpreting collective outcomes.

Figure 4A:
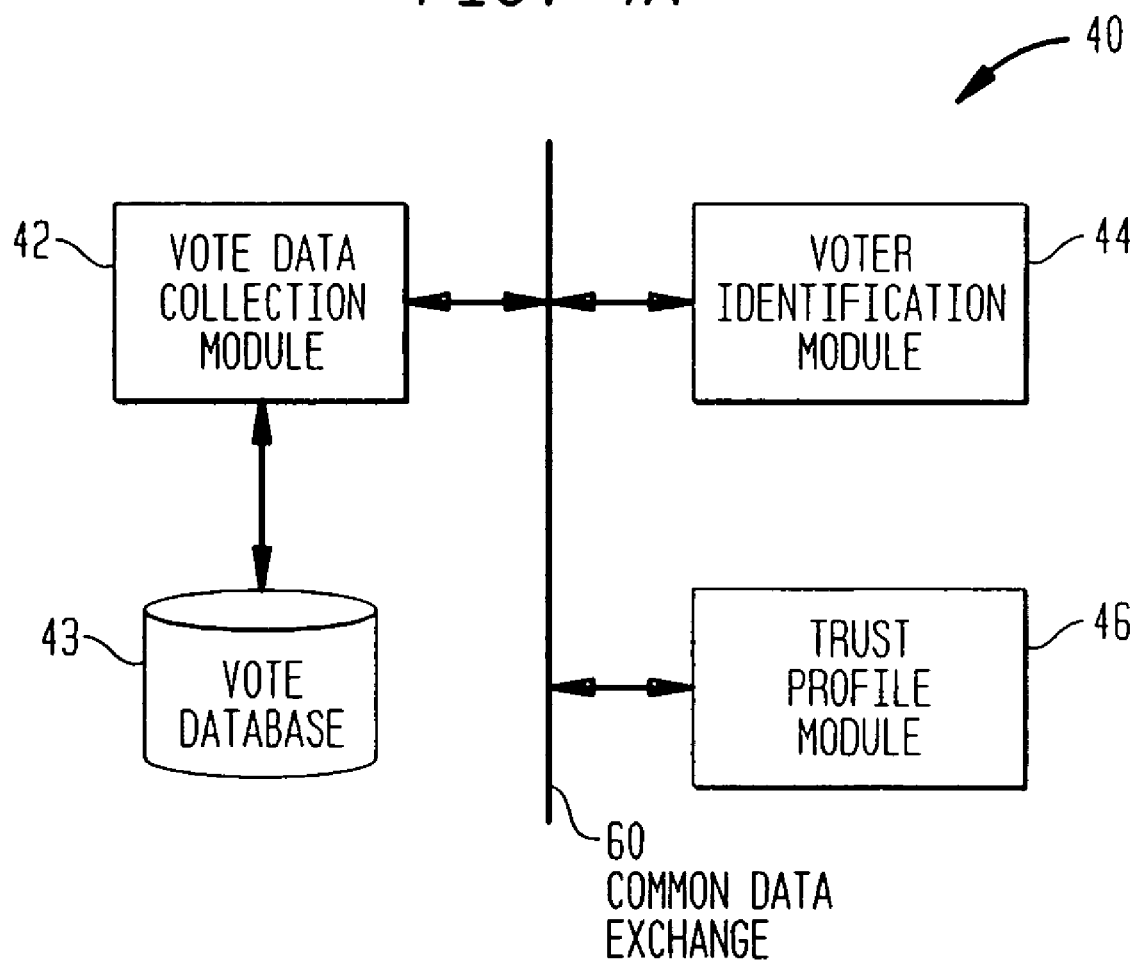
FIG. 4A is a diagram showing the user manager of FIG. 1 in greater detail.

FIG. 4A is a diagram showing the user manager module 40 of FIG. 1 in greater detail.

The user manager module 40 comprises a vote data collection module 42, a vote database 43, a voter identification module 44, and a trust profile module 46. Data can be exchanged between each of these components using the common data exchange 60. The user manager module 40 utilizes settings from the agenda manager module 30 of FIG. 1 to administer agendas. A feature of user manager module 40 is to implement authentication and encryption tools in the collection of data and display of reports. This feature includes authentication options such as encrypted passwords, dynamic passwords (which are updated periodically from a remote server), biometric verification, challenge-response techniques for actively verifying attributes of a user, and other personal and behavioral attributes of voter identification. The vote data collection module 42 encrypts and decrypts voting data transmitted across a network. This feature increases the trustworthiness of the voting process in wired and wireless networks by making it more difficult for malicious intruders or processes (such as worms or viruses) to damage or replace submitted data.

Authentication settings can include plain text or encrypted usernames and passwords, biometric input such as DNA, retinal scans, finger prints, and/or voice prints as well as challenge-response techniques that verify users by Using background or location information. Options for secure transmission include full encryption of messages as well as distributed encryption techniques that allow partial disclosure of user identities and partial sharing of information that is dependent on use identity and authentication. Database security includes implementation of systems for protecting the server against intrusive viruses or users as well as mechanisms for guarding against unauthorized access to the database repository of voting information to users who might otherwise be authorized users of the server or device on which the database is located. Database security standards will vary depending on the architectural implementation of the invention as well as the processing speed, energy capacity, and storage capability of the hardware devices being used.

The voter identification module 44 implements demographic and attitudinal categories to monitor response patterns. These categories are created by the agenda manager module 30 of FIG. 1 and written in the agenda database 80 of FIG. 1. These patterns are used in generating historical reports that facilitate the automatic scheduling of respondent targets for an agenda in the question creation module 32 of FIG. 3A. The same patterns are used to limit participation by category and/or to prevent participants from submitting multiple responses in the vote data collection module 42.

The trust profile module 46 allows trust profiles to be created for users. These profiles are useful in filtering votes in the computation of collective choice results because they provide flexibility in processing votes from respondents with different levels of trustworthiness. This feature enables a user to see differences in collective choice results when the voting data are segmented into trust categories. In some cases, there may be no difference between accepting the collective outcome produced by respondents in the most trusted and least trusted categories taken separately and/or aggregated together. This knowledge enables a user to avoid taking blind risks in interpreting collective outcomes. Further, this feature is important for error-resilient and optimization decision tasks. In each type of task, trust profiles provide flexibility that is important not only to a user, but to others who receive notifications and/or reports from a user. This feature can provide an additional level of information assurance that adds credibility to notifications and reports.

A related feature of the trust profile module 46 is the collective assessments of trust. This feature allows a user in administrative role to use the invention to create and distribute a new agenda using the question creation module 32 of FIG. 3A to reach out to trusted members of a network community to obtain their perception of the trustworthiness of a voter. This information can become part of a trust profile or a modified trust profile stored in the agenda database 80 of FIG. 1 to explore differential impacts on acceptance of collective outcomes for error-resilient and optimization tasks.

Another feature of the analysis of incoming votes is the integration of voter trust profiles with scoring of collective choice results and identification of error-resilient collective outcomes and production of optimized collective competence. The security of the user manager module of the present invention enables a host to assign trust profiles to incoming votes based on full identification of the voter or some degree of quasi-privacy. Illustrative options for identifying voters and defining trusted voter profiles in the present invention are used in the report manager module of the present invention to generate trust-sensitive collective choice results. For example, a user with administrative privileges can set up a report to automatically sort voters into different categories of trusted relationships, set limits on the degree of acceptable trust for the task, and view an instantaneous analysis of the collective results based on these settings. This analysis also shows if the same or consistent collective choice results occur when trust relationships are made more or less stringent. This information would allow a user to make interpretations of collective outcomes that are informed by analysis of the implications of differential trust relationships with voters. This feature adds another dimension of flexibility and sensitivity to the analysis of error-resilience and maximizing the group probability of rendering one or more correct or optimal collective choices. Trust profiles can reduce the risks associated with treating all voters as if they were equally trustworthy. This feature can be used in a centralized, client-server network architecture (FIG. 11) or a decentralized, peer-to-peer network configuration (FIG. 12).

A related feature of this analysis is the ability to analyze voting processes in which the objective is to produce an error-resilient and/or optimized collective outcome that contains a rank-ordering. For example, if the decision task is to achieve consensus on a ranking of the top three choices in an agenda, this feature will allow a user to discover the conditions (including voting system—with multiple aggregation rules, trust profiles, group size, and demographic and attitudinal attributes) under which the decision objective can be satisfied. These features are important because they enable the user to gain broader knowledge about possible collective outcomes. If the decision objective is error-resilience, for instance, these features can increase the likelihood of finding an error-resilient collective outcome. If the decision objective is optimization, these features will expand the scope of possible deterministic and stochastic outcomes that can optimize group performance. In addition, if error resilience and optimization are part of a decision objective, seeing the results for other aggregation rules improves the likelihood that the user will find a solution.

The user manager module of the present invention determines the medium or media that are used for data input and output in the present invention. This module includes options for using multimedia, mechanical, touch-screen, and optical devices such as mice, pens, and keyboards, voice, and neurological data to enter data into the modules and receive output. The user manager module uses different media suitable to the task at hand and provides redundant communication when necessary. This functionality is useful because it enables a person to use voice commands to enter data, but choose among text, graphics, and multimedia representations of data for receiving the output of the modules. This flexibility also allows blind or deaf users to choose interface media that they are comfortable using. Such user needs are also supported by providing signing overlays for obtaining input and displaying output. For example, the needs of users from different linguistic backgrounds are supported by providing either visual or sound overlays that can be set up in the user interface module (and thereby made accessible in the other modules and submodules of the current invention). The same flexibility allows a user to receive redundant output of results for important decisions. For instance, information about the analysis of a collective decision can be disseminated in text, numbers, and graphics in a module, but also sent by voice mail to assure that the recipient receives a message as soon as possible.

Figure 4B:
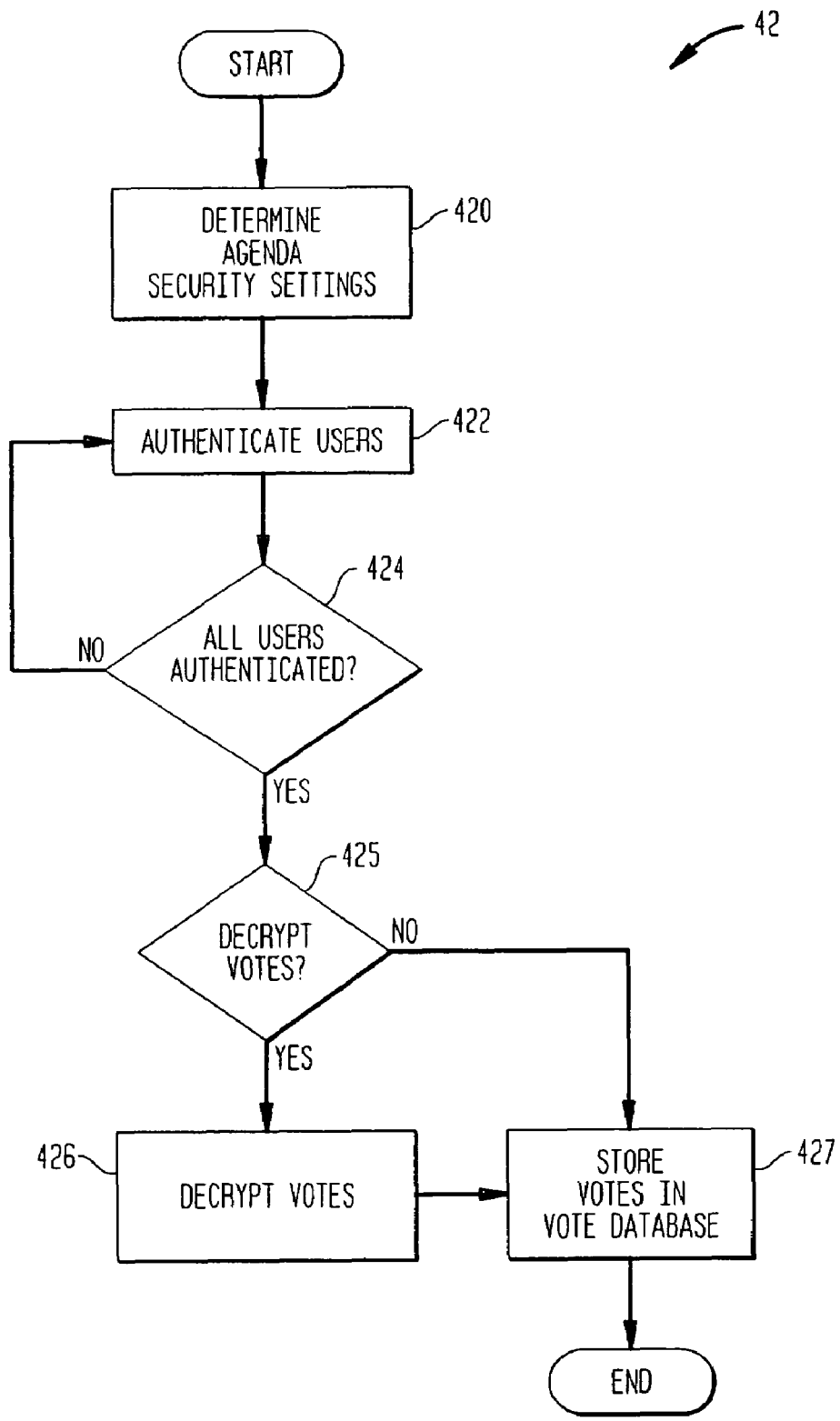
FIG. 4B is a flowchart showing processing logic of the vote data collection module of FIG. 4A.

FIG. 4B is a flowchart showing processing logic of the vote data collection module 42 of FIG. 4A. Beginning in step 420, agenda security items are determined. Then, in step 422, voters are authenticated, using any suitable authentication scheme such as passwords, biometric information, etc. A decision is made in step 424 as to whether all voters have been authenticated. If a negative determination is made, step 422 is re-invoked, so that all voters can be authenticated. If a positive determination is made, step 425 is invoked, wherein a determination is made as to whether to decrypt incoming votes. If a negative determination is made, step 427 is invoked, wherein the votes are stored in the vote database 43 of FIG. 4A. If a positive determination is made, step 426 is invoked, wherein the votes are decrypted. Then, step 427 is invoked, wherein the votes are stored in the vote database 43 of FIG. 4A. Processing of votes is then complete.

FIG. 4C is a flowchart showing processing logic of the voter identification module 44 of FIG. 4. As mentioned earlier, the voter identification module 44 implements demographic and attitudinal categories to monitor response patterns of voters. In step 440, desired demographics 441 can be selected for implementation. The demographics 441 can include, but are not limited to: Internet Protocol (IP) address referral information, time of interaction, physical location, cookie information, user names, passwords, and biometric identification information. Optionally, in step 442, a new demographic can be defined by a user and implemented. In step 443, the demographics are applied to the voter population. In step 445, desired attitudes 444 can be selected for implementation. The attitudes 444 can include, but are not limited to: preference patterns, comparisons to reference groups, collectively-determined attributes, self-rated competences, and performance-based competencies. Optionally, in step 446, a new attitude can be defined by a user and implemented. In step 447, the attitude is applied to the voter population.

Figure 4D:
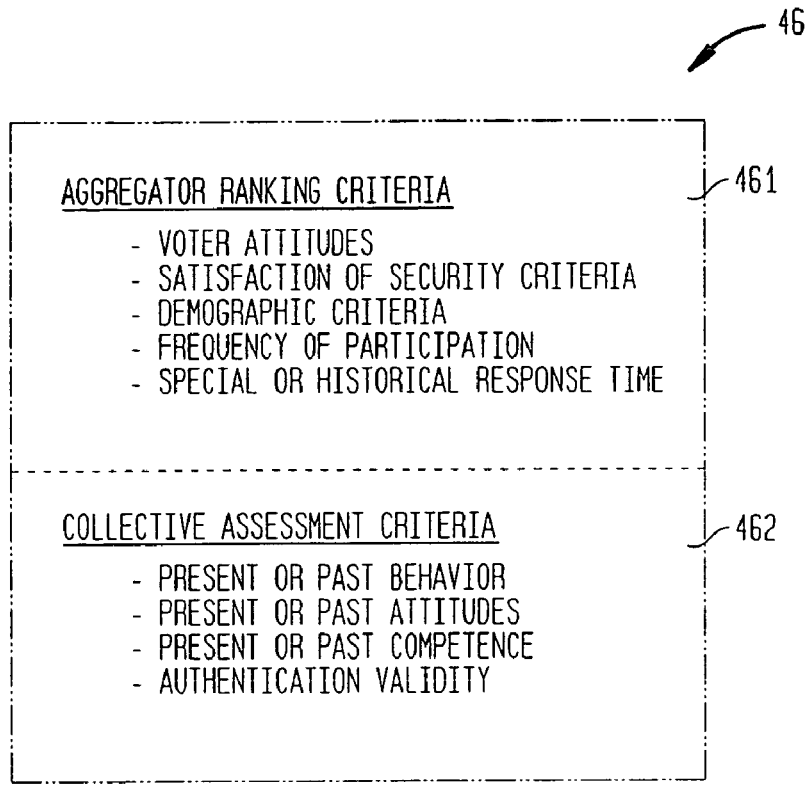
FIG. 4D is a diagram showing the trust profile module of FIG. 4A in greater detail.

FIG. 4D is a diagram showing the trust profile module of FIG. 4A in greater detail. The module 46 includes a number of trusted voter profile details, including aggregator ranking criteria 461 and collective assessment criteria 462. The aggregator ranking criteria 461 could include voter attitudes, satisfaction of security criteria, demographic criteria, frequency of participation, and special or historical response times. The criteria information can be stored in a database, and accessed by the modules of the present invention.

Figure 5A:
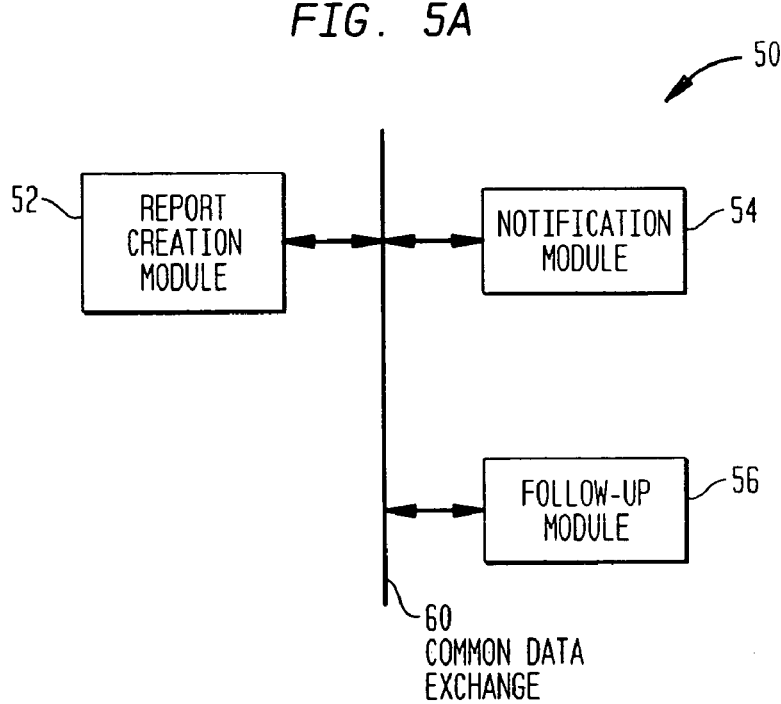
FIG. 5A is a diagram showing the report manager of FIG. 1 in greater detail.

FIG. 5A is a diagram showing the report manager module 50 of FIG. 1 in greater detail. The report manager module 50 includes a report creation module 52, a notification module 54, and a follow-up module 56. Communication and data interchange is provided between these modules using the common data exchange 60. The report manager module 50 provides a means for creating reports with different agenda data and communicating the results so that users can make use of the information to take immediate action. The report creation module 52 implements one or more report templates that provide standard options for analyzing and communicating the results of error-resilience and optimization analyses. This feature is important because it saves the user time and requires less background knowledge for using the invention. These templates may be selected and modified or used without modification. The user can also build a new template from scratch or by modifying an existing template and save it under a new name in the agenda database 80 of FIG. 1. Report templates can be used with multiple agendas as long as the types of questions and their logical attributes (for example, the same number of choices and rating scale) are consistent.

The report creation module 52 also allows for the selection of a dataset in a report. This feature is set up with a default limiting a report to the current agenda. However, this feature can be modified to include multiple datasets selected by criteria such as beginning time, duration, respondent demographic and attitudinal attributes, and collective choice results. Examples of this last criterion are success rates in producing error-resilient outcomes and achieving a minimum level of performance in making one or more correct or optimal collective choices. Once a referent set of agenda data has been defined, it can be used to define a new default for additional analyses. Additionally, the report creation module 52 automatically processes incoming vote data to enable computer-mediated groups to achieve the goal of producing an error-resilient and/or optimized collective outcome.

A feature of module 54 is the creation and distribution of notifications. This feature is defined in FIG. 1 and monitored by using access list controls. This feature targets notifications in terms of the setups for communications media and type of information required. For example, notifications can include voice, text, and/or graphical messages distributed by wireless or wired communications devices. Notifications can be redundant in their use of message media and network channel. This feature is useful for updating final results of an error-resilient and/or optimization analysis as well as updates on increases or decreases in the likelihood of satisfying one or both of these decision making objectives. Further, this feature is also useful because it allows the targeted respondents for a notification to select a list of respondents based on the collective choice results. For example, respondents who individually and/or collectively indicated a preference or judgmental pattern in favor of an option could be selected to update the access list to regulate communications with users. This capability can also be used to send different notifications to different targeted respondents depending on individual and collective response patterns. In addition, notifications can be based on random or biased samples of respondents who collectively satisfy certain preference or judgmental standards. This capability enables a user to qualify samples to avoid or exploit hidden biases in the next round of respondent voting data.

A feature of block 56 is the creation and use of followups. New queries or actions can be targeted to respondents based on the creation and modification of lists. New queries are new agendas that can be created from scratch in or from templates. New queries can be automated beforehand so that the collective choice results trigger the selection and administration of a new agenda. This feature is useful because it expedites obtaining additional information that can change collective choice results. For instance, if an error-resilient indecisive outcome has occurred, a followup agenda can be administered immediately to enable the group to reach a consensus. Similarly, if an optimized collective outcome does not meet a minimum standard of performance, a followup agenda can be administered to another set of respondents to try to obtain better results. Another feature of followups is the integration of collective action or coordination of action that is contingent on the collective outcome. This feature automatically notifies respondents about the outcome so that they can take immediate action. In a client-server computer environment (FIG. 11), the central node has to distribute the results to the other nodes. However, in a peer-to-peer network environment (FIG. 12), the decision task can be designed so that each voter processes all of the other votes into a collective outcome and takes immediate action without waiting for a central node to distribute news about the collective outcome. An advantage of peer-to-peer voting is that it eliminates the liability of having a central node destroyed or disabled by a physical or cyber attack. This reliability is a distinct advantage as long as the decision task is designed to minimize the possibility that inconsistent collective results are generated among the peers. The ability to design simple and complex tasks to minimize this possibility is part of the new art enabled by this invention. This art is based on theoretical examples and experimental data that identify the conditions under which inconsistencies are likely to occur and empirical information that corroborates the effects of question and analytical techniques for avoiding or minimizing collective inconsistencies among peers.

The report manager module 50 allows user to plan and launch followup queries to obtain more information and/or to use the notification to invoke individual and/or collective contingency actions. First, the report manager module can send or invoke a followup questionnaire by sending a target list of recipients to the agenda manager submodule along with prescribed invocation of contingency questionnaire templates or a new questionnaire created in the agenda manager submodule. Target selection for respondents can be done on the basis of combinations of demographic and attitudinal and/or judgmental attributes. Queries can be sent to the entire list or a random sample in which the respondents satisfy minimum distributional requirements. An advantage of this sampling procedure is that the qualified sample is based on an understanding of multiple group attributes, not simply a small subset of demographic and/or attitudinal attributes. This technique is particularly valuable when the decision task is multidimensional and requires ratings of choices on more than dimension. This qualified sampling procedure allows an automated process or a browsing human or node to understand the collective choice implications of a sampling procedure and include conditions in the sampling process to avoid or create biased samples, depending on the followup decision task objective. This knowledge makes it possible to minimize or completely avoid errors encountered in conventional offline or online polling (Brady, H. E. and G. R. Orren, "Polling Pitfalls: Sources of Error in Public Opinion Surveys," in Mann, T. E. and Owen, G. R., eds., Media Polls in American Politics, The Brookings Institution, 1992).

A second option for gathering more information in followup queries is to ask targeted voters or nodes to collect information from adjacent voters or nodes. This option has two advantages: communication reliability and redundancy. This outreach option provides reliability by making use of the network to collect voting information instead of expecting all respondents to be able to make direct or indirect contact with the host receiving submitted votes. Using intermediary nodes to collect votes and retransmit them provides more complete information about the actual distribution of preferences that can expedite the analysis of error-resilient and/or optimal collective outcomes. Intermediary nodes would use the modules and submodules shown in FIGS. 1 and 3A to collect and process votes from individual respondents. Depending on the number of voters in a network, the complexity of the network hierarchy of communications, network communications error conditions, and the time constraints for the decision task, sequences of intermediary data collection and retransmission to a central node can be used. Redundant collection of voting data may increase the load for choice processing, but this consequence can be offset by the opportunities for obtaining multiple confirmations of submitted votes.

This intermediary data collection and retransmission feature is also useful because the redundancy provides opportunities to detect the existence of network imposters and/or corrupted data. Detecting inconsistencies in redundant submissions enables a central processing node to take an active role in managing risk in a dynamic wired or wireless network environment. Although wireless network environments are typically considered to be more fragile than wired environments, both types of networks could be equally vulnerable given a significant combination of physical and cyber attacks on network nodes and links. Under emergency conditions, detected inconsistencies could trigger the use of flexible voter trust profiles to process votes. Under these conditions, contingency plans could also be triggered to compartmentalize intruders and to implement countermeasures. This feature can operate in centralized client-server mode (FIG. 11) or in decentralized peer-to-peer mode (FIG. 12).

The report manager module manages the application of scoring techniques that allow the group to reach an error-resilient and/or optimized collective outcome. Application design depends on the complexity of decision task, the number of users or participants, the hardware and networking environment, and the human requirements for operating the invention to generate error resilient and/or optimized collective outcomes. A representative embodiment of the present and unique invention can use the collective logic of a scoring system to examine incoming sequences of votes to identify error-resilient collective outcomes and/or to weight individual votes to optimize the collective outcome. This application would be appropriate for small groups of users using wireless devices for periodic decisions. In contrast, when large numbers of voters frequently submit data and access reports for complex decision tasks, deterministic and/or stochastic statistical techniques applied to multiple scoring methods would be appropriate in the representative embodiment of the present and unique invention.

Figure 5B:
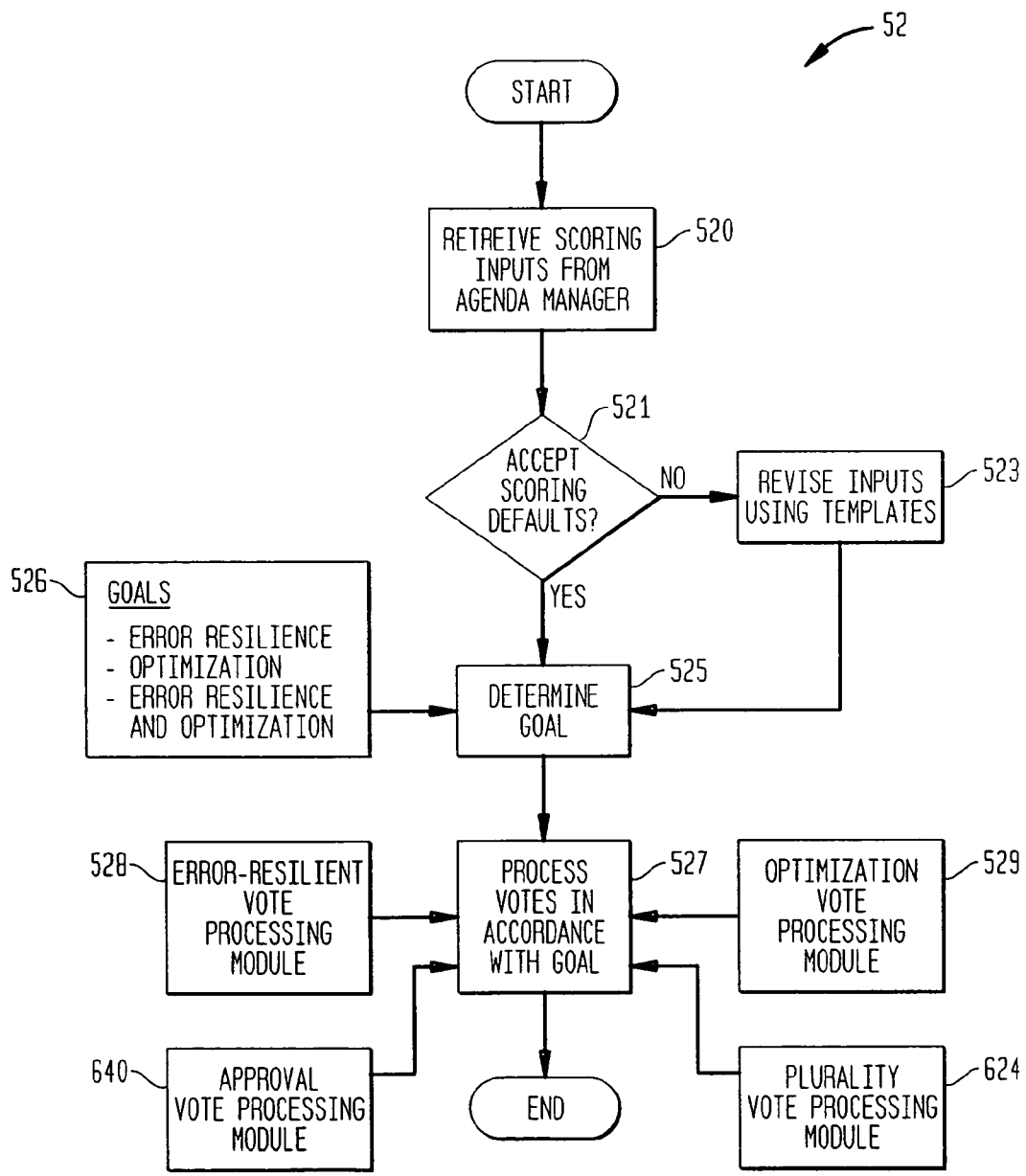
FIG. 5B is a flowchart showing processing logic of the scoring module shown of FIG. 5A.

FIG. 5B is a diagram showing processing logic of the report creation module 52 of FIG. 5A in greater detail. In step 520, scoring inputs are retrieved from the agenda manager 40 of FIG. 1. Then, in step 521 a determination is made as to whether to accept scoring defaults. If a positive determination is made, step 525 is invoked, wherein a voting goal is determined. If a negative determination is made, step 522 is invoked, wherein the scoring inputs can be revised using one or more templates. Then, step 525 is invoked. In step 525, a voting goal is determined from one or more voting goals 526. The goals could include, but are not limited to, error resilience, optimization, or a combination of error resilience and optimization. Once the goal has is been determined, step 527 is invoked, wherein votes are processed in accordance with the goal, using one or more of the error-resilient vote processing module 528, optimization vote processing module 529, plurality vote processing module 624, and approval vote processing module 640.

Figure 5C:
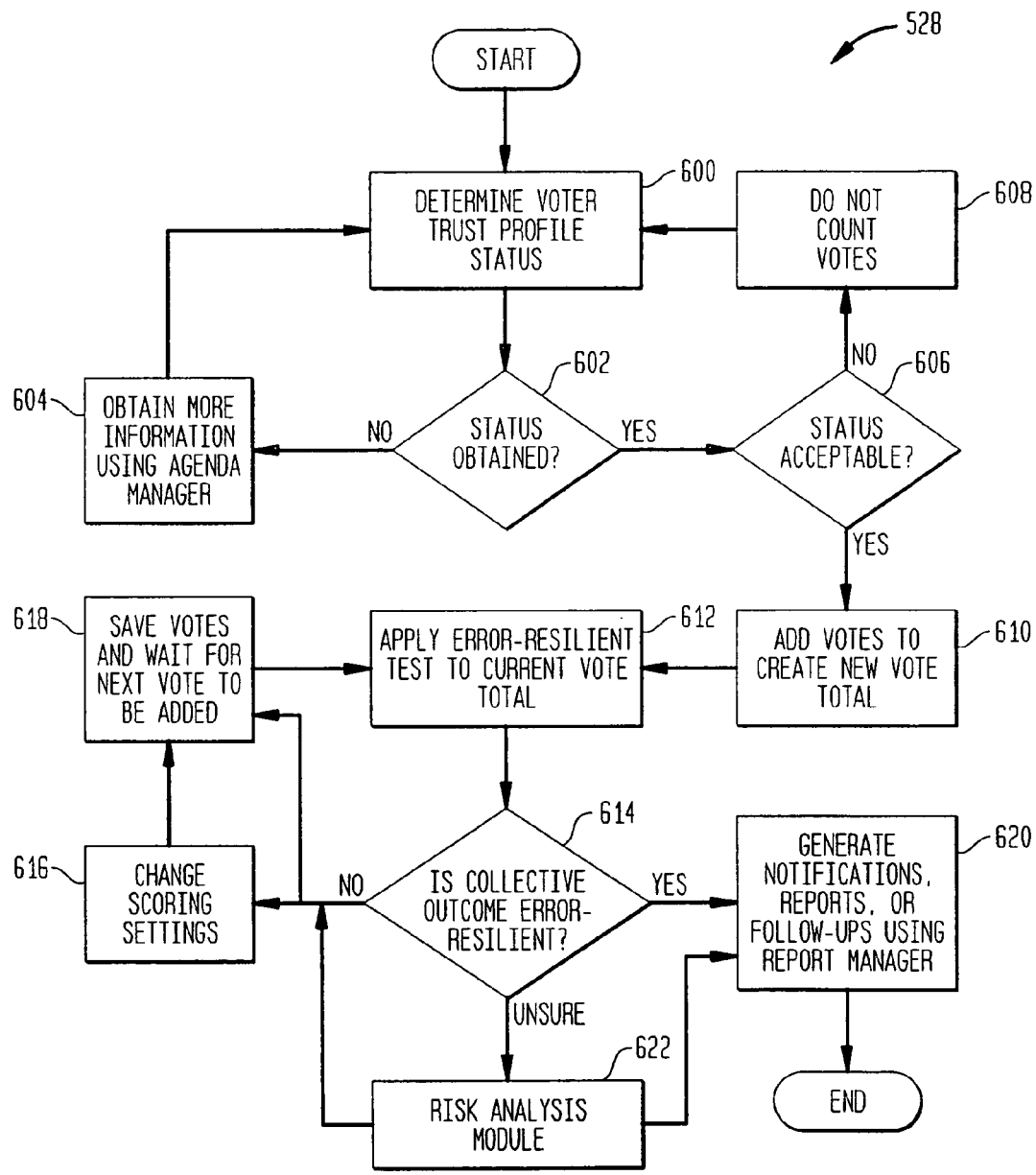
FIG. 5C is a flowchart showing processing logic of the error-resilient processing module of FIG. 5B.

FIG. 5C is a flowchart showing processing logic of the error-resilient processing module 528 of FIG. 5B. Beginning in step 600, voters are screened by analyzing the trust profile of each voter. In step 602, a determination is made as to whether trust profile status information has been obtained. If a negative determination is made, step 604 is invoked, wherein more information is obtained using the agenda manager module 30 of FIG. 1. If a positive determination is made, step 606 is invoked, wherein a determination is made as to whether the obtained status is acceptable. If the voter trust profile does not meet the default criteria set in one or more templates, the vote is not counted and is stored in the agenda database 80 of FIG. 1. If the trusted relationship is ambiguous (because it does not meet all of the requirements for outright rejection or acceptance), the vote can be stored in block 604 (in agenda database 80 in FIG. 1) to obtain more information about the voter. Obtaining more information can be done in an ad hoc or automated way depending on whether the resolution of the status of voters with ambiguous trust profiles is necessary for achieving the error-resilient and/or optimization goals of the group. If a voter's trusted status is acceptable, the vote is sent to block 610 to add to the current total vote count or collective outcome.

The data from block 610 are periodically sent to block 612, which operates on the data to test it for error resilience. Such a test is preferably is suitable to the energy and processing constraints of the device(s) on which the analysis is being conducted. For instance, on a current wireless phone or pocket computer, the test in block 612 could compare the collected and uncollected votes in a group of fixed size, examine the possible ways in which preferences could be distributed in the outstanding voter population, and determine if the current collective outcome could be changed by any possible submission of votes. In step 614, a determination is made as to whether the collective outcome is error-resilient. If a negative determination is made, step 616 is invoked, wherein scoring settings are changed. Additionally, step 618 is invoked, wherein an analyst is provide with the ability to save the current votes and wait for additional votes to be added. Then, steps 612 and 614 are re-invoked so that a new collective outcome can be determined and tested for error-resiliency. If a positive determination is made in step 614, step 620 is invoked, wherein the system generates notifications, reports, and follow-up query agendas or contingency actions using the report manager module. If a determination is made in step 614 that that it is unclear whether the collective outcome is error-resilient, the risk analysis module 622 is invoked so that a risk analysis can be performed.

Figure 5D:
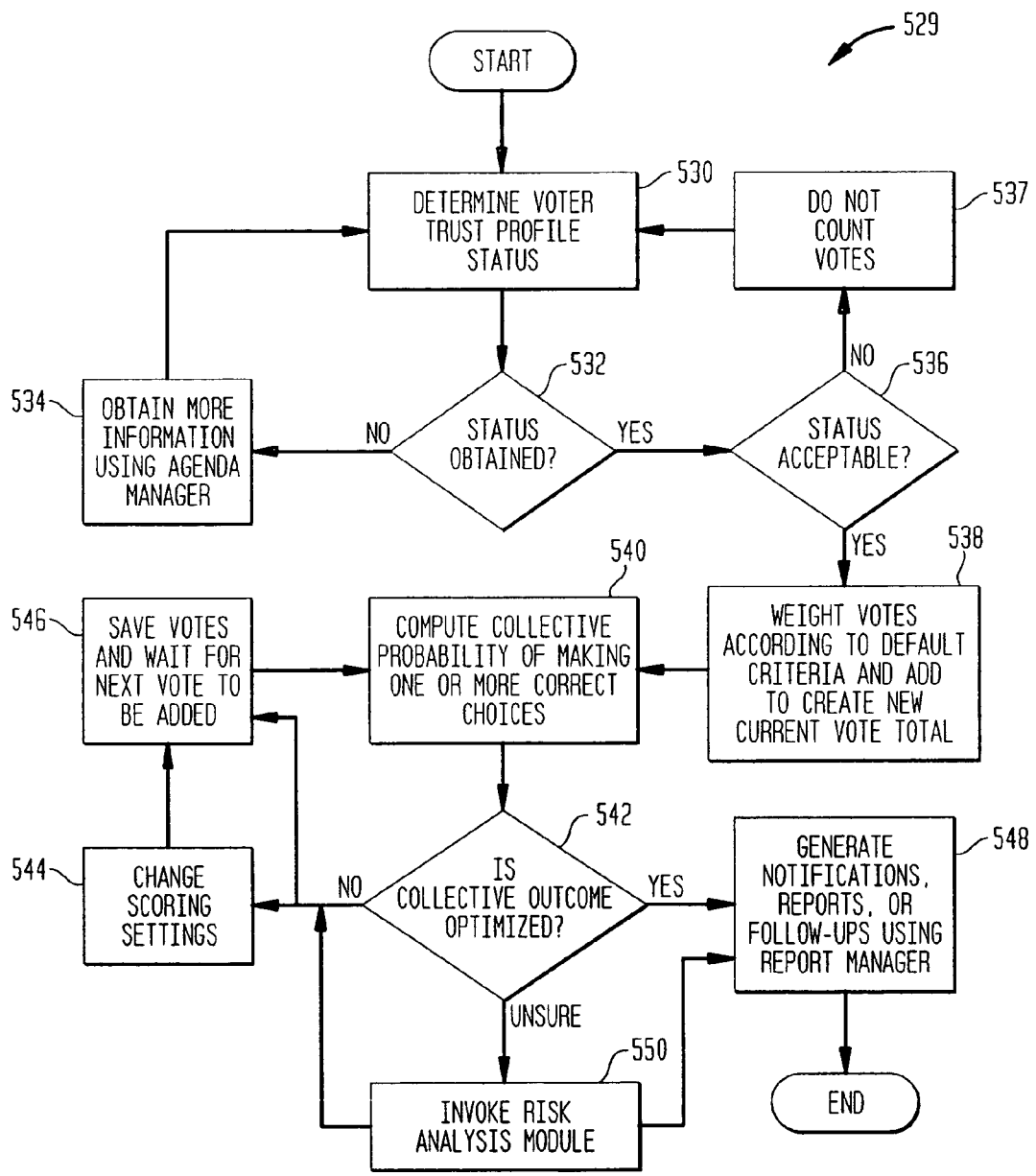
FIG. 5D is a flowchart showing processing logic of the optimization vote processing module of FIG. 5B.

FIG. 5D is a flowchart showing processing logic of the optimization vote processing module 529 of FIG. 5B. The processing achieved by this module is similar to the error-resilient processing module described earlier, except for the scoring of vote data. Beginning in step 530, voters are screened by analyzing the trust profile of each voter. In step 532, a determination is made as to whether trust profile status information has been obtained. If a negative determination is made, step 534 is invoked, wherein more information is obtained using the agenda manager module 30 of FIG. 1. If a positive determination is made, step 536 is invoked, wherein a determination is made as to whether the obtained status is acceptable. If the voter trust profile does not meet the default criteria set in one or more templates, the vote is not counted and is stored in the agenda database 80 of FIG. 1. If the trusted relationship is ambiguous (because it does not meet all of the requirements for outright rejection or acceptance), the vote can be stored in block 537 (in agenda database 80 in FIG. 1) to obtain more information about the voter. Obtaining more information can be done in an ad hoc or automated way depending on whether the resolution of the status of voters with ambiguous trust profiles is necessary for achieving the error-resilient and/or optimization goals of the group. If a voter's trusted status is acceptable, the vote is sent to block 538 to add to the current total vote count or collective outcome.

The data from block 538 are periodically sent to block 540, which computes the collective probability of the voting group making one or more collective choices. Such a test is preferably is suitable to the energy and processing constraints of the device(s) on which the analysis is being conducted. In step 542, a determination is made as to whether the collective outcome is optimized. If a negative determination is made, step 544 is invoked, wherein scoring settings are changed. Additionally, step 546 is invoked, wherein an analyst is provide with the ability to save the current votes and wait for additional votes to be added. Then, steps 540 and 542 are re-invoked so that a new collective outcome can be determined and tested for optimization. If a positive determination is made in step 542, step 548 is invoked, wherein the system generates notifications, reports, and follow-up query agendas or contingency actions using the report manager module. If a determination is made in step 614 that that it is unclear whether the collective outcome is optimized, the risk analysis module 550 is invoked so that a risk analysis can be performed.

Figure 5E:
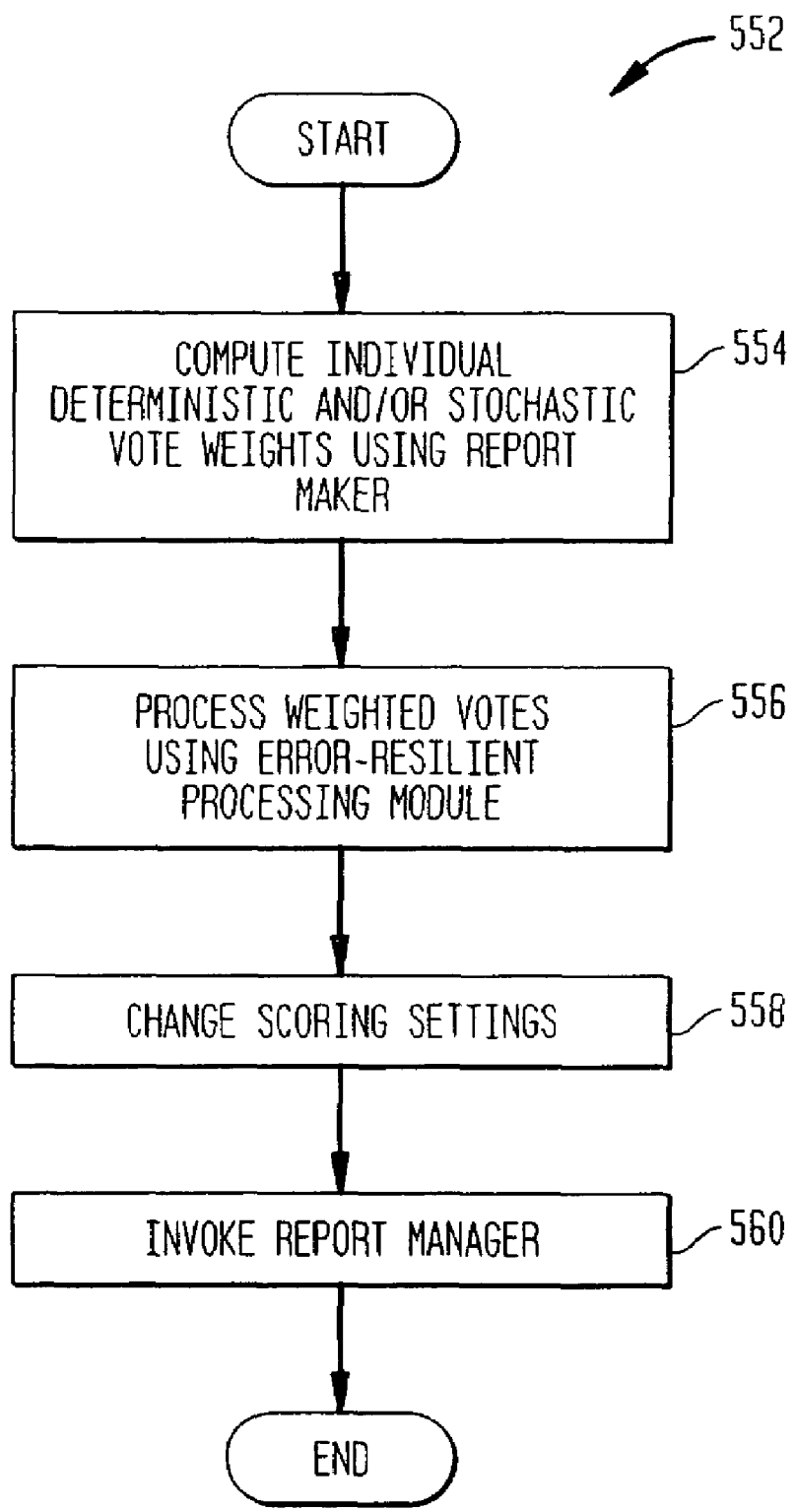
FIG. 5E is a flowchart showing processing logic for performing both error-resilient and optimization vote processing.

FIG. 5E is a flowchart showing processing logic for performing both error-resilient and optimization voting. Importantly, the present invention allows for the analysis of collective decisions of a voting group to determine whether the outcome is error-resilient, and whether the outcome is optimized (e.g., the collective probability of whether the group will make one or more collective choices). In step 554, individual deterministic and/or stochastic voting weights are computed using the report maker. Then, in step 556, the weighted votes are processed using the error-resilient processing module 528 of FIG. 5B. In step 558, scoring settings are changed, and in step 560, the report manager is invoked to provide notifications and follow-up tasks.

Figure 5F:
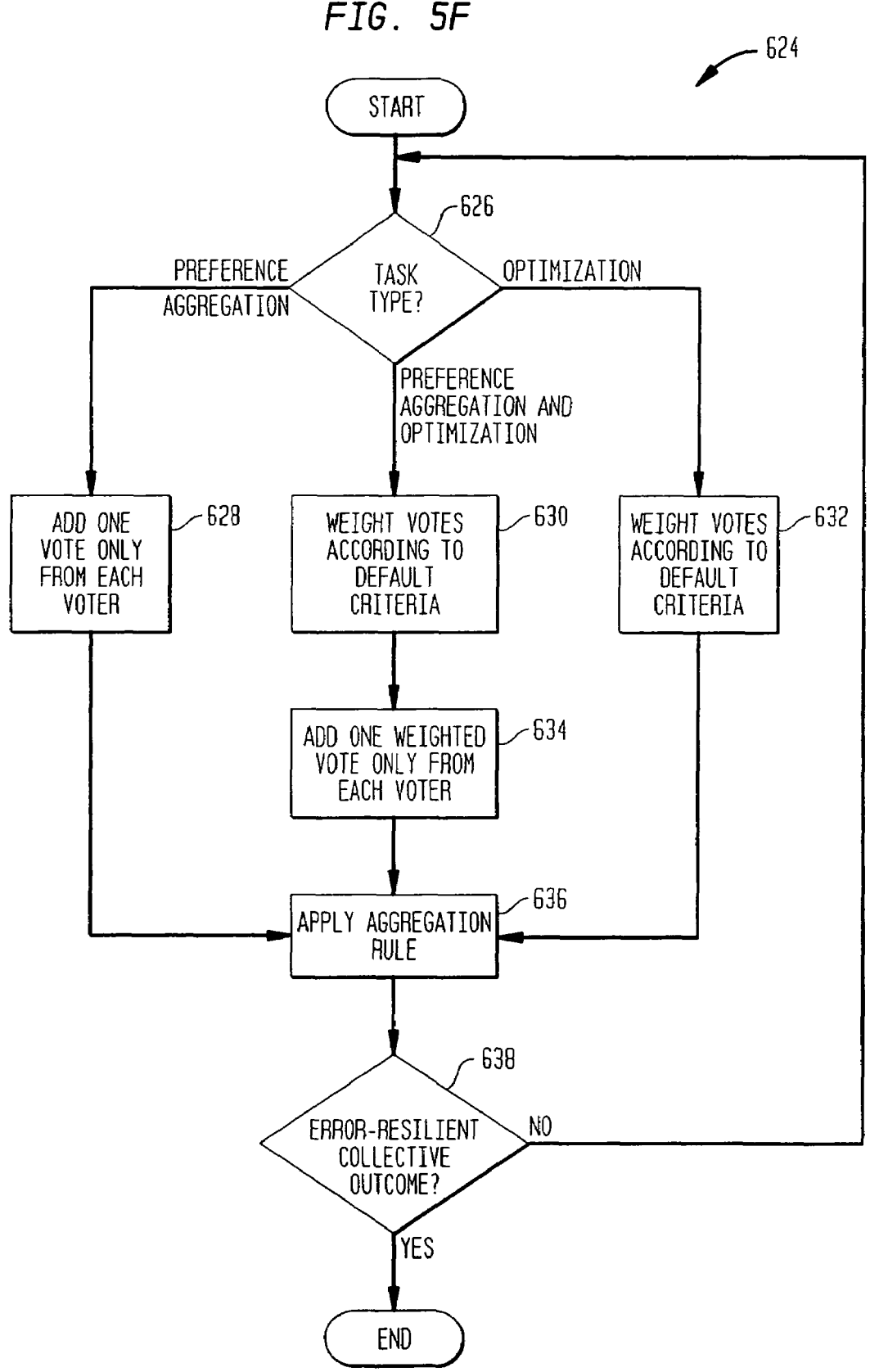
FIG. 5F is a flowchart showing processing logic of the plurality vote processing module of FIG. 5B.
Figure 5G:
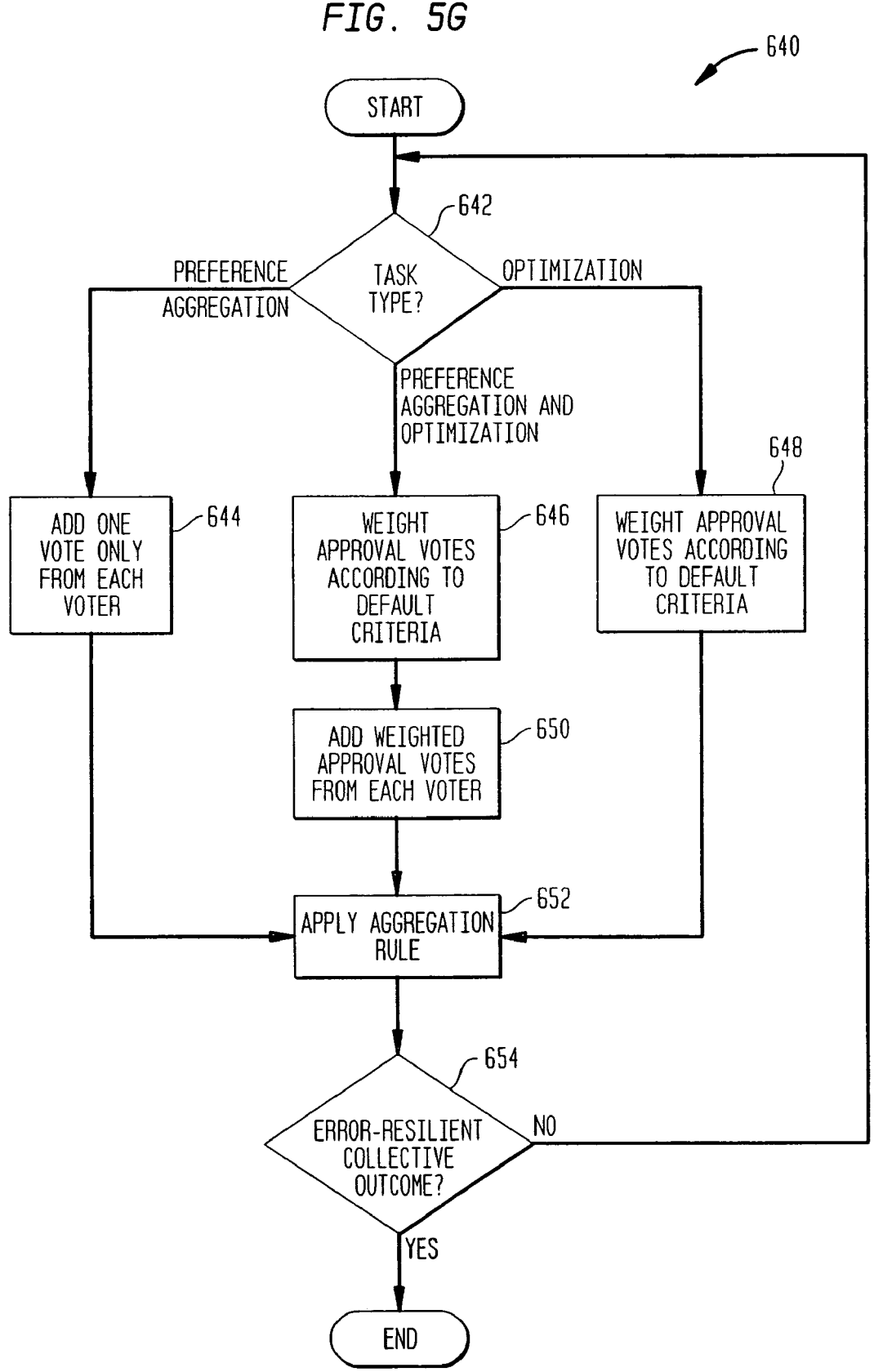
FIG. 5G. is a flowchart showing processing logic of the approval vote processing module of FIG. 5B.

FIGS. 5F and 5G schematically illustrate the operation of voting or scoring method modules in the present invention. A feature of the present and unique invention is that is can incorporate any scoring algorithm in the processing of voting data. Since every voting method is composed of a system of rules for voting endowment, vote allocation, and vote aggregation, the present invention can generate knowledge about the properties of the application of a scoring algorithm that would otherwise be unknowable or a matter of conjecture. FIGS. 5F and 5G show how the present invention processes votes under plurality voting and under approval voting when the collective decision objective is to produce an error-resilient and/or optimized collective outcome.

FIG. 5F is a flowchart showing processing logic of the plurality vote processing module 624 of FIG. 5B. In addition to determining error-resiliency and optimization, the present invention also allows for collective outcomes to be determined using a plurality voting methodology. Beginning in step 626, a determination is made as to the type of decision task to be accomplished. If the decision is made to perform preference aggregation, step 628 is invoked, wherein only one vote is added to the collective outcome from each voter. This feature is useful because it allows the counting process to take account of different types of vote submissions that are appropriate to the decision task. These types enable one vote per identified, partially identified and trusted voter, and/or anonymous voter as well a multiple votes from an identified, partially identified and trusted voter, and/or anonymous voter.

If the determination is made to perform both preference aggregation and optimization, steps 630 and 634 are invoked, wherein votes are weighed according to default or stored criteria and one weighted vote is added to the collective outcome from each voter. The stored weights can be individual or collective estimates and/or empirical performance measures stored in database records. Further, the weights can be simple Condorcet deterministic estimates of competence, Bayesian conditional probabilities, and/or stochastic measures of competence containing a probability and error term. If a determination is made to perform optimization, step 632 is invoked, wherein votes are weighed according to a default criteria. In step 636, an aggregation rule is applied, which has been set by the agenda manager module 30 of FIG. 1. In step 638, a determination is made as to whether the outcome is error-resilient, using the error-resilient processing module 528 of FIG. 5B. If a negative determination is made as to error-resiliency, the processing of module 624 is repeated. If a positive determination is made, processing of module 624 terminates.

FIG. 5G is a flowchart showing processing logic of the approval vote processing module 640 of FIG. 5B. In addition to determining error-resiliency and optimization, the present invention also allows for collective outcomes to be determined using an approval voting methodology. Beginning in step 642, a determination is made as to the type of decision task to be accomplished. If the decision is made to perform preference aggregation, step 644 is invoked, wherein only one vote is added to the collective outcome from each voter. This feature is useful because it allows the counting process to take account of different types of vote submissions that are appropriate to the decision task. These types enable one vote per identified, partially identified and trusted voter, and/or anonymous voter as well a multiple votes from an identified, partially identified and trusted voter, and/or anonymous voter. Further, this feature is important because it checks to make sure that the number of approval votes cast by each valid voter does not exceed the total number of choices. In addition, this feature is important because the error-resilient analysis takes account of the different types of aggregation rules that are applicable in approval scoring. For instance, plurality, majority, and unanimity aggregation rules can produce ties under approval scoring. Moreover, these aggregation rules can be applied to the total number of approval votes cast and/or the total number of voters casting an approval vote. Error-resilient analysis that takes account of these possibilities is useful because it makes it possible for an analyst to differentiate among different measures of consensus associated with these aggregation rules. Without the present and unique invention, these subtle, but potentially dramatic differences would be not be detectable.

If the determination is made to perform both preference aggregation and optimization, steps 646 and 650 are invoked, wherein approval votes are weighed according to default or stored criteria and one weighted vote is added to the collective outcome from each voter. The stored weights can be individual or collective estimates and/or empirical performance measures stored in database records. Further, the weights can be simple Condorcet deterministic estimates of competence, Bayesian conditional probabilities, and/or stochastic measures of competence containing a probability and error term. If a determination is made to perform optimization, step 648 is invoked, wherein approval votes are weighed according to a default criteria. These weighted approval votes are then aggregated according to default rule(s) and analyzed to take account of tied plurality, majority, and unanimous outcomes as well as different baselines for computing these aggregation rules. In step 636, an aggregation rule is applied, which has been set by the agenda manager module 30 of FIG. 1. In step 638, a determination is made as to whether the outcome is error-resilient, using the error-resilient processing module 528 of FIG. 5B. If a negative determination is made as to error-resiliency, the processing of module 624 is repeated. If a positive determination is made, processing of module 624 terminates.

Figure 5H:
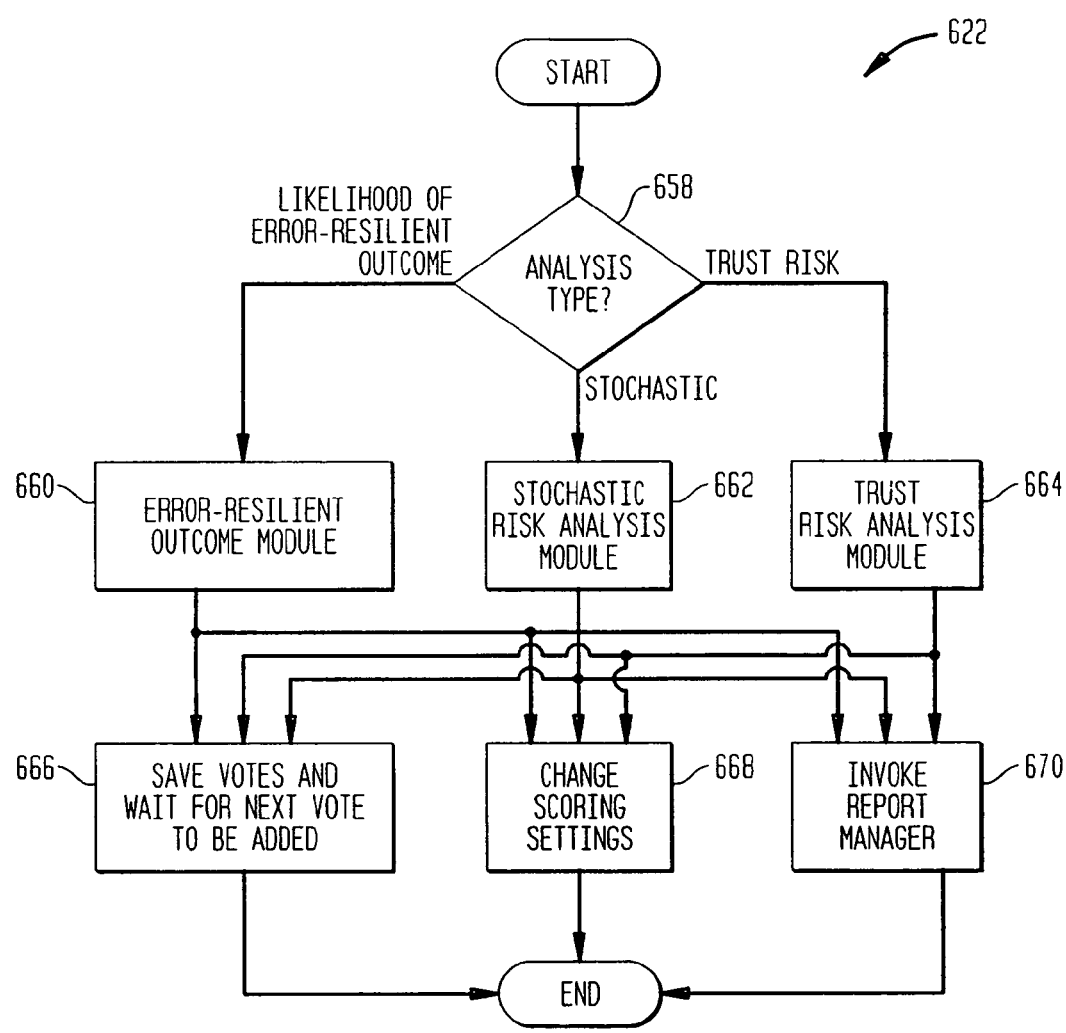
FIG. 5H is a flowchart showing processing logic of the risk analysis module of FIG. 5C.

FIG. 5H is a flowchart showing processing logic of the risk analysis module 622 of FIG. 5C. The risk analysis module 622 contains options for computing the likelihood of producing an error-resilient collective outcome, determining the risk measures associated with the occurrence of factors in the collective choice process that can affect the production of an error-resilient collective outcome, and sensitivity analysis of trusted relationships among the votes of outstanding voters. Each one of these features includes options for generating reports, changing the scoring settings, and/or saving votes to await the collection of more outstanding votes. In step 658, a determination is made as to which type of risk analysis is to be performed. Error-resilient outcome analysis module 660 is invoked if the determination is made to test the likelihood of producing an error-resilient outcome. Stochastic risk analysis module 662 is invoked if the determination is made to perform a stochastic analysis. Trust risk analysis module 664 is invoked if the determination is made to perform a trust risk analysis. After processing by modules 660-664 steps 666, 668, and 670 are invoked, wherein the votes are saved and an analyst is granted the option of waiting for additional votes, scoring settings are changed, and the report manager is invoked for notification and follow-up tasks.

Figure 5I:
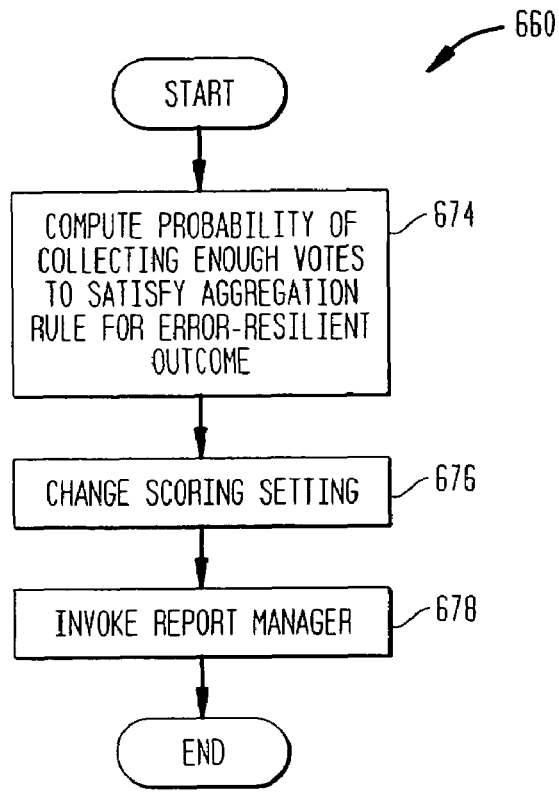
FIG. 5I is a flowchart showing processing logic of the error-resilient outcome analysis module of FIG. 5H.

FIG. 5I is a flowchart showing processing logic of the error-resilient outcome analysis module 660 of FIG. 5H. The module 660 filters the incoming vote data for an agenda to differentiate agendas with fixed and unfixed voter populations. If the voter population is fixed, the votes are passed to block 674, where a scoring algorithm is implemented that incorporates individual or collective estimates and/or empirical data from past collective decisions that enables the present invention to compare the likelihood that incoming votes will conform to a pattern that will not change the current vote total or collective outcome. This feature is useful because it allows an analyst to make a informed decision about waiting for more incoming votes and/or taking alternative action. If the voting population is not fixed, similar likelihoods can be computed by estimating ranges of increase in the receipt of outstanding votes. This feature is useful because it allows an analyst to make an informed choice about the potential advantages and disadvantages of processing more information about a voter population that is smaller (and/or larger) than the expected fixed number of respondents. After computing these likelihoods, steps 676 and 678 are invoked, wherein scoring settings are updated and the report manager is invoked for generating notifications and follow-up tasks.

Figure 5J:
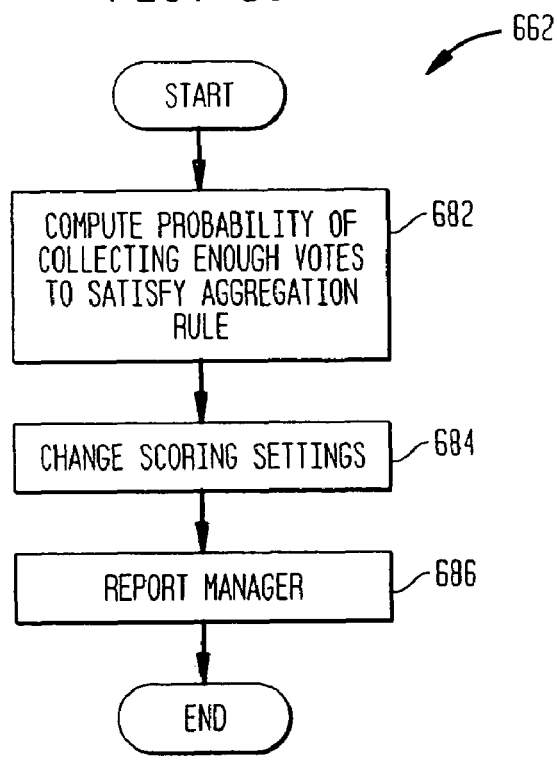
FIG. 5J is a flowchart showing processing logic of the stochastic risk analysis module of FIG. 5H.

FIG. 5J is a flowchart showing processing logic of the stochastic risk analysis module 662 of FIG. 5H. The module 662 sorts the incoming data depending on the number of voters associated with an agenda, and computes the probability of collecting enough votes to satisfy a pre-defined aggregation rule. These computations use the current collected and uncollected votes and any known or estimated attributes of the voting population to compute the likelihood of receiving vote data that enables an analyst to quantitatively estimate the risks associated with waiting for more data. This feature is useful because it provides guidance for the analyst in deciding how much more vote data must be collected in an uncertain environment to minimize risk to a target level. After computing these likelihoods, steps 684 and 686 are invoked, wherein scoring settings are updated and the report manager is invoked for generating notifications and follow-up tasks.

Figure 5K:
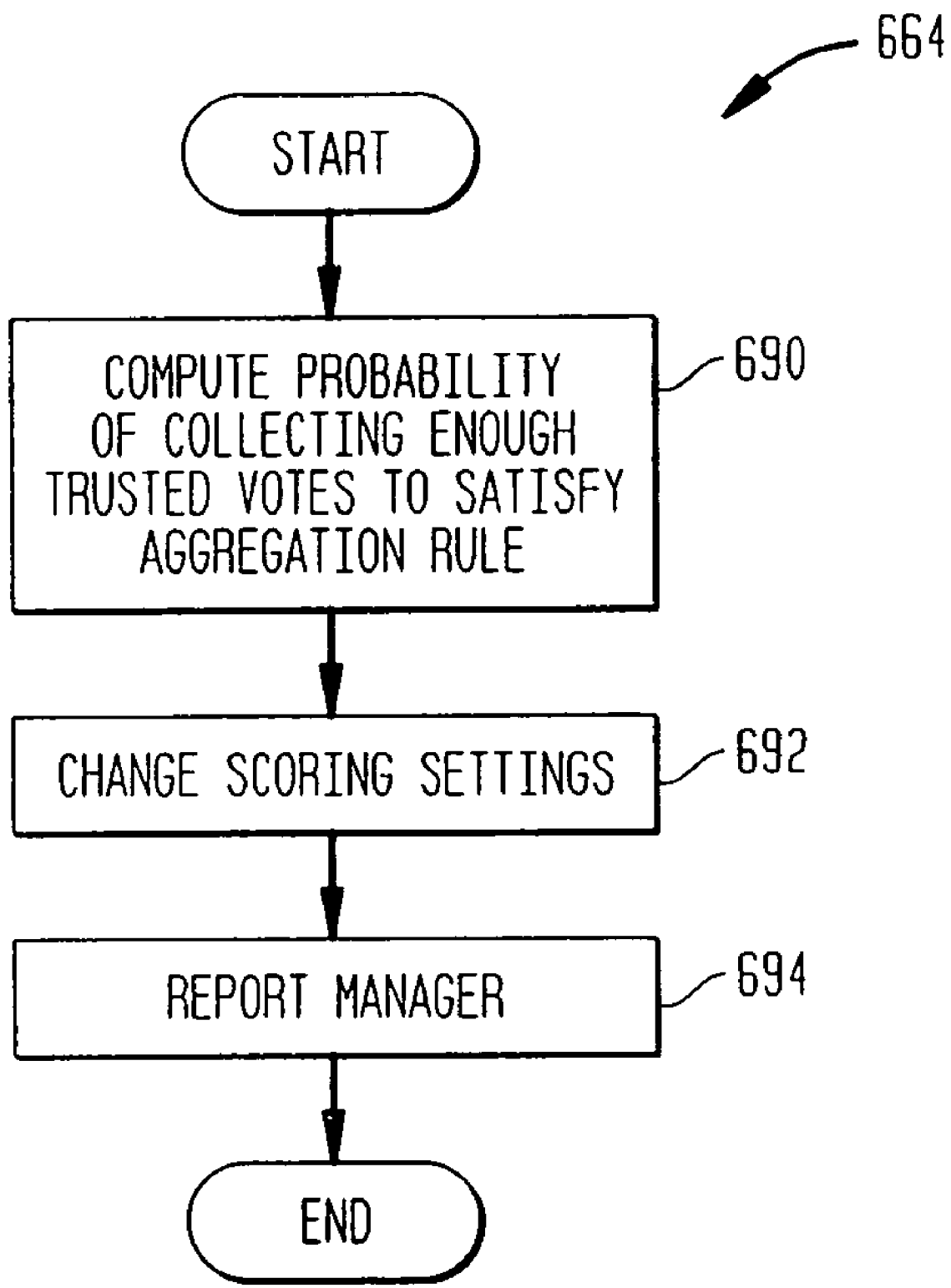
FIG. 5K is a flowchart showing processing logic of the trust risk analysis module of FIG. 5H.

FIG. 5K is a flowchart showing processing logic of the trust risk analysis module 664 of FIG. 5H. Unlike the sensitivity analysis using the trust profiles associated with collected votes using the data attributes provided in FIG. 4D, the analysis in FIG. 5K computes the is likelihood of obtaining enough additional votes from the outstanding voters that meet a prescribed level of trust. This computation is useful because it enables the analyst to know how likely it is that additional voting information will be available for use in conducting an error-resilient and/or optimization analysis. This knowledge can help the analyst in deciding if and when to seek additional information or implement contingency actions. After computing these likelihoods, steps 692 and 694 are invoked, wherein scoring settings are updated and the report manager is invoked for generating notifications and follow-up tasks.

Figure 6:
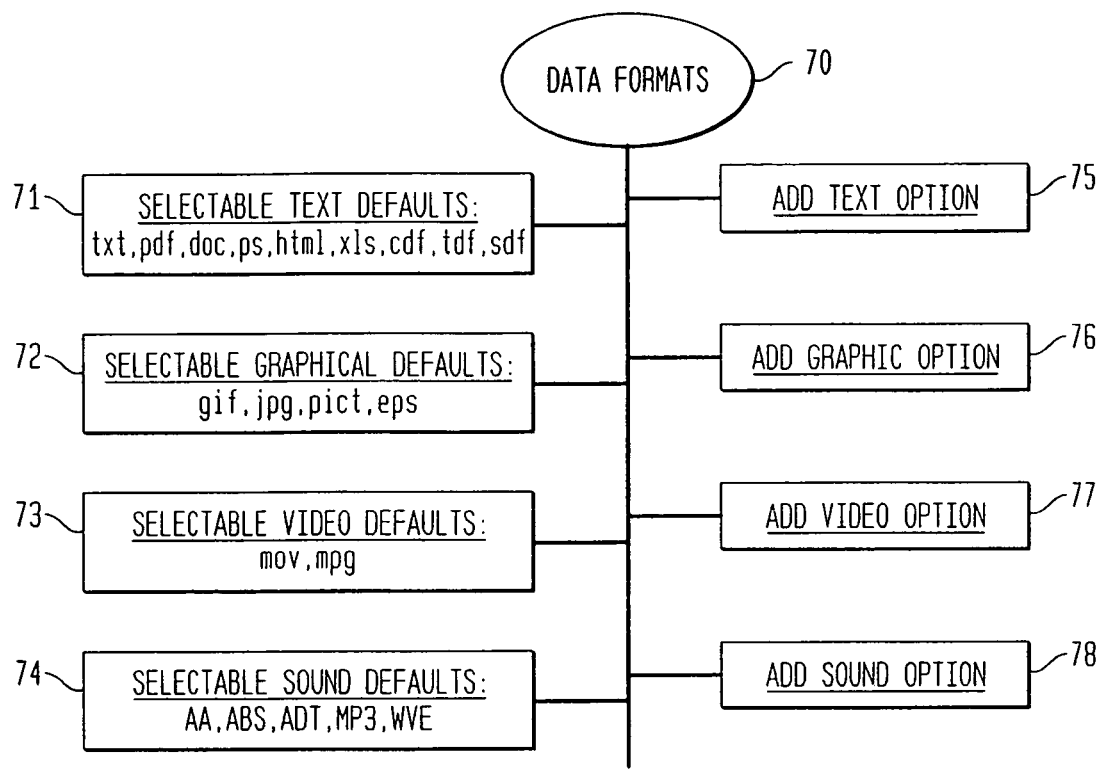
FIG. 6 is a diagram showing sample data formats utilized by the present invention.

FIG. 6 is a diagram showing the sample data formats utilized by the present invention. Communication and data storage can be achieved by the present invention using any suitable data format. Examples of such formats 70 include selectable text defaults 71, selectable graphics defaults 72, selectable video defaults 73, and selectable sound defaults 74. Additionally, the user can add text options 75, graphic options 76, video options 77, and sound options 78, to expand the data formats 70 as desired. These data formats allow for synchronous and asynchronous communication and interpretation of voting, textual, image, graphical, sound, animation, video (stored or live), quantitative, textual, and other information is organized to enable computer users to initiate and participate in collective decisions that identify error-resilient results and/or use measures of competence to weight individual votes to optimize the probability of producing a correct or optimal collective outcome.

Figure 7:
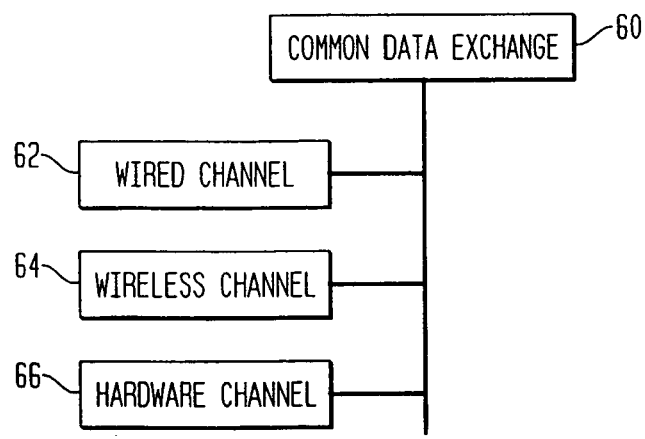
FIG. 7 is a diagram showing sample common data exchange formats utilized by the present invention.

FIG. 7 is a diagram showing sample common data exchange communications formats utilized by the present invention. As mentioned earlier, the common data exchange 60 allows for communication between each of the modules of the present invention. Such communication could be performed over a wired channel 62, a wireless channel 64, or a hardware channel 66. Any suitable communications medium can be used without departing from the spirit or scope of the present invention.

Figure 8:
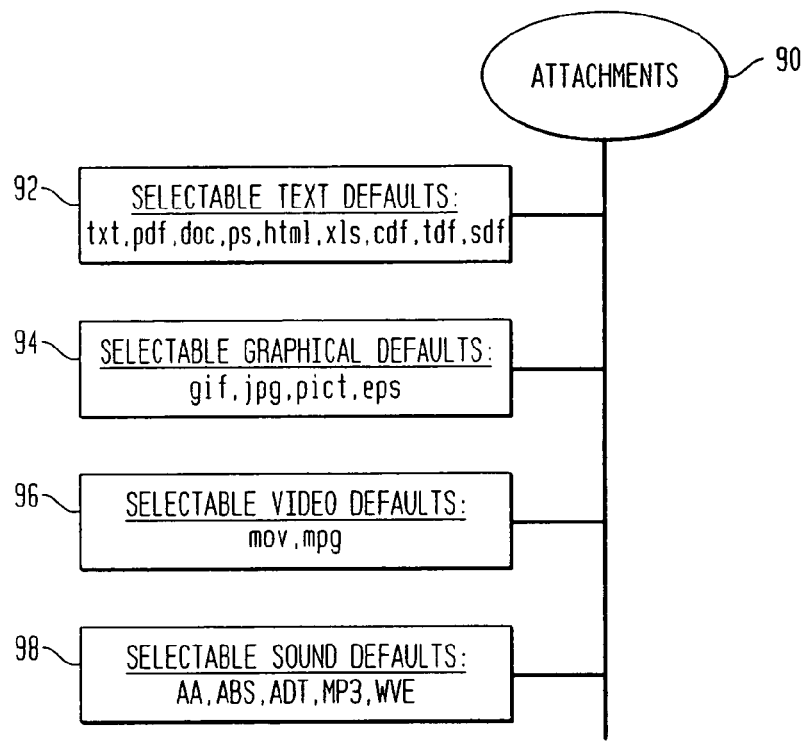
FIG. 8 is a diagram showing sample attachment file formats utilized by the present invention.

FIG. 8 is a diagram showing sample attachment formats 90 that can be used for exchanging information between voters using the present invention. The attachment formats 90 could comprise selectable text defaults 92, selectable graphical defaults 94, selectable video defaults 96, and selectable sound defaults 98. User-defined attachment formats could also be utilized.

Figure 9:
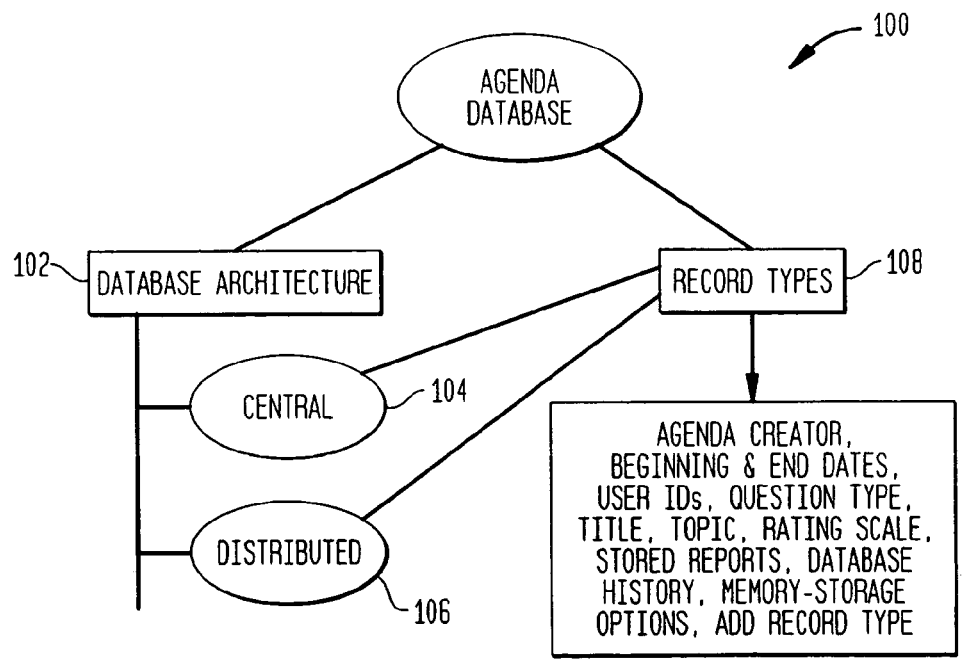
FIG. 9 is a diagram showing the architecture and sample record format of the agenda database of the present invention.

FIG. 9 is a diagram showing the architecture and sample record format of the agenda database 80 of FIG. 1. The architecture 102 could include a centralized architecture 104, wherein voting information is submitted to a central database file. Alternatively, the architecture 102 could include a distributed architecture 106, wherein the database is distributed over a plurality of computing systems. The agenda database 80 includes a number of records 108 for storing information relating to voting information. Those records could include, but are not limited to: agenda creator identifier; beginning and end dates; user identifiers; question types; titles; topics; rating scales; stored reports; database history; memory storage options; and additional record types.

Figure 10:
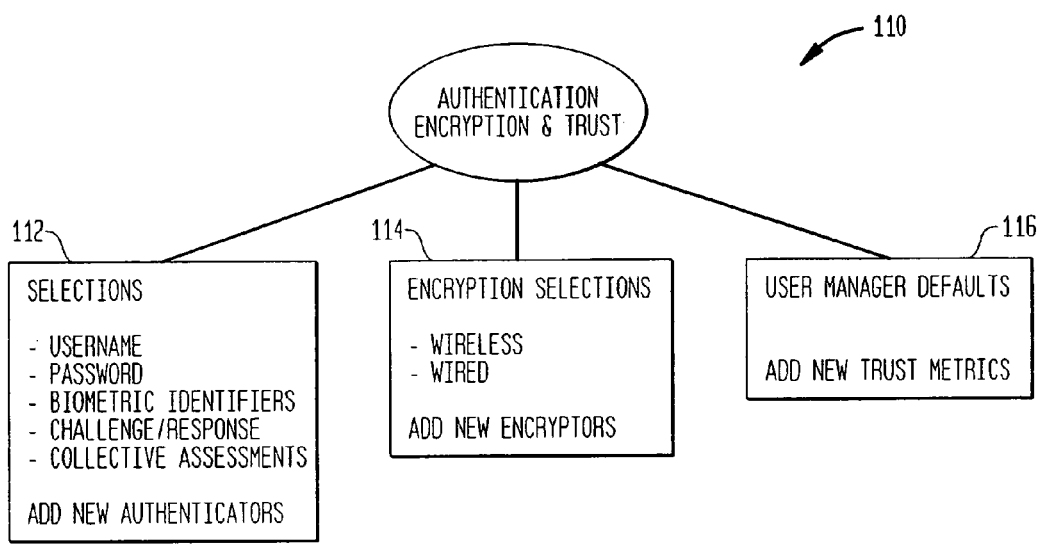
FIG. 10 is a diagram showing sample authentication, encryption, and trust parameters utilized by the present invention.

FIG. 10 is a diagram showing sample authentication, encryption, and trust parameters utilized by the present invention. The authentication parameters 112 could include user names, passwords, biometric identifiers, challenge and response information, collective assessments, and new authenticators defined by users of the system. The encryption parameters 114 could include wired and wireless encryption standards, as well as new encryption standards defined by users of the system. The trust parameters 116 could include default specified by the user manager module of the present invention, or new trust metrics defined by users.

Figure 11:
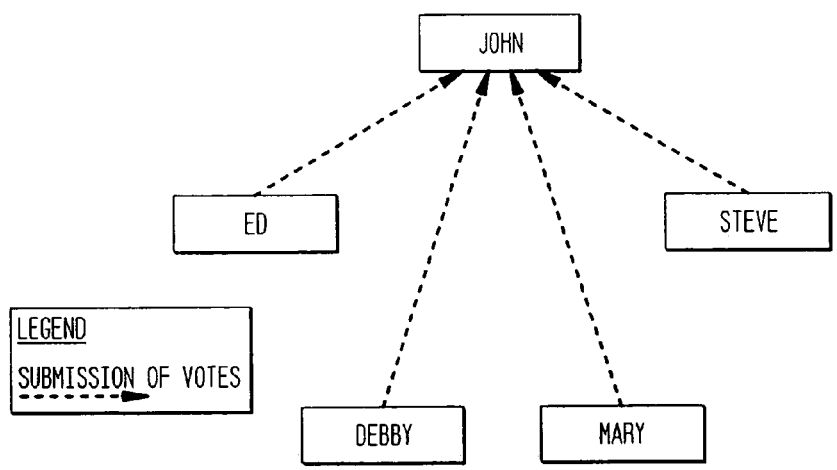
FIG. 11 is a diagram showing a sample centralized voting architecture in which the present invention can be implemented.
Figure 12:
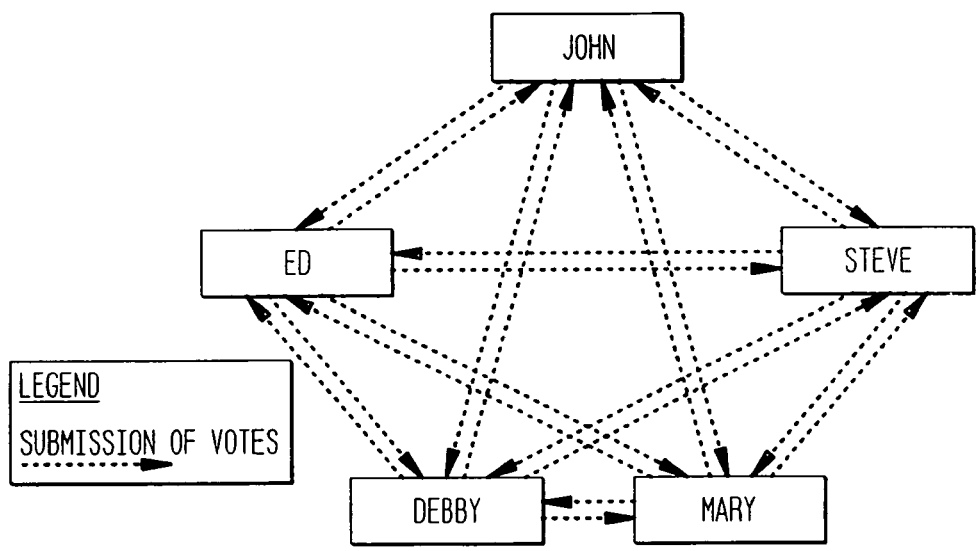
FIG. 12 is a diagram showing a sample decentralized voting architecture in which the present invention can be implemented.

FIG. 11 is a diagram showing a sample centralized voting architecture in which the present invention can be implemented. The system could be configured so that a mediator (John) receives votes from a plurality of users (Ed, Debby, Mary, and Steve). The centralized voting architecture could be implemented in client-server computing architecture.

FIG. 12 is a diagram showing a sample decentralized voting architecture in which the present invention can be implemented. The system could be configured so that votes are submitted from each voter to every other voter. The decentralized voting architecture could be implemented in a peer-to-peer computing architecture.

The error-resilient collective outcomes produced by the present invention were tested in numerous simulations and compared to benchmark predictions. In each simulation, the probabilities of reaching an error-resilient collective outcome and the proportion of outstanding voters were compared. The comparisons of both outcomes to benchmark predictions will be described now with relation to FIGS. 14A-23B.

Figure 14A:
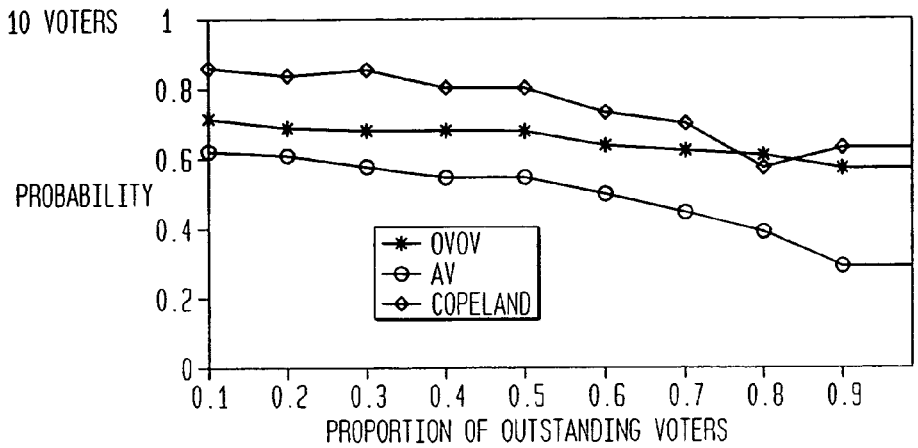
FIGS. 14A-14C are graphs showing test results of error-resilient collective outcomes produced by the present invention using random tie breaking.
Figure 14B:
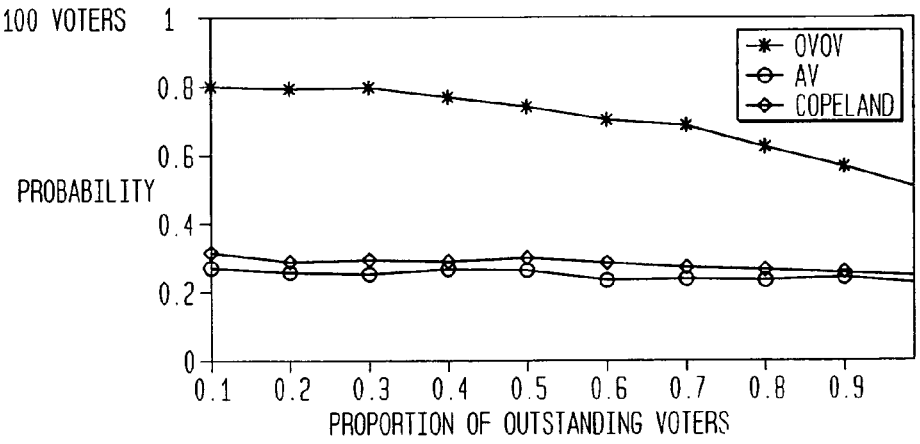
Figure 14C:
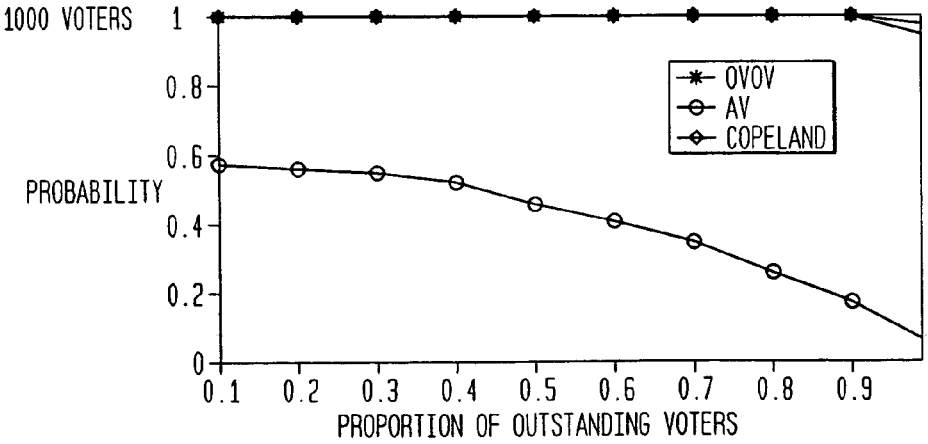

FIGS. 14A-14C are graphs showing test results of error-resilient collective outcomes produced by the present invention using random tie breaking. In this simulation, three scoring methods including One Person-One Vote (OPOV) (also referred to as One Voter-One Vote (OVOV)), Approval Voting (AV) and Copeland voting were applied to each of three voting populations including 10 voters, 100 voters, and 1,000 voters. Homogenous preferences were tested using a plurality aggregation rule, and random tie breaking was implemented. As can be seen in the graphs, homogenous preferences boost the error-resilient collective outcome (ERCO) efficiency under OPOV scoring as the number of voters increases, but the ERCO efficiency of AV and Copeland voting, which performs best for 10 votes, declines. This leads to the implications that: (1) controlling the expression of information via voting methods can improve the probability of producing an ERCO regardless of the percentage of outstanding voters; (2) the takeoff of OPOV is consistent with the Condorcet theorem; and (3) crossover points provide options for choosing a voting method based on other considerations such as computational energy and overhead.

Figure 15A:
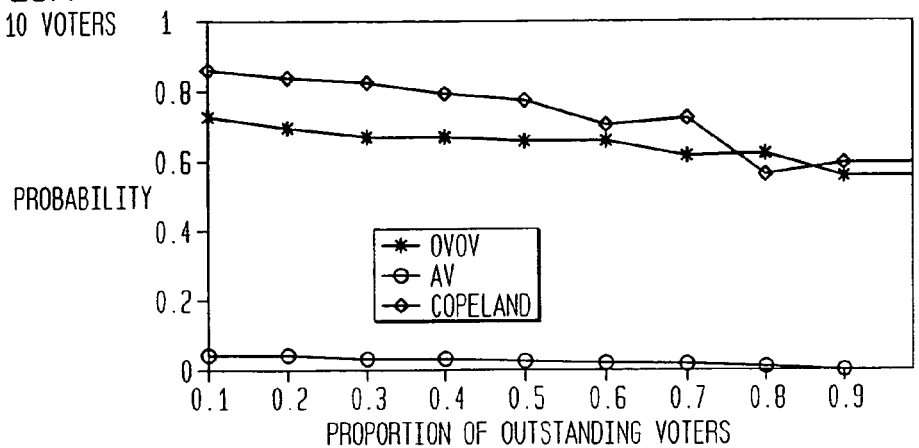
FIGS. 15A-15C are graphs showing test results of error-resilient collective outcomes produced by the present invention using no tie breaking.
Figure 15B:
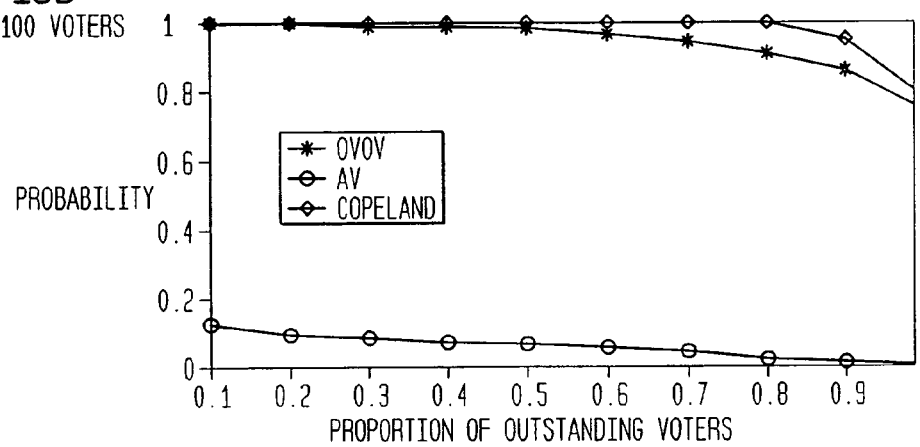
Figure 15C:
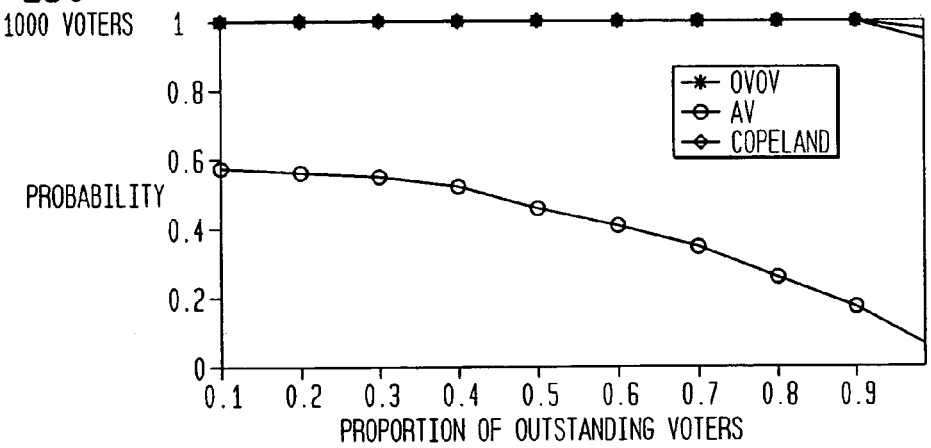

FIGS. 15A-15C are graphs showing test results of error-resilient collective outcomes produced by the present invention using no tie breaking. In this simulation, OPOV, AV, and Copeland scoring methods were applied to each of three voting populations including 10 voters, 100 voters, and 1,000 voters. Homogenous preferences were tested using a plurality aggregation rule, and no tie breaking was implemented. As can be seen in the graphs, homogenous preferences boost ERCO efficiency, and Copeland voting performs marginally better than OPOV as the number of voters increases. This leads to the implications that: (1) preference homogeneity may compensate for loss of information derived from random tie breaking; (2) ERCO efficiency of AV varies over a greater range than when ties are randomly broken; and (3) Copeland voting tends to be more ERCO efficient than OPOV as the number of voters increases.

Figure 16:
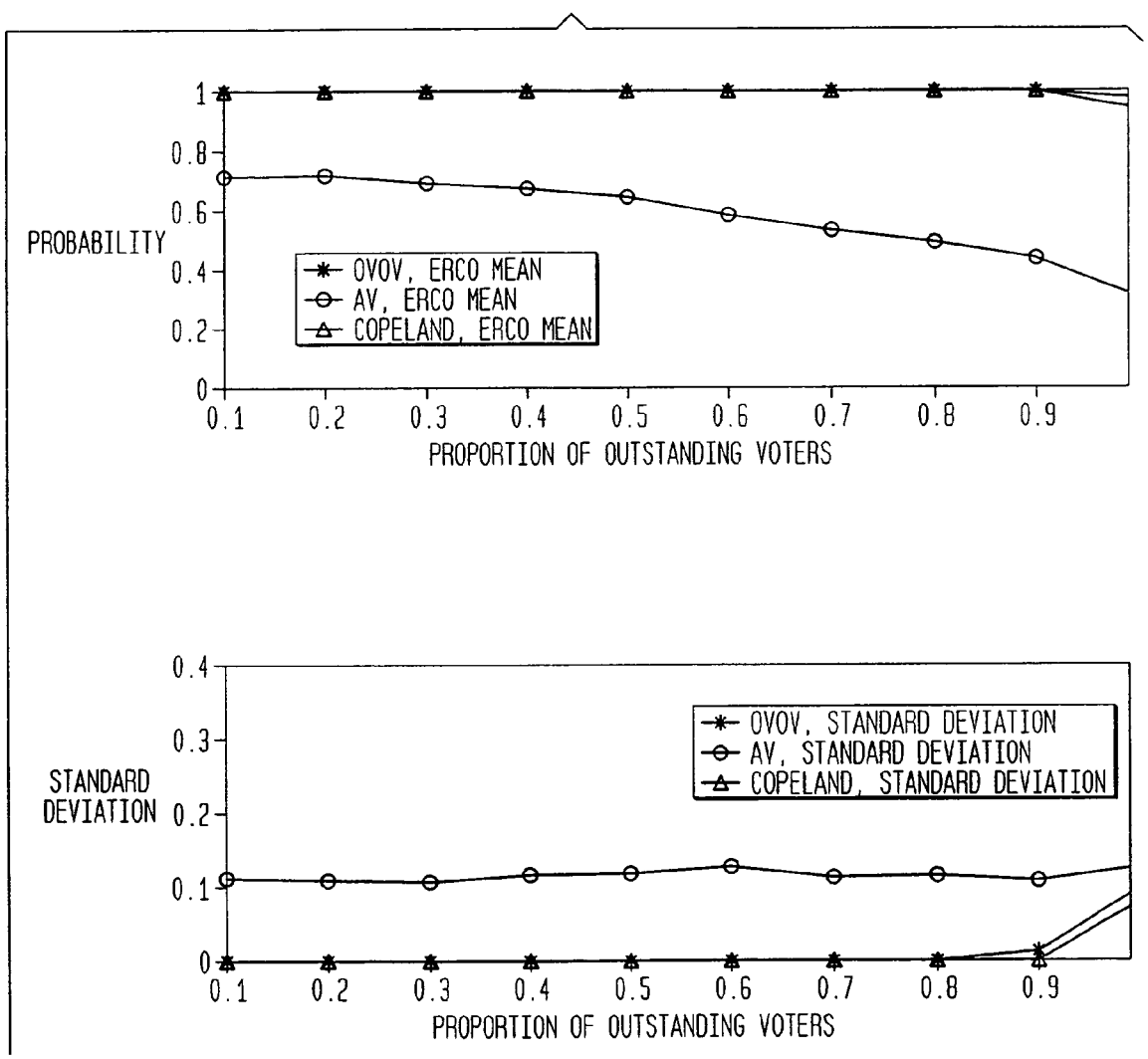
FIG. 16 is a graph showing variance and standard deviation outcomes for error-resilient collective outcomes produced by the present invention.

FIG. 16 is a graph showing variance and standard deviation outcomes for error-resilient collective outcomes produced by the present invention, using 1,000 votes. As can be seen, ERCO variance is close to zero for small numbers of voters. For 1,000 voters, ERCO variance is significant for AV regardless of the proportion of outstanding voters. ERCO variance is normally close to zero, but increases sharply for OPOV and Copeland voting when more than 90 percent of the voting information has not been received.

Figure 17A:
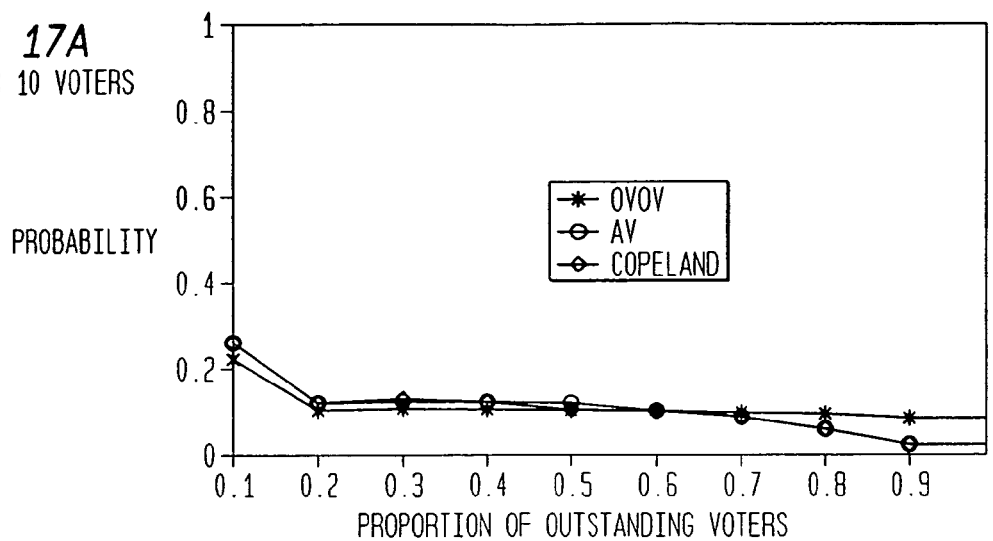
FIGS. 17A-17C are graphs showing benchmark predictions of three scoring methods using no tie breaking and homogeneous preferences.
Figure 17B:
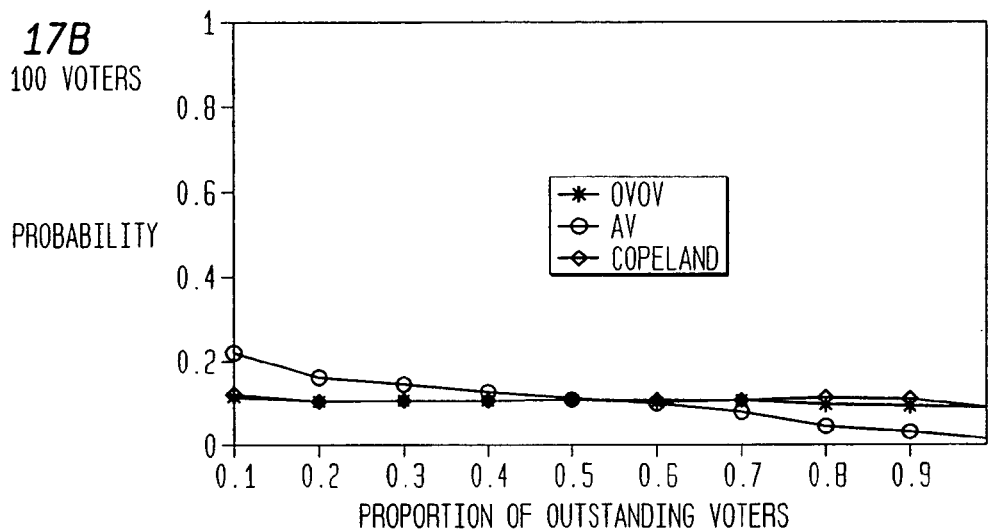
Figure 17C:
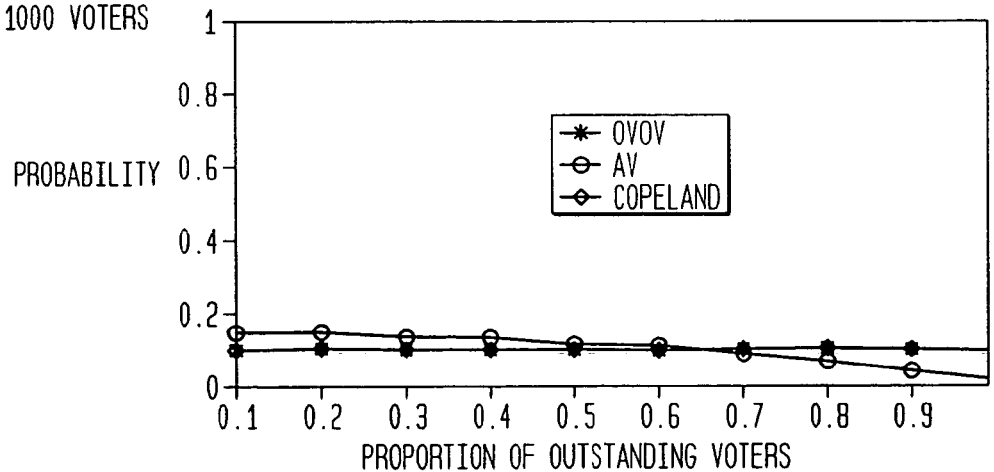

FIGS. 17A-17C are graphs showing benchmark predictions for three scoring methods using no tie breaking. In this simulation, OPOV, AV, and Copeland scoring methods were applied to each of three voting populations including 10 voters, 100 voters, and 1,000 voters. Homogenous preferences were tested using a plurality aggregation rule, and no tie breaking was implemented. As can be seen in the graphs, the benchmark predictions can be higher for AV than those predicted by ERCO analysis under the same conditions. This leads to the implications that: (1) benchmark predictions are as good as or better than ERCO for AV with 10 and 100 voters; (2) unlike most ERCO metrics, benchmark predictions tend to get worse as the proportion of outstanding voters increases; and (3) benchmark results for all three conditions are close together.

Figure 18A:
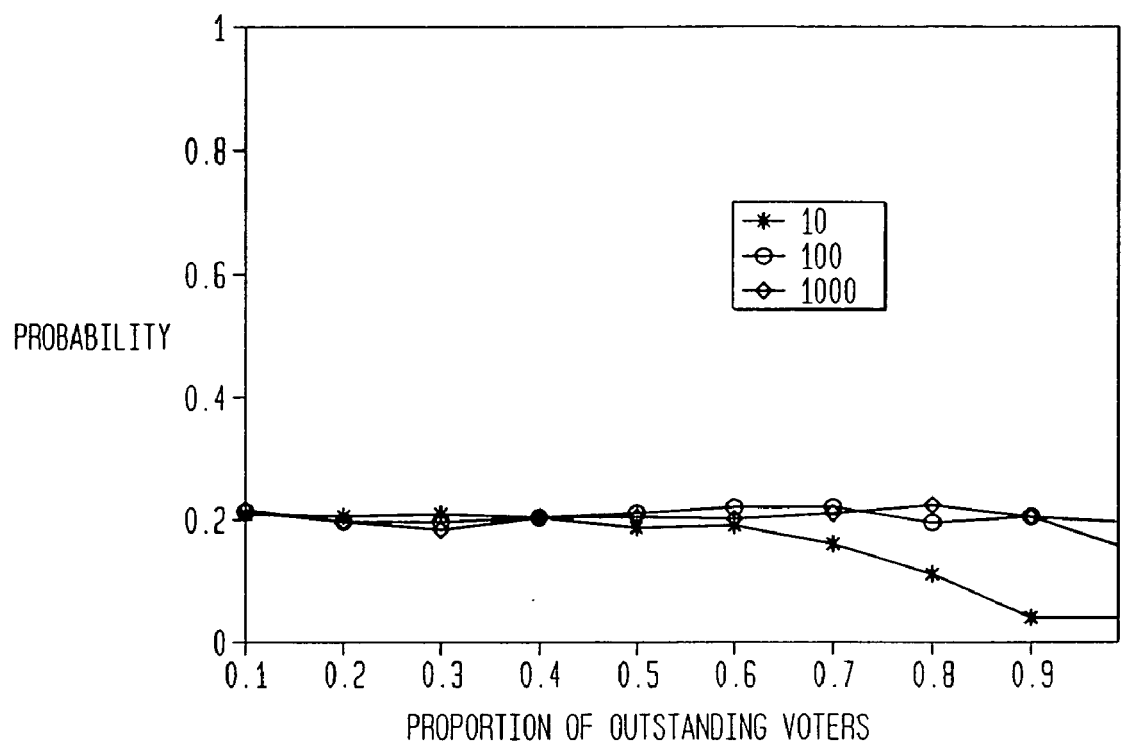
FIGS. 18A-18B are graphs comparing the error-resilient collective outcomes of the present invention and benchmark predictions.
Figure 18B:
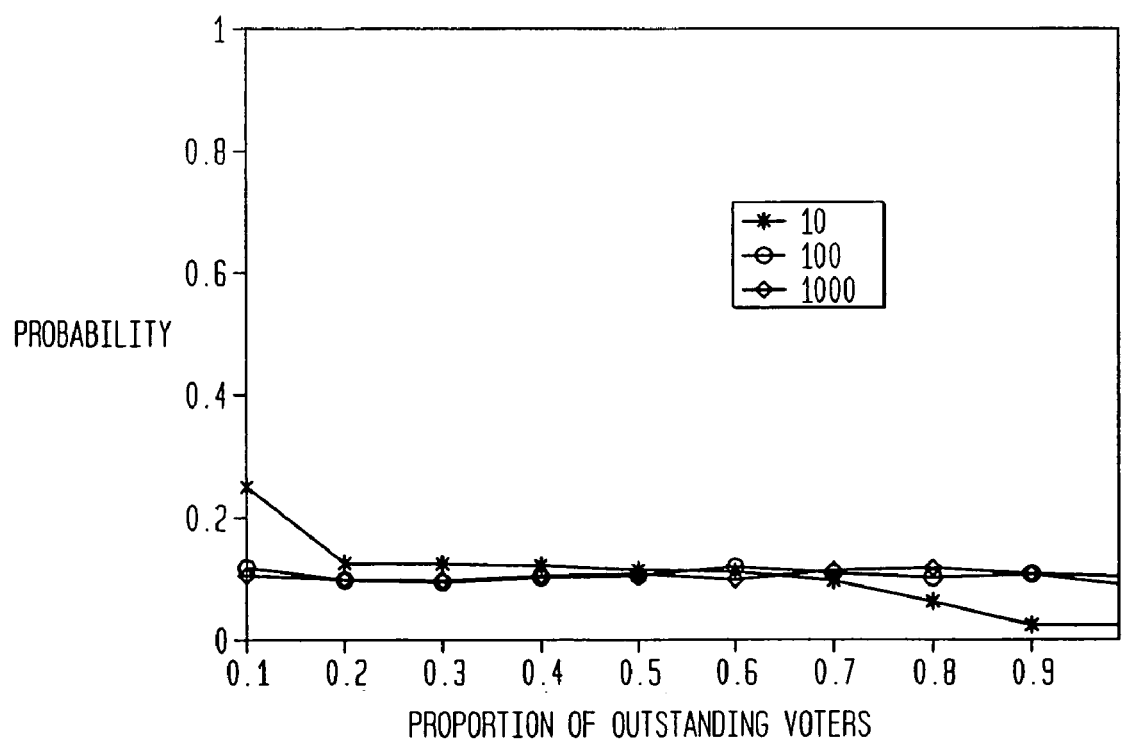

FIGS. 18A-18B are graphs comparing the error-resilient collective outcomes of the present invention and benchmark predictions for homogenous preferences using a plurality aggregation rule and no tie breaking. The ERCO results for 10, 100, and 1,000 voters are shown in FIG. 18A. The benchmark predictions are shown in FIG. 18B. As can be seen from the graphs, the benchmark predictions are higher than ERCO predictions when the amount of outstanding voting information is minimal. Both types of predictions are very close when the number of voters is large.

Figure 19A:
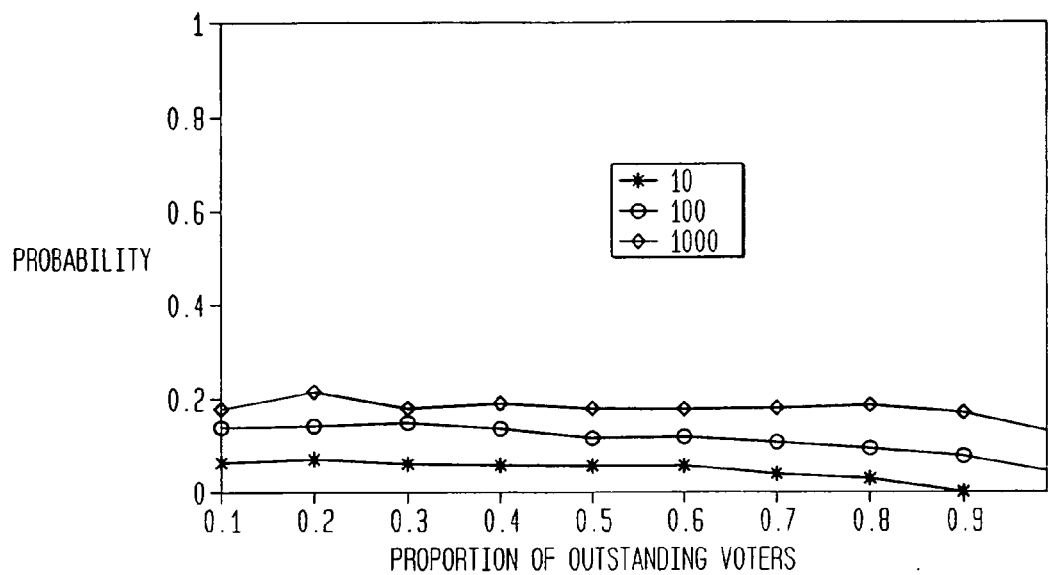
FIGS. 19A-19B are graphs comparing the error-resilient collective outcomes of the present invention and benchmark predictions.
Figure 19B:
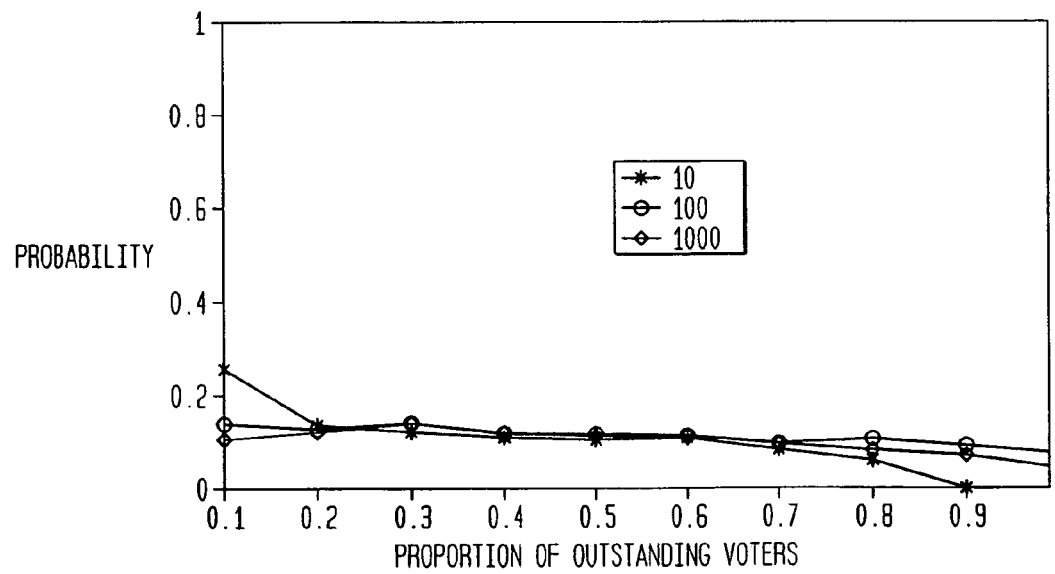

FIGS. 19A-19B are graphs comparing the error-resilient collective outcomes of the present invention and benchmark predictions for homogenous preferences using a plurality aggregation rule and no tie breaking. The ERCO results for 10, 100, and 1,000 voters are shown in FIG. 19A. The benchmark predictions are shown in FIG. 19B. As can be seen from the graphs, the benchmark predicts higher efficiency than ERCO predictors under more than one condition. This leads to the implications that: (1) for 10 voters, the benchmark metric predicts is higher ERCO efficiency than the ERCO analysis except when 90% or more of the voting information is outstanding; (2) Copeland voting with 1,000 voters consistently produces higher ERCO efficiency than the benchmark metric; and (3) for 100 voters, there is not much difference between the Copeland voting and benchmark metrics.

FIG. 20 is a graph showing the effects of false positives (FP) on three voting systems. The false positive was 0.01, which comprises a random variable subtracted from individual voter competence. The graph shows a bimodal distribution of 100 voters, with 90 percent homogeneity with high competence (0.9), 5 percent heterogeneity with 50/50 competence, and tie breaking. As can be seen, a low false positive rate degrades performance mostly under AV. OPOV is more sensitive to degradation than Copeland voting when more than 90% of the outstanding voting information has not been received. Accordingly, choosing a voting system and managing the inherent risk depends on a number of tradeoffs. When 90 percent of the outstanding voting information is outstanding, the voting systems answer different questions. For example, Copeland voting shows how much more each choice is preferred to every other choice. OPOV shows only the most frequently preferred top choice. Therefore, voting systems can be question-specific depending on the question to be answered.

FIG. 21 is a graph showing the effects of false positives on three voting systems. In this simulation, the false positive rate was 0.01, with a bimodal distribution, 100 voters, 90 percent homogeneity with high competence (0.9), 10 percent heterogeneity with 50/50 competence, and tie breaking. As can be seen from the graph, decreasing the percentage of voters in the homogenous group reduces the ERCO efficiency of Copeland voting to 0.95 and decreases the ERCO efficiency of OPOV to 0.925.

Figure 22:
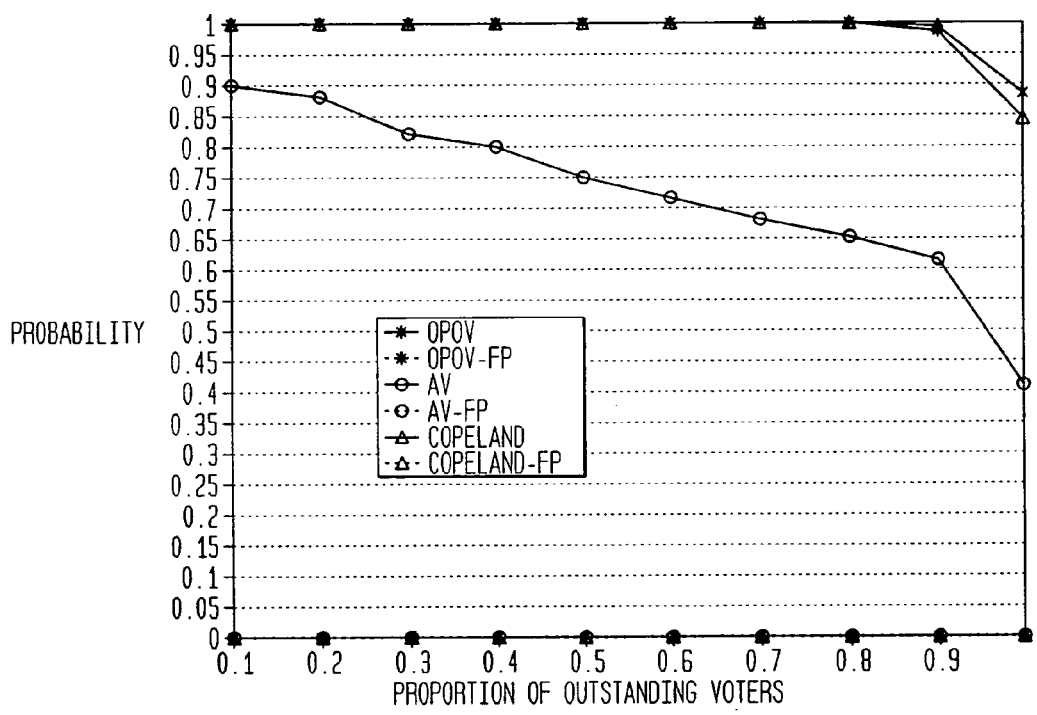
FIG. 22 is a graph showing the effects of false positives on three voting methods.

FIG. 22 is a graph showing the effects of false positives on three voting systems. In this simulation, the false positive rate was 0.1, with a bimodal distribution, 100 voters, 75 percent homogeneity with high competence (0.9), 25 percent heterogeneity with 50/50 competence, and tie breaking. As can be seen from the graph, decreasing the number of voters in the homogeneous distribution degrades OPOV and Copeland ERCO efficiency below 0.95 and drops Copeland from first place to second place with an approximately 10 percent decline in ERCO efficiency. As the false positive rate increases and the number of voters in the homogenous distribution decreases, the difference in ERCO efficiency between OPOV and Copeland voting becomes noticeable when the proportion of outstanding voters is less than 90%. As the populations in the two distributions become more equal, the threshold of differentiation between OPOV and Copeland voting will begin with a smaller percentage of the outstanding votes.

Figure 23A:
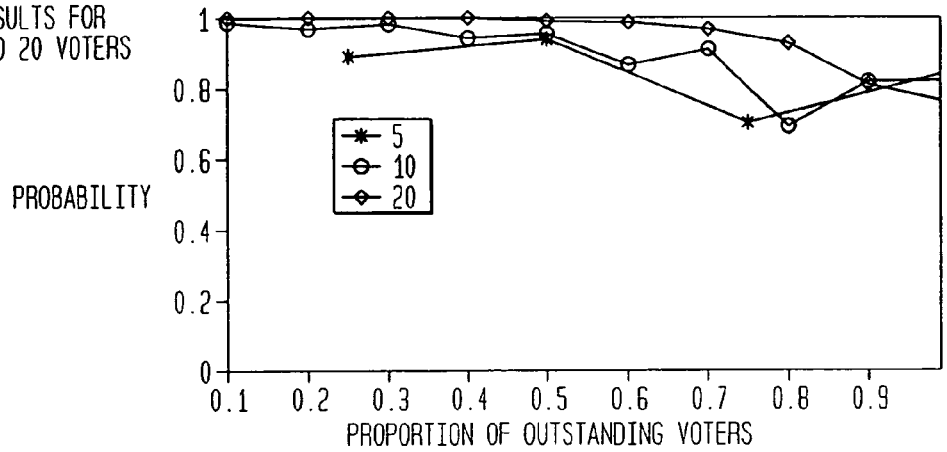
FIGS. 23A-23C are graphs comparing the probability of producing error-resilient collective outcomes and benchmark predictions.
Figure 23B:
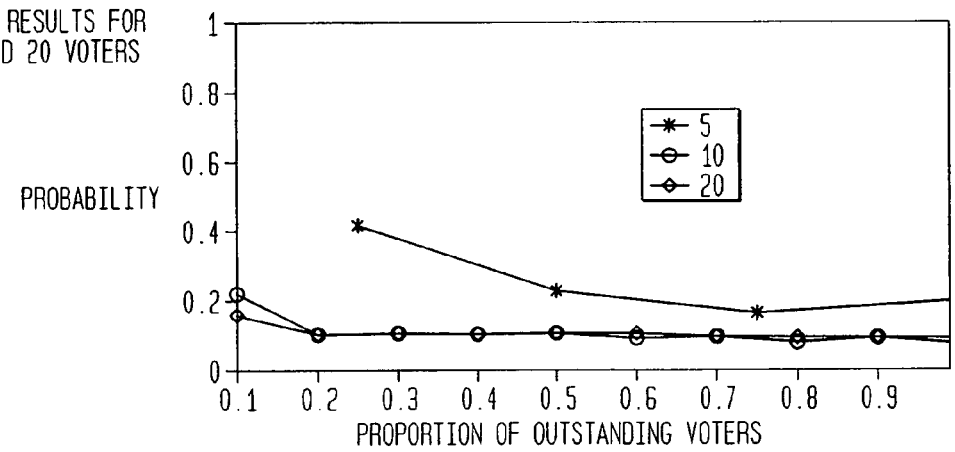
Figure 23C:
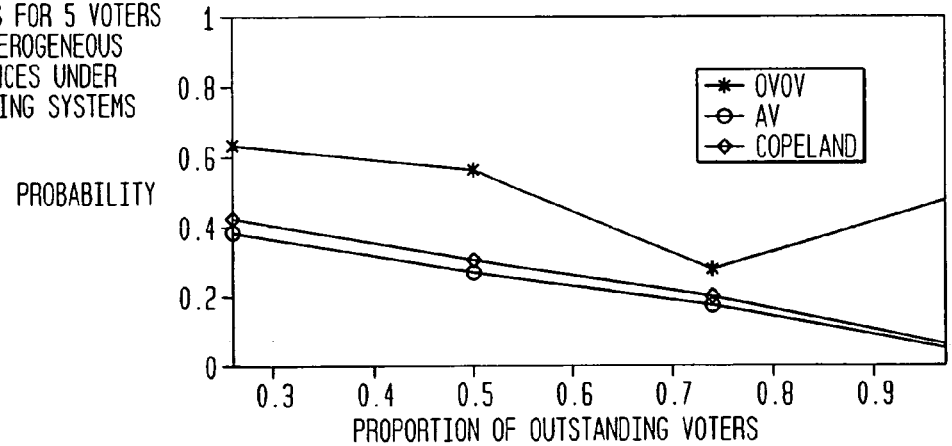

FIGS. 23A-23C are graphs comparing the probability of producing error-resilient collective outcomes and benchmark predictions, using OPOV, neutral competence, homogenous preferences, plurality aggregation, and no tie breaking. The benchmark predicts lower results than ERCO analysis. The ERCO results are more volatile. When preferences are heterogeneous, ERCO analysis predicts lower but less volatile ERCO efficiency. This leads to the implications that: (1) homogeneity produces volatile results when the number of voters is small and competence is not included in the model; (2) a greeter probability of a tie and no tie breaking reduce ERCO efficiency under heterogeneity; and (3) for 5 voters, under some conditions, voting analysis predicts lower ERCO for AV and Copeland than the benchmark prediction.

Figure 24A:
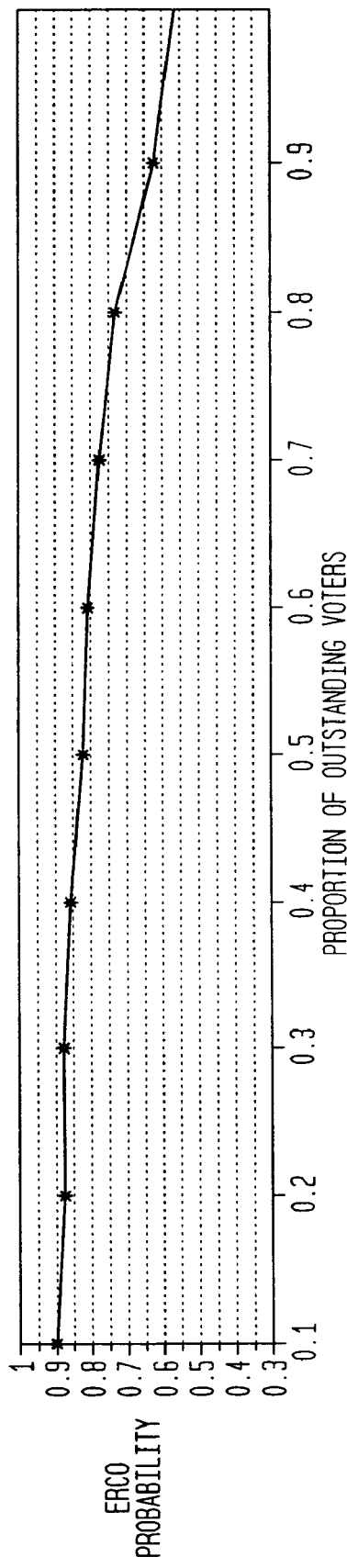
FIGS. 24A-24C are graphs showing the efficiency and effects of time on the probability of producing error-resilient outcomes.
Figure 24B:
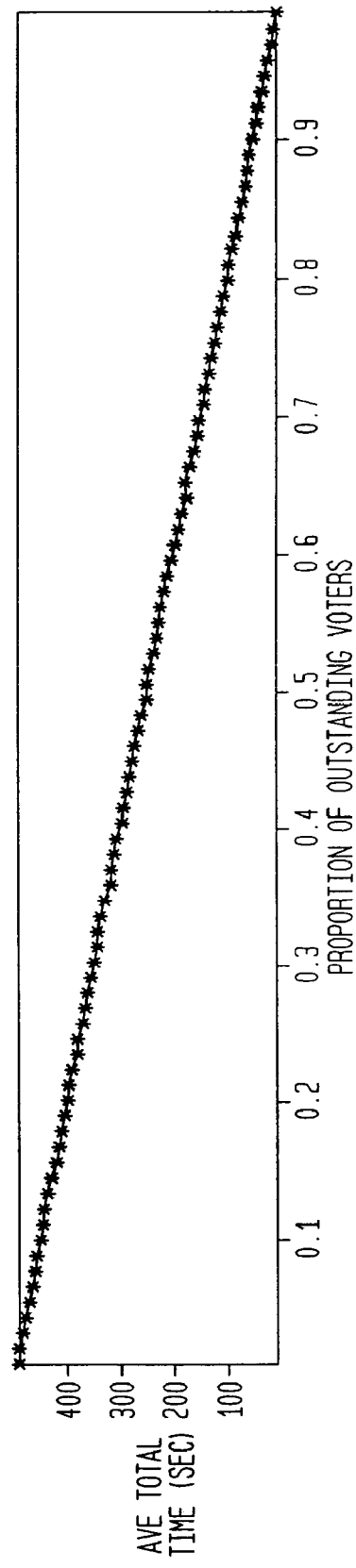
Figure 24C:
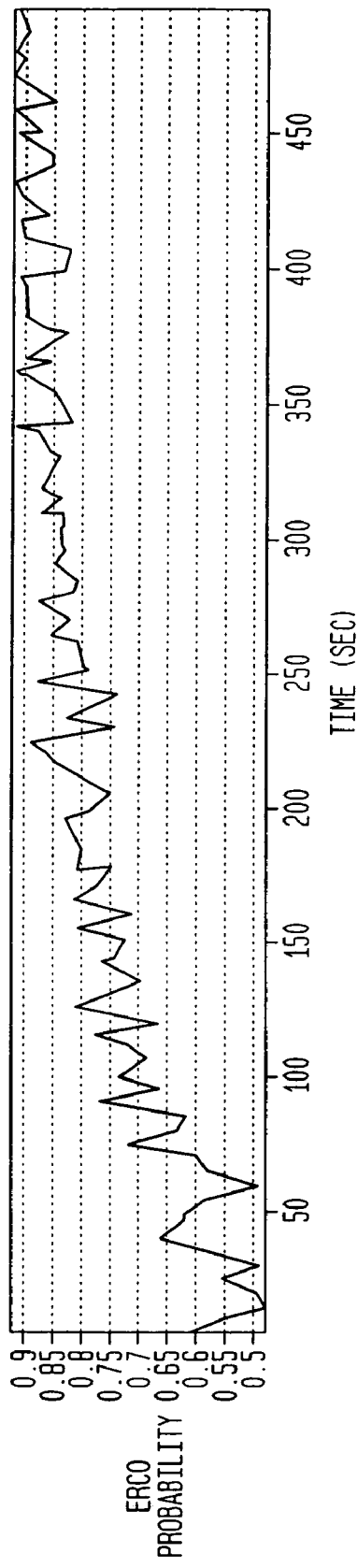

FIGS. 24A-24C are graphs showing the efficiency and effects of time on the probability of producing error-resilient outcomes. In this simulation of 100 voters, 75 voters had homogeneous preferences and 0.48 mean competence. 25 voters had heterogeneous preferences and 0.52 mean competence. The false positive rate was 0.01 and the false negative rate was 0.01. Shapley-Grofman weighting was applied, and ties were randomly broken. As can be seen from the efficiency graph shown in FIG. 24A, even with moderate competence in a bimodal preference culture, Copeland ERCO efficiency reaches 0.9. When only half of the outstanding votes have been collected, Copeland ERCO efficiency is 0.85 or greater. Further, as can be seen with reference to FIG. 24B, waiting 250 seconds produces a probability of 0.85 of producing an ERCO when half of the outstanding votes have been collected. Waiting for the remainder of the outstanding votes only produces a 0.05 increase of producing an ERCO. The graph shown in FIG. 24C does not apply averaging. The time-to-ERCO efficiency patterns are more complex when real variation is not simplified by averages. ERCO efficiency increases monotonically, but is volatile.

Figure 25A:
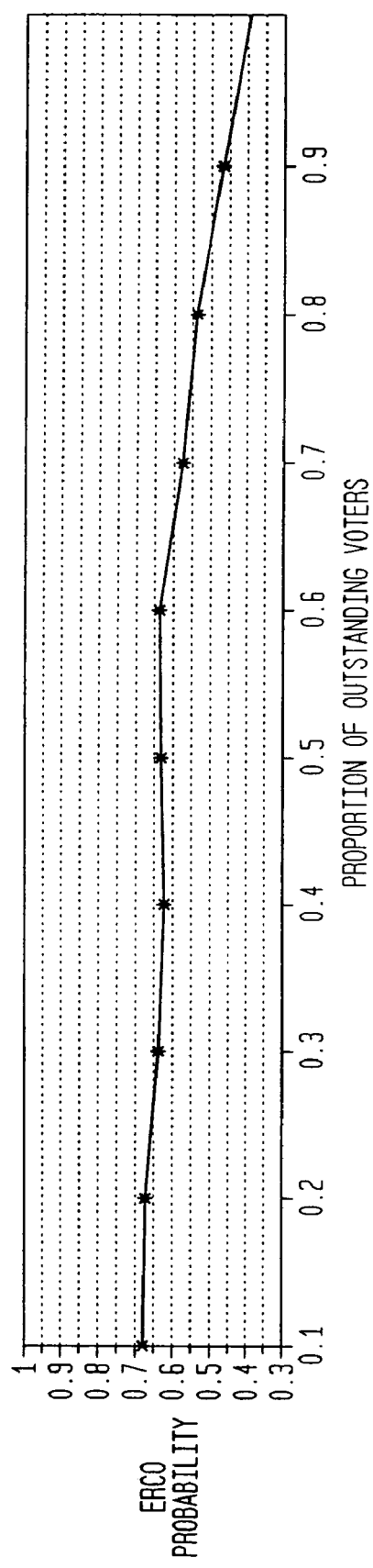
FIGS. 25A-25C are graphs showing the efficiency and effects of time on the probability of producing error-resilient outcomes.
Figure 25B:
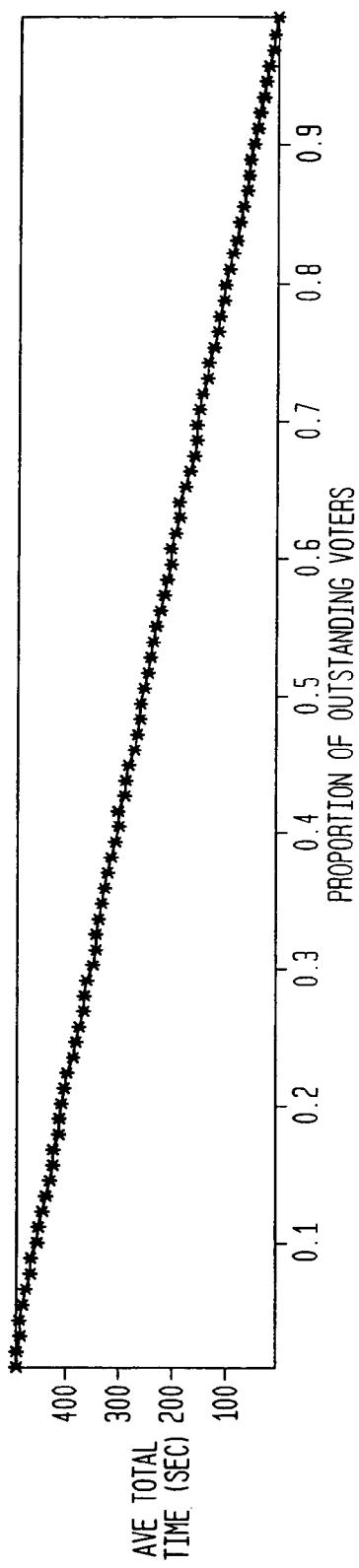
Figure 25C:
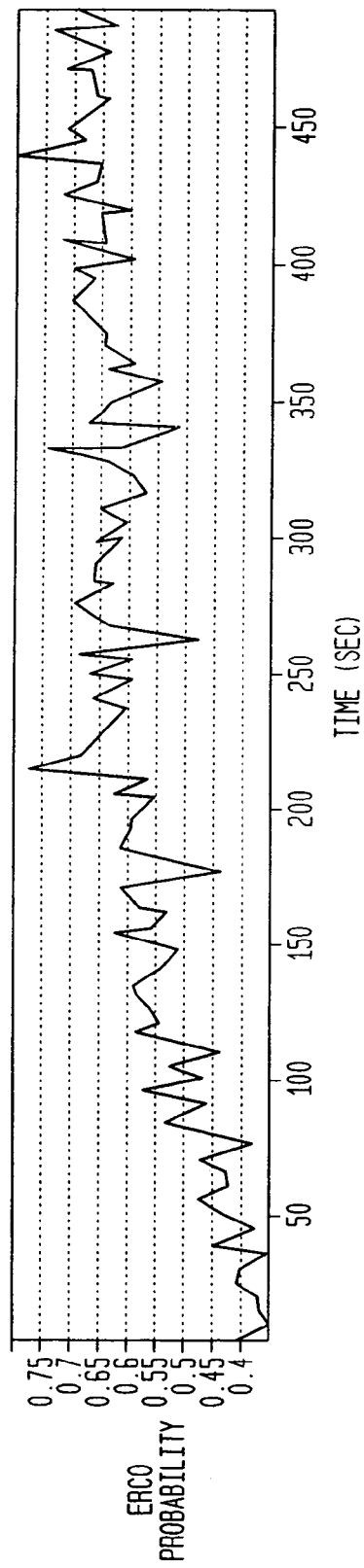

FIGS. 25A-25C are graphs showing the efficiency and effects of time on the probability of producing error-resilient outcomes. In this simulation of 100 voters, 51 voters had homogeneous preferences and 0.48 mean competence. 41 voters had heterogeneous preferences and 0.52 mean competence. The false positive rate was 0.01 and the false negative rate was 0.01. Shapley-Grofman weighting was applied, and ties were randomly broken. As can be seen from the efficiency graph shown in FIG. 25A, in a bimodal sensor culture with groups that are nearly equal in size that share moderate competence, ERCO efficiency barely exceeds 0.65 when half of the votes have been collected. Additionally, there is a small marginal gain in ERCO efficiency derived from waiting for more than half of the incoming voting information. Further, as can be seen with reference to FIG. 25B, waiting 250 seconds produces an approximately 30% improvement in ERCO efficiency. Waiting longer than 250 seconds produces a very small increase in ERCO efficiency. The graph shown in FIG. 25C does not apply averaging, and shows a Rayleigh distribution with a mean of 5 seconds. The time-to-ERCO efficiency pattern is more complex when the actual variation of vote arrival time is not simplified by averages. ERCO efficiency increases monotonically, but is volatile.

Figure 26A:
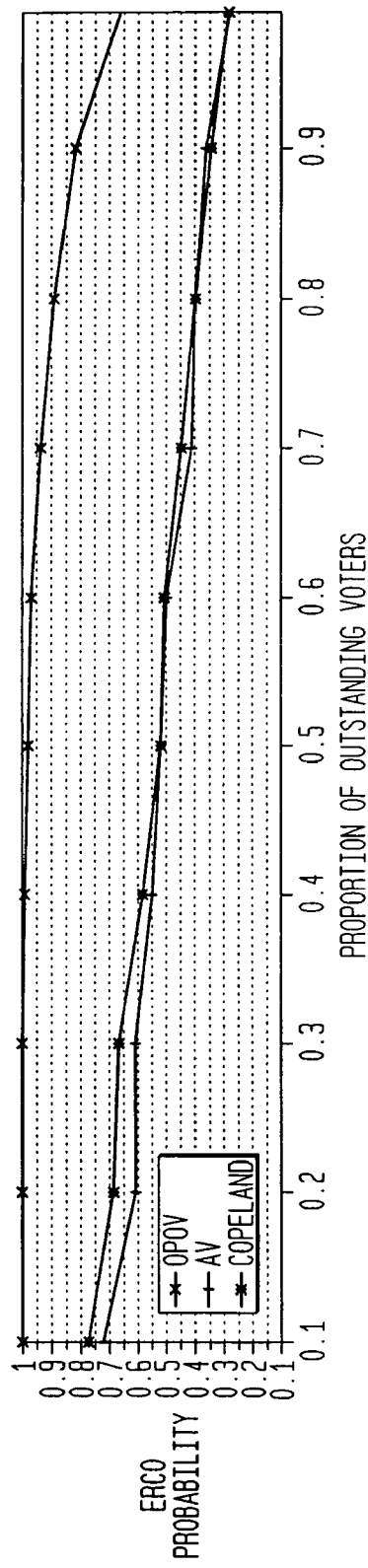
FIGS. 26A-26B are graphs showing comparisons of the probability of producing error-resilient outcomes for three scoring methods based on homogeneous and heterogeneous preferences.
Figure 26B:
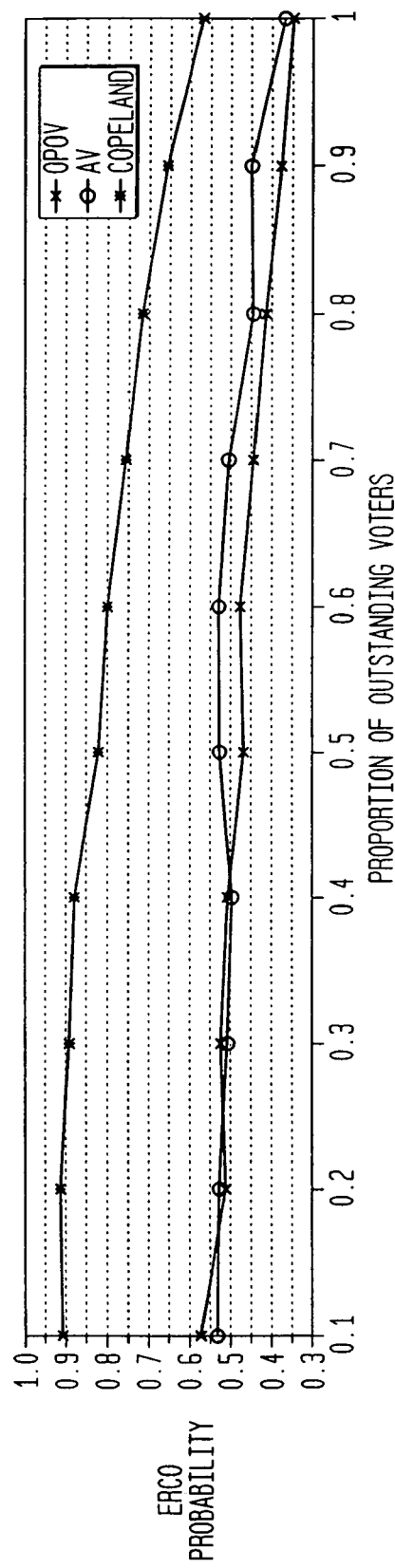

FIGS. 26A-26B are graphs showing comparisons of the probabilities of producing error-resilient outcomes using three scoring methods (OPOV, AV, and Copeland) based on homogeneous and heterogeneous preferences. The parameters of this simulation were as follows: 100 voters, 75 voters with homogeneous preferences and 0.9 mean competence, 25 voters with heterogeneous preferences and 0.48 mean competence, False Positive Rate=0.01, False Negative Rate=0.01, Shapley-Grofman weighting, and ties randomly broken. As can be seen in FIG. 26A, for homogeneous preferences, the OPOV scoring method is optimal. However, as shown in FIG. 26B, for heterogeneous preferences, the Copeland scoring method is optimal.

FIGS. 27A-27B are graphs showing comparisons of the probabilities of producing error-resilient outcomes using three scoring methods (OPOV, AV, and Copeland) and the effects of time on homogeneous and heterogenous preferences. The parameters of this simulation were as follows: 100 voters, 75 voters with homogeneous preferences and 0.9 mean competence, 5 voters with heterogeneous preferences and 0.48 mean competence, False Positive Rate=0.01, False Negative Rate=0.01, Shapley-Grofman weighting, and ties randomly broken. As can be seen in FIG. 27A, for homogeneous preferences, the OPOV scoring method is optimal. However, as shown in FIG. 27B, for heterogeneous preferences, Copeland voting is optimal.

For purposes of illustration of how the present invention can be employed by a plurality of voters to produce expedited and accurate group choices and resiliency to communications and decision-making errors, the following examples are provided.

EXAMPLE 1

In the first Example, a port security situation, such a physical and cyber attack on New York Harbor, has targeted the George Washington Bridge (GWB), Lincoln Tunnel (LT), Holland Tunnel (HT), and Verrazano Bridge (VB). Emergency response teams (ERT's), coordinated by Port Security Headquarters in Hoboken (Portsec HQ), have been dispatched to each targeted area in accord with state and national contingency plans developed under the auspices of the Port Authority of New York and New Jersey (PANYNJ). Under this plan, each ERT contains mobile air and water forces, health management teams, and three Nuclear, Biological, Chemical (NBC) units equipped to detect and manage terrorist attacks The plan includes a contingency option that allows reallocation of two NBC units from one or more of these locations to another. This contingency allows flexibility in the management of crises to make adjustments in the distribution of NBC units across the ERT's. An ERT can initiate a request by from Portsec HQ in Hoboken. ERT requests can be routed directly or indirectly to Portsec HQ.

Contingency planning has designated a team of five mobile observers to assess the current situation around the harbor and make a collective recommendation to the Commander at Portsec HQ. This team has access to Global Positioning System satellite feeds and other intelligence to enable them to monitor what is going on in each target area. Team members have been trained in the interpretation of different types of intelligence and have participated in simulations in which they are forced to render decisions under stress. In these exercises, ERT's have learned to implement adjustments derived from the recommendations from the mobile team. This special mobile team (SMT) of observers consists of John, Mary, Ed, Dave, and Debby. Four of the observers each have primary responsibility for one of the attack targets; the fifth, Debby, is based out of Portsec HQ.

The team at the Lincoln Tunnel is being overwhelmed by unexpected operational demands created by an NBC attack and requests more NBC support. Portsec HQ asks the special mobile team to provide a collective recommendation about NBC unit reallocation. The SMT know that they cannot depend voice communications to negotiate a consensus and that wired and wireless communications infrastructure is unreliable. However their plans have anticipated this situation and created a CDSS that allows them to reach a consensus despite undependable communications. Their task is to assess the number of NBC units required at each response site so that resources can be reallocated to deal with the evolving crisis. Each team member takes account of the entire Port situation and makes a recommendation about the number of NBC units needed at each response site. Each person can recommend an increase or decrease of by 2 units at each location or determine that no (zero) units should be allocated to a location. So the possible ratings are −2, 0, or +2.

Table 1, below, shows the ratings of the SMT members for the reallocation options:

TABLE 1

NBC Unit Allocation Ratings from Five Mobile Observers

| | John | Mary | Ed | Dave | Debby |
|---|---|---|---|---|---|
| Holland Tunnel | −2 | −2 | 0 | −2 | 0 |
| Lincoln Tunnel | −2 | 0 | 2 | 0 | 0 |
| GW Bridge | 0 | 2 | −2 | 2 | −2 |
| Verazzano Bridge | 0 | 0 | 0 | 0 | 2 |

These ratings are transformed into ordinal form in Table 2. This ordinal form shows which unit allocation options are rated higher than other options. Cells that are in gray indicate a tie between pairs of choices in descending order. Note that John's ordering includes two sets of tied choices, GWB and VB as well as HT and LT.

TABLE 2

Observer Ratings in Ordinal Form

| John | Mary | Ed | Dave | Debby |
|---|---|---|---|---|
| GWB | GWB | LT | GWB | VB |
| VB | LT | HT | LT | HT |
| HT | VB | VB | VB | LT |
| LT | HT | GWB | HT | GWB |

In ordinal form, we can see what would happen if the ratings were scored using a voting mechanism based on a one-person, one vote system with a plurality aggregation rule. Under this is mechanism, one vote is assigned to first place ratings and the winner is the choice that has the most votes. As shown in plurality scoring column in Table 3, below, GWB, with three votes, is the plurality winner.

TABLE 3

Collective Outcomes Produced from Observer Inputs

|  | Plurality Scoring | Copeland Scoring |
| --- | --- | --- |
| Holland Tunnel | 0 | −8 |
| Lincoln Tunnel | 1 | 1 |
| GW Bridge | 3 | 2 |
| Verazzano Bridge | 1 | 5 |

However, a weakness of this scoring procedure is intuitively obvious. GWB and VB are tied in John's preference ordering and, by chance, John entered GWB first and VBV second. If this tie were not resolved so haphazardly, GWB would still be a plurality winner, but by a margin of one vote, not two votes.

To gain a more granular interpretation of the rating data in Table 2, Copeland scoring can be applied. The Copeland method finds the Condorcet score for each pair (i, j) of choices and then subtracts the Condorcet for choice j from choice i to measure the net strength of the relationship between choices and across all pairs of choices. The Condorcet score counts the number of times that each choice i is rated higher than each choice j. For instance, in Table 2, VB is preferred to GW twice, HT four times, and LT 2 times, for a total Condorcet score of 7. However, if we subtract the countervailing Condorcet scores for GW, LT, and HT in pair-wise comparisons with VB, the results are 2, 1, and 0, respectively. Subtracting these Condorcet scores, VB's net, or Copeland scores, become 0, 1, and 4, respectively, for a total Copeland score of 5, as shown in Table 3.

In this scenario, extracting more information from the voting input data enables us to avoid a voting mechanism error by identifying VB, not GW, as the location most critically in need of additional NBC units. A similar analysis can enable us to deal with the impact of communications error on collective decision-making outcomes.

The ability to reach a consensus about a collective outcome despite missing voting data depends on the number of voters, the number of choices, the aggregation rule, the granularity of the preference data collected, and the mechanism for scoring voting inputs. In this example, the goal is to find winner as quickly as possible so that the commander can decide and implement necessary reallocations.

The example does not address the cases in which the error-resilient collective outcome is a tied or an indecisive result. Knowing that a consensus will be tied or indecisive without the missing data can be just as important as identifying an error-resilient consensus. For the commander can use this information to obtain more information to clarify the situation. The CDSS could be designed to inform the commander if the tied or indecisive result represents a strong or weak consensus. For instance, if one of the tied choices is a Condorcet winner or if the indecisive outcome becomes decisive when re-scored under a different voting system, the commander could be presented with appropriate advice. If there is latent Condorcet winner, the CDSS might automatically resolve the presentation of the collective outcome to allow the commander to take immediate action. Similarly, if an indecisive result can be resolved or if it cannot be resolved, the commander can be presented with advice that allows implementation of immediate followup actions to obtain additional information and decide and implement a reallocation decision.

However, if we assume that the goal is to identify a consensus, suppose that Postsec HQ has not received votes from Debby or Ed. In this situation, it would be reasonable to pronounce GW the error-resilient winner because Debby and Ed cannot possibly cast votes in any way that would change the plurality collective outcome.

In contrast, if Copeland scoring were used and Debby's votes were missing, VB would be in second place (with a score of 2), while GWB (with a score of 3) would be in first place. However consideration of the ways in which Debby could rate the choices would reveal the possibility of generating a Copeland score of 5 for VB, making it a winner. Similarly, if John's votes were missing, the Copeland outcome would be a 3-3 tie between LT and VB, but logical analysis of possible collective outcomes generated by John's would disclose that the tie is not a stable collective outcome.

The client-server model involves two risks: node failure and delays in collecting data and reporting the results. If a cyber or physical attack disables or eliminates the Portsec HQ server, NBC units will not be reallocated and avoidable losses of life and property will occur. Even if a single-point failure does not thwart emergency coordination, fatal delays may occur in collecting votes from the SMT, producing a collective outcome, and notifying the ERTs to take appropriate action.

To avoid these risks, the decision task can be redesigned to improve the efficiency of data collection and reporting and thereby increase the flexibility and efficiency of the ERTs. In the following peer-to-peer model, the task is restructured to avoid burdening the central host managers by presenting reallocation choices that incorporate information about which locations is should send an NBC unit to another location. Every ERT member sends their votes to every other member of the group; each member aggregates votes to produce a collective assessment of specific options for emergency reallocations of NBC units.

This formulation of choices also avoids a potential negative consequence enabled by having the voters simply rate the relative needs of the four emergency scene locations. If central host management is charged with reallocating NBC units, they may allocate resources in a way that unwittingly exacerbates the plight of one or more locations. By asking for a collective assessment of which locations should lose or gain an NBC unit, teams can internalize potential external negative consequences in formulating their ratings and associated preference orders.

As shown in Table 4, this reformulated decision task asks the five emergency response team observers to approve of specific reallocation choices. Notice that although a total of 12 approval votes are cast, the "winners" are those options that attract approval from a majority of decision makers (3 out of 5) even though no option gains a majority of total votes cast.

TABLE 4

Approved Allocations of Two Contingent NBC Units

| Allocation Options | John | Mary | Ed | Dave | Debby | Totals |
| --- | --- | --- | --- | --- | --- | --- |
| HT to LT |  |  | x |  |  | 1 |
| HT to GWB |  | x |  | x | x | 3 |

TABLE 4-continued

Approved Allocations of Two Contingent NBC Units

| Allocation Options | John | Mary | Ed | Dave | Debby | Totals |
|---|---|---|---|---|---|---|
| HT to VB  |   |   |   |   | x | 1 |
| GWB to HT |   |   |   |   |   | 0 |
| GWB to VB |   |   |   |   |   | 0 |
| GWB to LT | x |   | x |   | x | 3 |
| VB to GWB |   |   |   | x |   | 1 |
| VB to HT  |   |   |   |   |   | 0 |
| VB to LT  | x |   |   |   |   | 1 |
| LT to HT  |   |   |   |   |   | 0 |
| LT to GWB |   | x |   |   |   | 1 |
| LT to VB  |   |   |   |   | x | 1 |

The collective outcome in Table 4 is a tie, which in conventional collective decision-making, may seem like a problematic outcome. However the implication of the outcome makes sense in the context of the task. Under some circumstances, it may seem illogical not to shift an NBC unit from HT to the LT directly and then to move a unit from the LT to the GWB. But the judgment of the voters may be taking account of intelligence and observations that indicate that shifting a unit from the LT to the GWB would be undesirable and/or infeasible.

In this decision task scenario, the marginal differences in the votes would not seem to allow room to search for specific instances in which missing votes would not interfere with producing a collective outcome. However, since GWB to LT and HT to GWB account for 50% of the total approval votes cast, missing votes from one observer would not prevent the group from reaching a stable consensus.

This collective outcome is interesting because it demonstrates a potential CDSS problem. The result says that two NBC units should be moved from GWB to LT and HT to GWB, respectively. But the logic of the decision task suggests that the CDSS should check these results because it would be more efficient to move two NBC units from the HT to the LT and leave the GWB NBC units in place.

If we reinterpret the collective outcome in Table 4 using Condorcet and Copeland scoring, shown in FIGS. 3 and 4, the view of the results and possibilities for tolerating missing votes increase. If the objective of the decision task is to select a single reallocation option, then HT to GWB, with a significant marginal lead over GWB to LT, can remain stable as the winner despite some missing votes. However, FIGS. 1 and 2 indicate that the tied outcome under approval voting between GWB to LT and HT to GWB is weak masking not only a distinct expression of priority for HT to GWB, but also obscuring strength of support for VB to GWB. So if the decision task is designed to allow ties, the more granular results produced by Condorcet and Copeland scoring would not allow much tolerance for accepting the tied collective outcome produced by approval scoring.

This example illustrates the necessity of checking collective scoring results under more than one voting system. For theoretically, approval voting is an efficient way of finding the Condorcet winner without doing all of the binary comparison arithmetic. This property can be important to exploit in designing CDSS's that can operate within the energy and time constraints of mobile devices. In small groups, the margins produced by collective outcomes can be so fragile that checking must be done.

Another reason for double-checking collective choice arithmetic is to detect and resolve collective intransitivities and paradoxes produced by different scoring systems (Arrow, K., Social Choice and Individual Values, New Haven: Yale University Press, 1954; Condorcet, J. A. N Marquis de, Essai sur L'application de l'analyse à la Probabilité des Décisions Rendues à la Pluralité des Voix, Paris, 1785; Fishburn, P. "Monotonicity Paradoxes In The Theory Of Elections", Discrete Applied Mathematics, vol 4, 119-134, 1982; and Gavish, B, and J. H. Gerdes, Jr, "Voting Mechanisms and their Implications in a GDSS Environment" Annals of Operations Research, vol 71, 41-74, 1997). For instance, suppose that approval voting produced an outcome that selected GWB to LT and LT to GWB. This result would not make logistical sense. In addition, this outcome would illustrate the lack of a clear-cut or transitive collective choice. With more voters, particularly under plurality scoring, the probability of producing such outcomes increases. The probability of producing tied outcomes under approval voting can be five times as likely as the distribution of voter preferences becomes more heterogeneous. In a competence decision task, when voters have heterogeneous preferences, the monotonically increasing function that occurs in the "jury theorem" as average voter competence increases can paradoxically become monotonically decreasing under approval voting (Pinkham, R. and A. Urken, "Competence and the Choice of a Voting System," unpublished manuscript, 1991).

Reprocessing collective outcomes under alternative voting methods not only detects such intransitivities, but it also enables the CDSS to determine if the intransitive result persists under more granular scoring methods such as Copeland or Condorcet scoring. Detecting and resolving such problems could also be important for determining the tolerance of an outcome for missing data caused by communications errors.

These considerations are particularly important when voting is decentralized. When each voter submits data to every other voter and receives votes from every other voter, it is possible that collective outcomes produced by different peers will be inconsistent. Such inconsistency would lead the ERTs to work at cross-purposes and undermine the purpose of using voting to coordinate emergency actions. The decentralized strategy also has to contend with potentially serious communications errors, but when the strategy is feasible, it may provide straightforward security and implementation advantages over a centralized strategy.

A representative embodiment of the present invention as a solution for this resource allocation problem in a centralized computer environment makes use of the agenda manager module 30 in FIG. 1 to set up an NBC reallocation agenda and the question creation module 32 of FIG. 3A to create the questionnaire and set the scheduling including the timing and the list of valid users. These settings are written in records for the agenda in the agenda database 80 of FIG. 1 and enforced by the user manager module 40 of FIG. 1. Since downloading the questionnaires and related attributes is unrealistic in an emergency, a preexisting template has been set up before the allocation of the ERTs so that the questions can be accessed on the mobile iPAQ devices located with the mobile ERT leaders at the emergency target sites. Access can be invoked by having a preset timer or by a message from an authorized member of the ERT network.

The five users enter responses and submit them in the agenda questionnaire form presented in the question creation module 32 of FIG. 3A after qualifying as respondents via the user manger module. As the votes are collected and entered in the agenda database, a report template from report creation module 52 of FIG. 5A is applied to test for error resilience. As soon as the analysis reveals an error-resilient outcome, a notification message is sent to the commander at PortSec HQ, who can send a message to all of the ERTs about how to reallocate the scarce NBC resources.

These steps can be used when the invention is used in client-server (FIG. 11) or peer-to-peer mode (FIG. 12). However in the latter mode, the test for resilience would be designed so that the analysis can be implemented despite the limited processing power and energy capacity of the mobile devices. The test design would be set up in the report creation module 52 of FIG. 5A. In addition, there would be no need to use the notification feature of notification module 54 of FIG. 5A because each iPAQ is running the present and unique invention, obviating the need to distribute information about the collective outcome from PortSec HQ.

EXAMPLE 2

The second example illustrates the application of the present invention to a competence decision task. Consider the following emergency scenario. Five observers, John, Mary, Steve, Debby, and Ed are asked to observe a convoy of vehicles passing from point A to point B. Each observer is to report the number of vehicles to a local commander, who will then use the information to determine if resources are adequate to attack the convoy and dominate to achieve victory. If the convoy's attributes make it risky to conduct an attack, the commander can avoid error (and loss of life and resources) and regroup to plan another attack.

For simplicity, suppose the commander has informed the observers that unconfirmed reports suggest that the convoy includes up to 7 vehicles. The commander knows—but does not tell his observers—that 5 or more vehicles—depending on their type—would make an attack unfeasible.

A conventional decision support approach might ask each observer to report the number of vehicles and indicate the amount of confidence that he has in this report. So for example, a form would allow Jim to report 4 vehicles and indicate that lie feels confident about the report. This conventional approach is limited by two problems. First, it forces each observer to select a single number to report instead of allowing observers to select a range of inputs. Indeed, some collective decisions are designed to rule out the possibility that an observer can report that he saw 4 or 5 vehicles, so Jim would be forced to choose between these two numbers. If Jim reports 4, he might be making an error by not indicating that there might be a number of vehicles that makes an attack infeasible. But if Jim were able to report 4 or 5 vehicles, this information could be integrated with reports from the other four observers to produce a more precise and accurate assessment.

Second, relying on self-rated confidence can be extremely undependable. Personality, decision task, and other factors often lead observers to overrate their own competence in making choices. Moreover, even when individual self-ratings are relatively accurate, processing them without a theoretical basis can produce disastrous results at the collective decision making level.

To remedy the first problem, our five observers are presented with choices that do not force them to make risky, error-prone choices. Since the commander has set a limit of 5 vehicles as the threshold for attacking, the observers are asked to select a choice from 0, 1, 1 or 2, 2, 2 or 3, 3 or 4, 4, 4 or 5, or 5 or more vehicles. This presentation of choices makes it less likely that an observer will undershoot or overshoot the correct number of vehicles.

To address the second problem, the confidence scale, representation of confidence ratings, and collective processing of input confidence ratings can be redesigned to minimize the error associated with using self-ratings.

The redesigned confidence scale, shown below in Table 5, is used to ask observers to make a nominal classification of the confidence that they associate with a report. (Raters would only see the nominal categories.) These nominal ratings are converted into numerical probability estimates that their reports are correct. The scale is designed to allow observers to indicate that they are "not sure" about how likely or unlikely their reports are to be correct.

The intent of the "not sure" category in this scale is to encourage an individual to avoid two types of ratings errors that can make self-ratings undependable:

TABLE 5

Self-Rating Response Scale for Convoy Assessment Task

| Not Confident | Somewhat Confident | Not Sure | Confident | Very Confident |
| --- | --- | --- | --- | --- |
| 0.2 | 0.4 | 0.5 | 0.6 | 0.8 |

Type 1 Error: Being confident about a wrong report, and
Type 2 Error: Being unconfident about a correct report The motivation and capabilities of emergency responders can make them highly motivated and adept self-raters of their competence. Emergency responders do not have to be perfect at rating their abilities for the vote mechanism model to work Normally, in academic and commercial experiments, self-rating is eschewed because individuals tend to overestimate their capabilities and the results can be volatile. But in these tactical scenarios, all that is required is that rater self-confidence and actual ability be correlated closely enough to enable the model to approximate collective behavioral patterns.

When network communications conditions and time constraints permit, competence ratings can be based on a database of behavioral measures derived from previous individual performance or collective assessments of individual performance. But in the current example, these assumptions do not apply.

Self-ratings can be aggregated in support of two goals. One goal is to compute the likelihood that the collective assessment of the number of vehicles is correct; the other goal is to weight the votes that are used to generate the collective assessment of the correct number in order to increase the group probability of making a correct decision.

To support the first goal, one can estimate the average individual competence of the voters and, if one assumes that group performance is equivalent to average individual performance, use the resulting probability to determine if the reported number of vehicles is sufficiently trustworthy to launch an attack. Alternatively, the average (self-rated) competence can be used along with other parameters of the voting situation (the number of voters and the size of the majority required to form a winning coalition) to compute the so-called Condorcet "jury theorem," (Condorcet, 1785) an application of the binomial theorem, to find the probability that the team of observers will make a correct decision (Shapley and Grofman, 1984).

Figure 13:
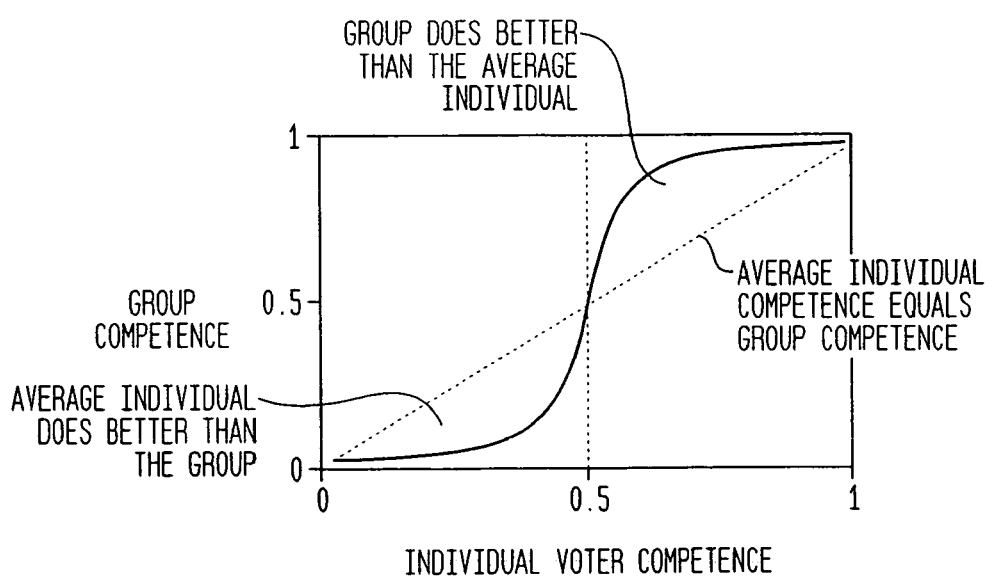
FIG. 13 is a graph showing the relationship between individual and group competence in the Condorcet "jury" theorem.

In the "jury theorem," shown in FIG. 13, preferences are a random variable and a small change in the average voter competence can produce a dramatic negative or positive effect on the probability that the group will produce a correct collective decision. The average voter competence and jury theorem interpretations both offer precise, but not necessarily accurate, guidance in evaluating the collective report of the observers. For, as shown in FIG. 13, sometimes the group can do better (or worse) than an average voter. And for small groups (with fewer than 50 voters), the rapid rate of change that characterizes the jury theorem produces more gradual increases in the group probability of making a correct collective decision. Consequently, small groups require an average individual competence well over 0.5 to maximize the probability that the group produces a correct collective decision.

The Condorcet model computes the cumulative results that one would expect to find in multiple experiments with the current parameters; the model does not tell us how to intervene to maximize the production of a correct choice in a particular collective decision.

Processing the self-rated competencies to weight the votes of the team can have a direct impact on the likelihood that a particular collective decision is correct. But if votes are weighted according to the proportion of times that an individual makes a correct choice, the collective performance of the group will not be optimized. Instead, using ln (p/1−p) produces optimal results. A Monte Carlo experiment provides empirical support for this rule (A. Urken, "Social Choice and Distributed Decision Making, in R. Allen, ed., IEEE/ACM Conference on Office Information Systems, Palo Alto, 1988).

TABLE 6.1

Ratings of Choices for the Number of Convoy Vehicles

| Choices | John | Mary | Steve | Debby | Ed |
|---|---|---|---|---|---|
| 0 vehicles | | | | | |
| 1 vehicle | | | | | |
| 1 or 2 vehicles | | | | | |
| 2 vehicles | | | | | |
| 2 or 3 vehicles | x | x | | | |
| 3 vehicles | | | x | | |
| 3 or 4 vehicles | | | | x | x |
| 5 vehicles | | | | | |
| more than 5 vehicles | | | | | |

Table 6.1 above shows the ratings of the number of vehicles by our five-member team of observers. By inspection, it appears that the collective outcome is likely to be indecisive if a majority is required for a collective decision. If plurality were used without the tiered choice alternatives, we could end up with a tie, a plurality for 2 trucks, or a plurality for 3 trucks. However, if we take account of the self-ratings of the voters presented in Table 6.2, the nominal classifications can be converted into individual probabilities suitable for applying the Shapley-Grofman theoretical weights. Table 6.2 shows the distribution of the self-rated competence data entered by our five observers.

TABLE 6.2

Self-Rated Competence for the Number of Convoy Vehicles Ratings

| Choices | John | Mary | Steve | Debby | Ed |
|---|---|---|---|---|---|
| 0 vehicles | | | | | |
| 1 vehicle | | | | | |
| 1 or 2 vehicles | | | | | |
| 2 vehicles | | | | | |
| 2 or 3 vehicles | 0.2 | 0.2 | | | |
| 3 vehicles | | | 0.5 | | |
| 3 or 4 vehicles | | | | 0.8 | 0.8 |
| 5 vehicles | | | | | |
| more than 5 vehicles | | | | | |

Table 6.3, below, presents the derivation of the Shapley-Grofman weights used to convert the self-rated competencies into weights that replace the uniform single votes cast by the team of observers.

TABLE 6.3

Shapley-Grofman Weights

| p | 1 − p | ln (p/1 − p) Weight | Adjusted Weight |
|---|---|---|---|
| 0.8 | 0.2 | 1.386294361 | 14 |
| 0.6 | 0.4 | 0.405465108 | 4 |
| 0.5 | 0.5 | 0 | 0 |
| 0.4 | 0.6 | −0.405465108 | −4 |
| 0.2 | 0.8 | −1.386294361 | −14 |

Table 6.4 applies the Shapley-Grofman weights to observer votes presented in Table 6.1. Table 6.4 shows a wide margin of victory for the "3 or 4 truck" option: a 28-vote margin over the second-place choice and a 56-vote difference compared to the third-place outcome. By inspection, it is obvious that this collective outcome would be stable if John or Mary's votes were missing. (For example, if Mary's vote were missing, the highest possible confidence/competence rating produced by Mary would only produce a total score of 0 for the "2 or 3 truck" option.

TABLE 6.4

Individual Votes Weighted by ln (p/1 − p) for Table 6.2

| Choices | John | Mary | Steve | Debby | Ed | Total Votes |
|---|---|---|---|---|---|---|
| 0 vehicles | | | | | | |
| 1 vehicle | | | | | | |
| 1 or 2 vehicles | | | | | | |
| 2 vehicles | | | | | | |
| 2 or 3 vehicles | −14 | −14 | | | | −28 |
| 3 vehicles | | | 0 | | | 0 |
| 3 or 4 vehicles | | | | 14 | 14 | 28 |
| 5 vehicles | | | | | | |
| more than 5 vehicles | | | | | | |

In the literature on voting, complex voting mechanisms are often portrayed as a source of uncertainty and chaos and as a means of manipulating collective outcomes. But, complex or heterogeneous preferences can dampen collective incompetence, but constrain maximizing the probability of making a correct or optimal collective decision.

Understanding the multifaceted impact of preferences and competence on the production of collective outcomes can enable us to design voting mechanisms that are waitless and error-resilient. This section describes options for using complex choice patterns to achieve this objective. These options include multidimensional preferences, multidimensional competence, and more flexible input mechanisms for expressing preferences and judgments, and voter trust profiles.

Multidimensional preferences are based on the collective logic of scoring preferences on more than one dimension, not classic multidimensional scaling and descriptive statistics. For example, in the convoy assessment problem, suppose that observers are asked to report the size and shape of the vehicles in addition to their number. They are asked if the size and shape of the vehicles are the same or different, but are also allowed to indicate that they are not sure about these attributes.

In this scoring procedure, each observer's response on the number of vehicles is weighted by their responses on the size and shape attributes. For instance, in our convoy assessment example, John selected "2 or 3 vehicles." If he selected "same" for size and shape, his input for vehicle number would be weighted by the rankings on the size and shape scales to create a weighted individual rating for "2 or 3 vehicles." Then the weighted individual ratings for all five observers can be aggregated to find the collective outcome produced by the default scoring mechanism. These weighted voting results can be normalized to show the share of the total score gained by each choice in the decision task.

The differences between the shares of the total collective score under the original vehicle number decision task results and the collective score weighted by size and shape reveal "collective gaps." These gaps can be positive, negative, or zero. In repeated decisions, collective gaps are normally distributed. But in a specific decision, gaps represent complex patterns that can be used to produce error-resilient and waitless collective outcomes.

To illustrate the possibilities for producing a consensus with gaps, suppose that our five observers rate all of the attributes following the same pattern of individual agreement shown in Table 6.1. So John and Mary, who selected "2 or 3 vehicles," also agree that the size and shape of these vehicles are the same. Mary, who spotted "3 vehicles," reports that the size and the shape of the vehicles were different. And Debby and Ed, who chose "3 vehicles," disagree on the size and shape attributes. Debby reports that the vehicles were the same size, but that the shapes were different.

In the original convoy assessment example, the ratings for the number of vehicles in Table 6.1 would produce a tie between "2 or 3" and "3 or 4" vehicles under Condorcet scoring. Each choice receives 41.2% of the total collective score. When we broaden the task to encompass vehicle size and shape with the observer inputs from the previous paragraph, the collective gaps, shown in Table 7, are produced.

| Gap Relationship | Number and Size | Number and Shape |
|---|---|---|
| Gap Value for 2 or 3 Vehicles | −55 | −58 |
| Gap Value for 3 vehicles | 16 | 18 |
| Gap Value for 3 or 4 vehicles | 39 | 39 |

In this example, the gap analysis can provide a level of confirmation for the collective assessment on a single dimension and be used to test for error-resilience.

A representative embodiment of the present invention to implement this solution would operate in client-server mode with templates 36 of FIG. 3A preinstalled on mobile or wired devices. A message from the commander or preset time would present the form for data input and the data would be submitted over the network using the vote data collection module 42 of FIG. 4A and written to the agenda database 80 of FIG. 1 on the convoy leader's wired or wireless computer device. A report would automatically be generated from the report template using the report creation module 52 of FIG. 5A on the commander's user interface. If the commander used the multidimensional version of the decision task, a report template would be used to compute gaps. The results of these reports would be would be sent redundantly using notifications by multiple communications channels so that the commander can use the collective assessment of the convoy

EXAMPLE 3

In this example, the present invention is used to decipher intelligence for investment decisions and to produce investment decisions themselves. In these tasks, error is not defined as a constraint, although it could be if wireless transactions were sufficiently trustworthy. However time is still a significant constraint because speed in making decisions can provide a competitive advantage in creating and exploiting opportunities. Moreover, since there is always the possibility of system or human error, reaching a consensus as quickly as possible is essential for efficiency and effectiveness.

In practice, financial decisions are not made collectively in the sense that assessments of intelligence and investment options are done by collecting votes from individual investors to produce a collective outcome. Relying on collective outcomes for intelligence assessments and investment decisions is considered to be too risky because the errors are too costly. Allowing diversity and individuality in assessing intelligence and investment options provides a measure of stability because the group is better off than they would be if all decisions were decided collectively.

However, in many organizational cultures, there is an informal operating rule of unanimity that governs investment decisions. Colleagues operate independently as long as their performance gains the tacit consent of other members of their group. But if an individual's investment performance threatens the economic stability of the group, a coalition of colleagues may eliminate the deviant performer. This modus operandi is essentially a reactive way of dealing with the problem of managing risk. The present and unique invention can be used to control the collective decision making process and gain the benefits and avoid the losses from relying on collective outcomes. This control would allow investment practices to be governed in a proactive instead of a reactive way. For example, in bond trading, traders make daily individual predictions about indicators such as unemployment and federal interest rates in managing their portfolios. If these factors were assessed collectively using the present and unique invention, accurate predictions could be produced without waiting for all of the votes to be received from other traders. This intelligence would be updated and calibrated daily to advise each individual if and when his/her individual performance in predicting key indicators is better than the group's predictive performance. This waitless collective intelligence can provide a significant tactical advantage in creating and exploiting market opportunities. In short, it can be an error to wait when there is an alternative that makes waiting unnecessary.

Since relying on collective decisions about investments is regarded as if it were putting all one's eggs in one basket, it is not surprising that investment organizations have not acted collectively. But a representative embodiment of the present and unique invention provides the benefits of enhanced, optimized collective decisions without the risks of catastrophic collective losses. By updating and calibrating the ratio of successes to failures in individual investment decisions, the collective decision system support mechanism can allow individuals to know if the conditions are sufficient for the collective decision to outperform the most competent investor(s) and make it rational to voluntarily accept collective investment recommendations. If the collective decision system support is designed to operate on short term decisions, acceptable rates of error can be predetermined to assure that the marginal impact of the system on profits is beneficial rather than harmful.

A representative embodiment of the present invention to solve decision problems in this scenario can be implemented in a centralized (FIG. 11) or decentralized (FIG. 12) computer networking environment by setting up agendas using the question creation module 32 of FIG. 3A. These agendas can be templates that are automatically presented each trading day at a certain time for user input. Respondents could also be notified by mail or other communications channel to answer the questions about key indicators and options for allocating bond portfolio investments. Responses would be submitted to using the vote data collection module 42 of FIG. 4A and written into agenda database 80 of FIG. 1. A report template created using the report creation module 52 of FIG. 5A would then automatically extract the incoming data to test for outcomes that satisfy error resilience and optimization requirements. Results would be sent as a notification using the notification module 54 of FIG. 5A to users who satisfied the security settings in the vote data collection module 42 of FIG. 4A.

EXAMPLE 4

In this example, the present invention is applied to provide stable and efficient dynamic routing of electricity in networks. This application is similar to the distributed routing of phone calls in networks (Urken, A., "Coordinating Agent Action via Voting," Proceedings of the IEEE/ACM Conference on Office Information Systems, 1990). The key differences are the measurement of voter preferences and competence and the addition of error-resilience. Routing decisions are made automatically by a collective decision of nodes rather than a single node or a human controlling a single node. Routing preferences are inversely related to the latency or backup in transmitting electricity. As energy moves more slowly through certain routes, local nodes immediately adjust their preferences to route electricity via routes that are less congested. This dynamic routing minimizes the likelihood of having large portions of the network overloaded so that nodes and transmission routes fail or are taken out of service automatically to minimize damage. The aggregate effect of this cascading failure is a blackout that can cause significant social and economic damage to a modern economy.

A representative embodiment of the present invention to solve the decision task in dynamic routing of electricity in networks would be configured in local peer-to-peer networks (FIG. 12) within the national grid for managing electricity. The design of the network configuration would depend an assessment of the tradeoffs between creation of small groups of nodes and their capability in managing and redirecting electricity quickly enough to make a sufficiently significant marginal impact in dynamic situations. The skill in designing this configuration is part of the existing art in managing electricity networks, but requires the integration of a new technology-driven art enabled by the present invention.

Each node in the network would have a copy of the present invention with a predefined set of network nodes as fellow voters in a local area network. All of the nodes would be programmed to answer a single agenda every fraction of a second. The periodicity of these responses would be determined from the expertise of electrical engineers and tested with Monte Carlo simulations to determine an acceptable degree of error resilience. The agenda, created in the question creation module 32 of FIG. 3A, would collect votes for a fixed list of routing alternatives in the vote data collection module 42 of FIG. 4A. To expedite processing, each peer node would collect the data in real time memory and carry out an error-resilient analysis and then write the data and the result to the agenda database 80 of FIG. 1.

A representative embodiment of he present and unique invention enhances the power of dynamic routing by enabling collective decisions to be implemented more quickly so that adjustments in network allocations of electrical flows can be expedited to minimize and/or preclude the destabilizing effects of cascading network communications failures that culminate in blackouts. Moreover, if these decisions are done in a peer-to-peer architecture, the decisions can be structured so that all voters carry out the collective decision without having to wait for the consensus to be computed and announced by a central node.

EXAMPLE 5

In this example, the present invention can be applied to enable collections of mobile sensors to provide more precise and accurate intelligence. Currently, when sensors report readings for phenomena, their representations are presented in terms of a mean and a measure of variance. This statistical summary is efficient because it prevents the sensor from having to store and submit larger amount of data that would exceed its processing and energy capacity. A drawback of these summary reports is that it does not convey information about the distribution of the variance that represents the relative frequency of occurrence of different values of the reported phenomenon. Although this type of information is summarized in a Pearson distribution, the complexity of the calculation and the data transmission requirements make it infeasible to use this type of representation in reporting to a central node.

However the representation and submission of data can be made more accurate and efficient if node reporting is treated as if it involved a collective decision process. In this process, the sensors rank the values of the rating scale for the phenomenon on an ordinal or cardinal scale and submit their ratings or votes to a central node for processing. Depending on the task, the ordinal data can be processed with Borda, Condorcet, Copeland, and/or other scoring algorithms to answer different questions about the aggregations of the individual sensor reports. Cardinal data can be processed using point voting.

The present invention can enhance this aggregation process by providing error-resilient analysis to identify a consensus as quickly as possible. Since sensors are a part of an emergency detection and warning system, waiting to collect information is erroneous if it is not necessary. Expedited determination of a consensus allows the users of intelligence to take immediate action to evade a phenomenon, to implement countermeasures, and/or, if necessary, to obtain additional information to clarify uncertainties and trends.

A representative embodiment of the present invention can be implemented in centralized network mode (FIG. 11) or decentralized network mode (FIG. 12), though normally the former mode is used in connection with data collection from sensors. In the centralized implementation, each sensor would repeatedly enter data into a preexisting form based on its readings of the phenomenon it is monitoring. In this example, the decision task created in the question creation module 32 of FIG. 3A would be a rank ordering of detected levels of a phenomenon. Nodes would submit their ratings or rankings using the vote data collection module 42 of FIG. 4A. In this case, the report creation module 52 of FIG. 5A can make use of security protections in the vote data collection module 42 of FIG. 4A and the trust profile module 46 of FIG. 4A to add a level of trustworthiness to the analysis of the results. Reports can be sent using the notification module 54 of FIG. 5A. In case of preset report settings being triggered by incoming data that spawn followups in the follow-up module 56 of FIG. 5A, contingent actions in this module can be invoked. Alternatively, followup queries using preset agendas from templates 36 of FIG. 3A can be sent to node and human respondents to obtain more information about the phenomenon and options for taking action to compartmentalize the phenomenon or to counteract its affects.

The present invention could be applied to manage traffic in various locations. Management of traffic in automobile and plane travel is a serious problem because control systems do not exist that allow drivers and pilots to make dynamic adjustments to coordinate their decisions about scheduling and routing their trips. In automobile traffic, relying on real-time helicopter reports can be unreliable either because assessment of existing and alternative route conditions is wrong or because broadcasting traffic advice produces mass shifts in traffic patterns that can overload alternative routes. To remedy this problem, assessments of traffic conditions and alternative routes can be made more precise and accurate by drawing on the collective intelligence of drivers, whose ability to assess traffic conditions and recommend alternative routes is based on experience and learning derived from commuting. Drivers could either initiate or respond to ad hoc polls that would be processed using error-resilient systems and methods to deliver private reports to poll participants to guide their choices. These polls could provide types of information that cannot be derived from conventional traffic information systems. For instance, a poll could provide advice about when to change a route on a congested road. Knowing whether to take the next exit or risk waiting to see if traffic improves and if does not to take a later exit can save drivers time and money. For drivers of emergency vehicles (in civilian or military situations), error-resilient feedback can save many lives and avoid damage to property This solution could use self-confidence and/or performance-based ratings to dynamically adjust the competence or reliability weights of the voters.

In the case of air traffic, the lack of dynamic intelligence creates gridlock and monetary losses from cancelled flights and delayed arrivals (H. W. Jenkins, Wall Street Journal, Aug. 18, 2004, The Coming Revolution In Air Traffic Control, Page A11). Proposals to use global positioning systems (GPS) to automatically control flight paths do not include mechanisms that are error-resilient. Collective intelligence based on the dynamic decisions of software that supports human or machine intelligence can remedy this limitation. When malicious or inadvertent errors would lead to crashes, the present invention, by treating the problem as a collective decision or voting problem, would allow the production of instantaneous and accurate decisions to coordinate the choices flight paths to assure safe management of air traffic. When air traffic controllers are involved, the use of waitless, error-resilient collective intelligence can provide a means of managing error in complex systems for controlling air traffic (see, e.g., David Leadbetter, Andrew Hussey, Peter Lindsay, Andrew Neal, and Mike Humphreys, Towards Model Based Prediction of Human Error Rates in Interactive Systems, 0-7695-0969-X/01, 2001 IEEE.)

The present invention could also be implemented to process inputs from various sensors. The cost, speed, and reliability of sensors is a basic constraint on the use of sensor arrays in emergencies. (see, e.g., Behrooz Parhami, Multi-sensor Data Fusion and Reliable Multichannel Communication, IEEE: ASILOMAR, 1996) Sensors that are reliable are also very expensive. But even costly sensors may fail, take long to process sensed data, and have their messages delayed by network communications congestion or blocked by breakdowns in communications links. Current techniques of sensor "fusion" do not take account of problems in collecting and processing information in complex computing environments in which a) sensors are perfect, but network communication is imperfect, b) sensors are imperfect, but network communications is perfect, or c) sensors and network communications are both imperfect.

In these risky environments, the use of collective decision system supports (CDSS) methods and systems can extend the scope of sensor operations. (see, e.g., Trent W. Lewis and David M. W. Powers, Sensor Fusion Weighting Measures in Audio-Visual Speech Recognition, Australasian Computer Science Conference, 2004.) For instance, ad hoc networks of sensors could be created by dropping numbers of sensors into an area. Low cost sensors with moderate or even "low" reliability can be used because CDSS methods and systems can produce high collective reliability by making use of the present and unique invention. Conventional fusion techniques that rely simply on a majority aggregation rule do not provide the reliability or precision and accuracy that can be provided by the present invention.

Designers of new multi-functional sensors that sample and detect multiple agents have proposed installing thousands of sensors in US cities (see, e.g., Philip J. Wyatt, Early Warning and Remediation: Minimizing the Threat of Bioterrorism, Journal of Homeland Security, April, 2002). But such proposals do not take account of transmitting sensed data over a centralized or distributed network in which inadvertent or malicious errors can thwart the delivery of intelligence. The present and unique invention provides a solution to this problem that takes account of differences in sensor reliability and speed and provides specific advice about how much information must be received or how long a recipient must wait to reach a decision and take action.

Figure 28A:
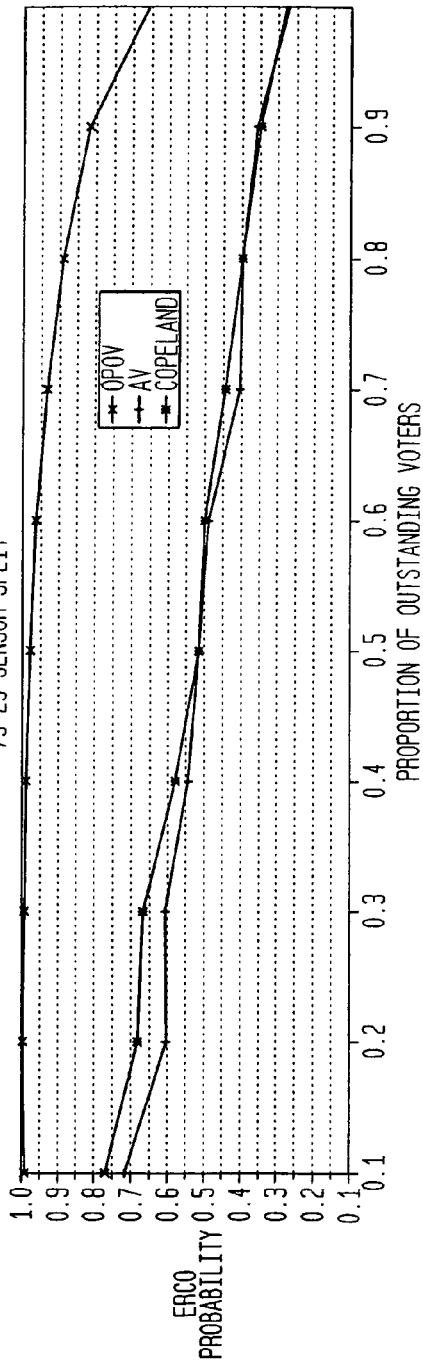
FIGS. 28A-28B are graphs showing comparisons of the probabilities of producing error-resilient outcomes for three scoring methods in various sensor networks.
Figure 28B:
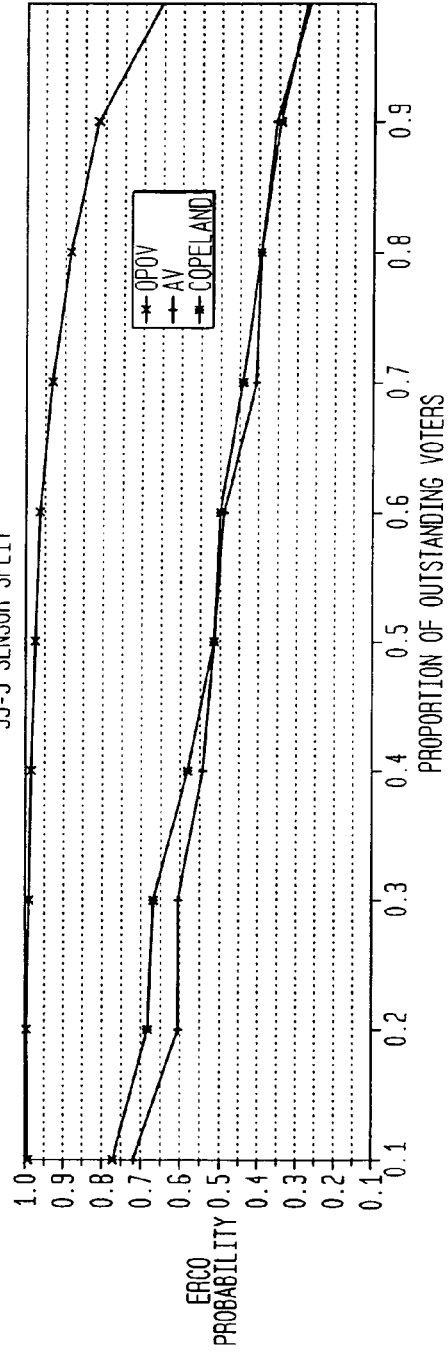

FIGS. 28A-28B are graphs showing comparisons of the probabilities of producing error-resilient outcomes for three scoring methods (OPOV, AV, and Copeland) in various sensor networks. In this simulation, 100 sensors were simulated, with a 75-25 sensor split (FIG. 28A) and a 95-5 sensor split (FIG. 28B). As can be seen, the ERCO result does not change in response to changes in sensor splits. Importantly, the ERCO results produced by the present invention can be used to determine an optimal number of sensors to activate in a network, thereby conserving resources and/or energy.

Figure 29A:
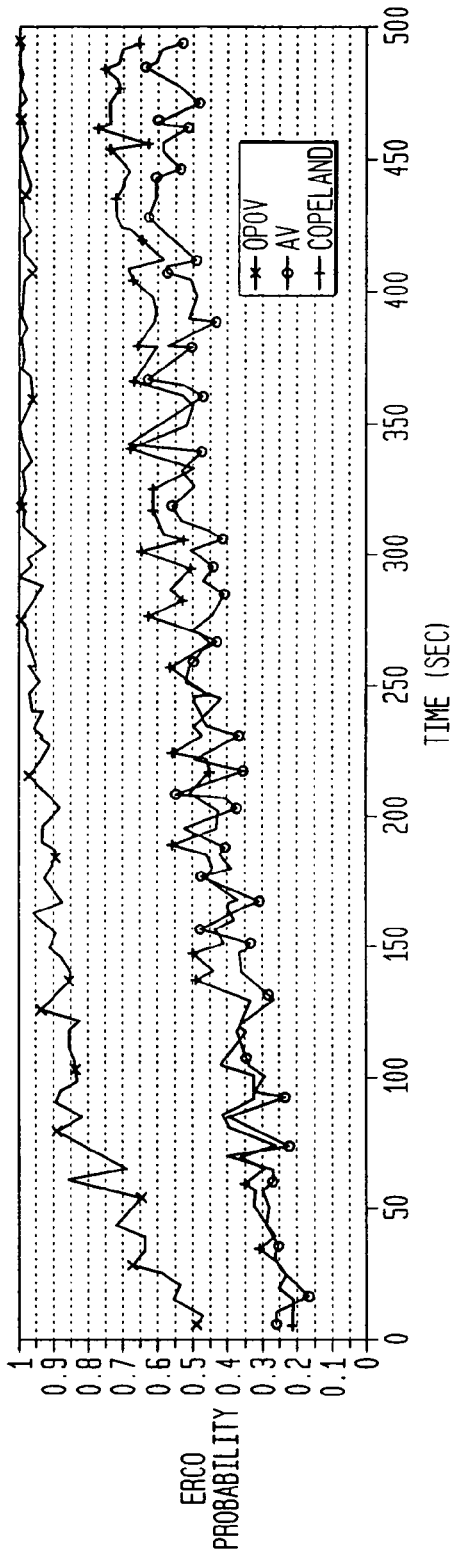
FIGS. 29A-29B are graphs showing comparisons of three scoring methods and effects of time on the production of error-resilient outcomes in various sensor networks.
Figure 29B:
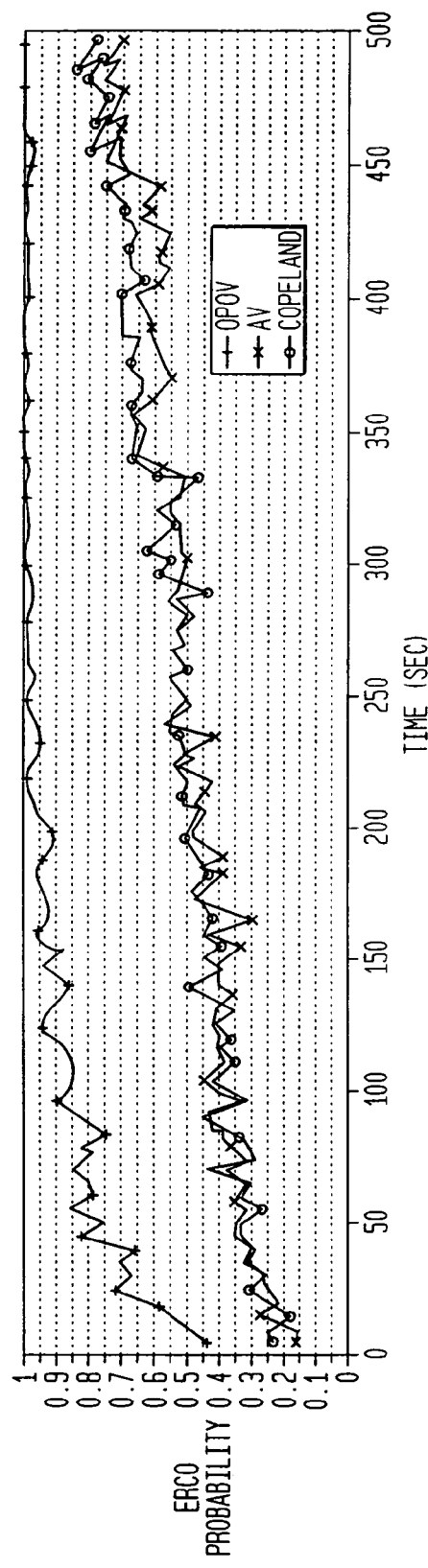

FIGS. 29A-29B are graphs showing comparisons of three scoring methods and effects of time on the production of error-resilient outcomes in various sensor networks. The parameters of this simulation are the same as those for the simulation shown in FIGS. 28A-28B, with 75-25 and 95-5 sensor splits, respectively. As shown in FIG. 29A, a 75-25 split results in some volatility in the OPOV scoring method over time, wherein the other scoring methods (AV, Copeland) diverge over time. As shown in FIG. 29B, a 95-5 split results in less volatility in the OPOV scoring method over time, wherein the other scoring methods (AV, Copeland) do not diverge over time.

PSEUDOCODE EXAMPLE

The logic of the present invention can be illustrated by the following pseudocode example:

1. Use the user interface engine module submodule in FIG. 1 to set up the questionnaire and timing for collection of data in the agenda submodule and define security rules and eligible voters in the user manager submodule, and define notifications and report privileges in the report maker submodule in FIG. 1.

2. Use the agenda manager submodule of FIG. 1 to define a voting objective and a system for carrying out error-resilient and/or optimization analysis:

If the objective is to reach a consensus that satisfied plurality, majority or another aggregation rule under one or more voting methods, take account of the number of voters, the complexity of the decision task(s), the configuration of the network vote collection process, and the processing capabilities and energy capacity of the network devices used in the voting process to choose a method of adaptive scoring.

If the number of voters is small and the decision task is not very complex, use the logic of the collective decision making process to assess error resilience as votes are received.

If the number of voters is large and the decision task is complex, use an adaptive scoring mechanism to ascertain error-resilience that is appropriate to the processing and energy attributes of the hardware devices in the network. If the task includes options for gap analysis, configure the scoring mechanism to take account of computational demands.

If the decision objective is to optimize the probability that a group will make one or more correct or optimal choices, choose a scoring mechanism that takes account of the number of voters, the complexity of the decision task, and the network architecture.

Apply stochastic and/or deterministic measures of competence depending on the decision objective.

Apply approximations when processing capacity is constrained by time and/or energy constraints.

3. Use automated or semi-automated analysis of the results in notifications and determination of collective resilient and optimized collective outcomes.

4. Link automated templates and procedures for targeted followup queries and actions.

5. Enable human decision makers to use the reports in an advisory mode to make the final decision about followup queries and actions.

Having thus described the invention in detail, it is to be understood that the foregoing description is not intended to limit the spirit and scope thereof. What is desired to be protected by Letters Patent is set forth in the appended claims.

What is claimed is:

1. A system for producing error-resilient collective group decisions comprising:
a plurality of computing systems interconnected by a communications network, each of the plurality of computing systems including a user interface for allowing communication with a voter at each computing system;
an agenda manager module for creating and presenting at least one question to be voted on to each voter using the user interface;
means for calculating a voting termination point and a voting time period sufficient to achieve a desired voting objective in the presence of incomplete votes by modeling said desired voting objective using a plurality of vote scoring methods;
a user manager module for controlling interactions between each voter and receiving votes up to the voting termination point; and
a report manager module for processing the votes by applying a plurality of vote scoring methods to produce a collective group decision that is resilient to errors.

2. The system of claim 1, wherein the voting termination point is calculated based upon a predetermined number of votes.

3. The system of claim 1, wherein the voting termination point is calculated based upon a preset time period for voting.

4. The system of claim 1, wherein the agenda manager module calculates a number of voters required to reach the voting objective.

5. The system of claim 1, further comprising a common data exchange for allowing communication between the user interface, the agenda manager module, the user manager module, and the report manager module.

6. The system of claim 5, further comprising at least one common data format for exchanging information over the common data exchange connected to a database.

7. The system of claim 1, further comprising an administrator for supervising a voting process; and an analyst for analyzing collective outcomes.

8. The system of claim 1, wherein the agenda manager module comprises a question creation module for creating questions to be voted on.

9. The system of claim 8, wherein the agenda manager module comprises a plurality of voting templates to be applied to the questions, the voting templates implementing one or more voting rules, which rules implement one or more scoring methodologies for achieving an optimized voting group outcome and define vote endowment, voter competence, vote allocation rules for each voter, and an aggregation rule for collecting votes.

10. The system of claim 1, wherein the user manager module comprises a vote data collection module for collecting the votes and for controlling encryption and decryption of votes submitted by users; and a voter identification module, which identifies permitted voters and analyzes voter demographics and attitudes.

11. The system of claim 10, wherein the user manager module further comprises a trust profile module for determining voter trust levels.

12. The system of claim 1, wherein the report manager module comprises a report creation module for creating voting reports and for identifying pre-defined voting objectives.

13. The system of claim 12, wherein the report creation module processes the votes using deterministic or stochastic vote weights and using voter trust information, the report creation module including an error-resilient vote processing module, which computes the probability of collecting enough votes to produce an error-resilient outcome.

14. The system of claim 12, wherein the report creation module comprises an approval vote processing module, which computes the probability of collecting enough votes to satisfy an aggregation rule.

15. The system of claim 12, wherein the report creation module comprises a trust risk analysis module, which computes the probability of collecting enough trusted votes to satisfy an aggregation rule.

16. The system of claim 12, wherein the report creation module comprises a plurality of vote processing modules.

17. The system of claim 12, wherein the report creation module comprises an optimization vote processing module.

18. The system of claim 12, wherein the report manager module comprises a notification module for notifying voters of voting results.

19. The system of claim 18, wherein the notification module provides an indication of whether the collective group decision is resilient to communications or decision-making errors.

20. The system of claim 19, wherein the notification module suggests gathering additional votes if the collective group decision is not resilient to communications or decision-making errors.

21. The system of claim 12, wherein the report manager module comprises a follow-up module for submitting follow-up questions to voters and instituting contingency plans after a collective group decision has been made.

22. The system of claim 1, wherein the communications network comprises a peer-to-peer network.

23. A method for producing an error-resilient collective group decision from a plurality of voters on a communications network comprising:
   establishing a voting agenda having at least one of question to be voted on;
   determining a voting objective;
   presenting the voting agenda to each of the plurality of voters;
   calculating a voting termination point and a voting time period sufficient to achieve a desired voting objective in the presence of incomplete votes by modeling said desired voting objective using a plurality of vote scoring methods;
   allowing each of the plurality of users to vote;
   receiving votes until the voting termination point; and
   processing the votes with a plurality of vote scoring methods to produce a collective group decision that is resilient to errors.

24. A method for deploying resources comprising:
   providing a communications network interconnecting a plurality of voters with a command center;
   issuing a voting agenda from the command center to each of the plurality of voters;
   calculating a voting termination point and a voting time period sufficient to achieve a desired voting objective in the presence of incomplete votes by modeling said desired voting objective using a plurality of vote scoring methods;
   allowing the voters to vote;
   terminating voting at the voting termination point;
   processing the votes using a plurality of vote scoring methods to produce a collective group decision; and
   deploying resources based upon the collective group decision.

25. A method of acquiring data from a plurality of sensors comprising:
   providing a communications network interconnecting a plurality of sensors with a central processor;
   determining a plurality of vote scoring methods;
   calculating a data acquisition termination point and a data acquisition time period sufficient to achieve a desired voting objective in the presence of incomplete data by modeling said desired voting objective using the plurality of vote scoring methods;
   acquiring data from the plurality of sensors until the data acquisition termination point; and
   processing acquired data using the plurality of scoring methods to produce a collective group decision.

* * * * *